US012673823B2

(12) United States Patent
Forster

(10) Patent No.: US 12,673,823 B2
(45) Date of Patent: Jul. 7, 2026

(54) METHOD AND ORDER-PICKING STORAGE FACILITY FOR STORING AND ORDER-PICKING GOODS

(71) Applicant: TGW Logistics GmbH, Marchtrenk (AT)

(72) Inventor: Florian Forster, Bad Endorf (DE)

(73) Assignee: TGW Logistics GmbH, Marchtrenk (AT)

( * ) Notice: Subject to any disclaimer, the term of this patent is extended or adjusted under 35 U.S.C. 154(b) by 894 days.

(21) Appl. No.: 17/793,299

(22) PCT Filed: Jan. 12, 2021

(86) PCT No.: PCT/AT2021/060009
§ 371 (c)(1),
(2) Date: Jul. 15, 2022

(87) PCT Pub. No.: WO2021/142498
PCT Pub. Date: Jul. 22, 2021

(65) Prior Publication Data
US 2023/0348192 A1 Nov. 2, 2023

(30) Foreign Application Priority Data
Jan. 17, 2020 (AT) .............................. A 50035/2020

(51) Int. Cl.
*B65G 1/137* (2006.01)
*B65G 57/24* (2006.01)

(52) U.S. Cl.
CPC ......... *B65G 1/1378* (2013.01); *B65G 1/1371* (2013.01); *B65G 57/24* (2013.01); *B65G 2201/0267* (2013.01); *B65G 2203/046* (2013.01)

(58) Field of Classification Search
CPC .... B65G 1/1378; B65G 1/1371; B65G 57/24; B65G 2201/0267; B65G 2203/046; B65G 2203/0208
See application file for complete search history.

(56) References Cited

U.S. PATENT DOCUMENTS

| 3,866,780 A | 2/1975 | Miller et al. |
| 4,993,915 A | 2/1991 | Berger et al. |
| (Continued) | | |

FOREIGN PATENT DOCUMENTS

| AT | 507 811 A1 | 8/2010 |
| AU | 2017361114 A | 5/2019 |
| (Continued) | | |

OTHER PUBLICATIONS

WO-2012116690-A1 (Year: 2012).*
(Continued)

*Primary Examiner* — Ernesto A Suarez
*Assistant Examiner* — Laurence R Brothers
(74) *Attorney, Agent, or Firm* — Collard & Roe, P.C.

(57) ABSTRACT
In a method for storing and picking stackable article carriers in a picking warehouse, transport loading aids are transported between a loading station with an automatically operated loading device, a storage zone and a removing station with an automatically operated unloading device using autonomously movable, driverless transport vehicles. The transport loading aids are loaded with article carrier stack groups in the loading station and the article carriers are discharged from the transport loading aids in the unloading station. Subsequently, the article carriers for a picking order are reloaded onto one or multiple target loading aids. A picking warehouse stores and picks stackable article carriers.

25 Claims, 16 Drawing Sheets

(56) References Cited

U.S. PATENT DOCUMENTS

| | | | |
|---|---|---|---|
| 5,102,292 A | 4/1992 | Brinker et al. | |
| 5,242,262 A | 9/1993 | Andre et al. | |
| 5,265,712 A | 11/1993 | Krieg | |
| 5,417,543 A | 5/1995 | Focke et al. | |
| 5,524,747 A | 6/1996 | Wohlfahrt et al. | |
| 6,332,750 B1 | 12/2001 | Donner et al. | |
| 6,652,014 B2 | 11/2003 | Schmalz et al. | |
| 7,047,710 B2 | 5/2006 | Winkler | |
| 7,735,625 B2 | 6/2010 | Schaefer | |
| 8,708,637 B2 | 4/2014 | Wolkerstorfer | |
| 8,915,696 B2 | 12/2014 | Baumann et al. | |
| 8,989,892 B2 | 3/2015 | Hill | |
| 9,008,827 B1 | 4/2015 | Dwarakanath et al. | |
| 9,272,845 B2 | 3/2016 | Honkanen et al. | |
| 9,436,184 B2 * | 9/2016 | D'Andrea | G05D 1/0234 |
| 9,776,812 B2 | 10/2017 | Cavelius | |
| 9,988,216 B1 | 6/2018 | Mccalib, Jr. et al. | |
| 10,065,798 B2 | 9/2018 | Borders et al. | |
| 10,317,119 B2 | 6/2019 | Zou | |
| 2002/0063036 A1 * | 5/2002 | Wunscher | B65G 47/31 |
| | | | 198/341.03 |
| 2003/0123962 A1 | 7/2003 | Mikulic et al. | |
| 2005/0047895 A1 | 3/2005 | Lert, Jr. | |
| 2017/0022010 A1 | 1/2017 | D'Andrea et al. | |
| 2017/0066592 A1 | 3/2017 | Bastian, II et al. | |
| 2018/0085788 A1 | 3/2018 | Engel et al. | |
| 2019/0092612 A1 | 3/2019 | Soder | |
| 2021/0261337 A1 | 8/2021 | Schedlbauer et al. | |

FOREIGN PATENT DOCUMENTS

| | | | |
|---|---|---|---|
| DE | 4213301 A1 | 10/1993 | |
| DE | 10 2005 016 431 A1 | 10/2006 | |
| DE | 199 59 285 B4 | 1/2008 | |
| DE | 10 2010 051 948 A1 | 5/2012 | |
| DE | 10 2011 101 692 A1 | 11/2012 | |
| DE | 10 2013 101 659 A1 | 8/2013 | |
| DE | 10 2012 106 112 A1 | 1/2014 | |
| DE | 10 2012 216 429 A1 | 3/2014 | |
| DE | 10 2014 104 470 A1 | 10/2015 | |
| DE | 10 2017 000 274 A1 | 7/2018 | |
| EP | 0 363 722 A2 | 4/1990 | |
| EP | 0 451 592 A1 | 10/1991 | |
| EP | 0 532 950 A1 | 3/1993 | |
| EP | 0 548 545 B1 | 1/1996 | |
| EP | 0 627 373 B1 | 4/1997 | |
| EP | 0 849 199 A1 | 6/1998 | |
| EP | 0 579 031 B1 | 9/1998 | |
| EP | 0 952 953 B1 | 6/2001 | |
| EP | 1 321 397 A1 | 6/2003 | |
| EP | 1 462 394 A2 | 9/2004 | |
| EP | 1 659 077 A2 | 5/2006 | |
| EP | 1 659 077 B1 | 6/2010 | |
| EP | 2 456 696 B1 | 6/2013 | |
| EP | 2 746 194 A1 | 6/2014 | |
| EP | 2 687 463 B1 | 11/2016 | |
| WO | 98/31620 A1 | 7/1998 | |
| WO | 2007/131668 A1 | 11/2007 | |
| WO | 2008/022767 A1 | 2/2008 | |
| WO | 2009/094681 A1 | 8/2009 | |
| WO | 2011/009150 A1 | 1/2011 | |
| WO | 2012/127102 A1 | 9/2012 | |
| WO | WO-2012116690 A1 * | 9/2012 | B65G 1/1375 |
| WO | 2014/077683 A1 | 5/2014 | |
| WO | 2014/111890 A1 | 7/2014 | |
| WO | 2015/144139 A1 | 10/2015 | |
| WO | 2016/210126 A1 | 12/2016 | |
| WO | 2017/182135 A1 | 10/2017 | |
| WO | 2018/039423 A1 | 3/2018 | |
| WO | 2018/090081 A1 | 5/2018 | |
| WO | WO-2020014725 A2 * | 1/2020 | B65G 1/0492 |

OTHER PUBLICATIONS

WO-2020014725-A2 (Year: 2020).*

International Search Report in PCT/AT2019/060009, mailed May 19, 2021.

The Warehouse of the Future—Witron's Opm Technology at Meijer in Wisconsin https://www.youtube.com/watch?v=bn5jjVKhFUs, downloaded Jan. 6, 2021 (70 pages).

* cited by examiner

$\alpha_1$

100b

100a

METHOD AND ORDER-PICKING STORAGE FACILITY FOR STORING AND ORDER-PICKING GOODS

CROSS REFERENCE TO RELATED APPLICATIONS

This application is the National Stage of PCT/AT2021/060009 filed on Jan. 12, 2021, which claims priority under 35 U.S.C. § 119 of Austrian Application No. A 50035/2020 filed on Jan. 17, 2020, the disclosure of which is incorporated by reference. The international application under PCT article 21(2) was not published in English.

BACKGROUND OF THE INVENTION

1. Field of the Invention

The invention relates to a method and a picking warehouse for storing and picking article carriers that contain articles, in particular groceries from the fresh food sector, and are stackable.

2. Description of the Related Art

From the prior art, picking warehouses are known in which outgoing article units with different articles are formed from incoming article units with identical articles (incoming article units with articles of just one type).

The outgoing article units with different articles are for example required in the supply of retail stores and/or branches of food retailers, where articles delivered to a central warehouse in large incoming article units are divided into smaller consumption units and assembled with other articles for shipping.

The articles are stored in article carriers (containers, cartons). The incoming article units comprise article carrier stacks, which are placed on loading aids (pallets, roll containers), of multiple article carriers arranged on top of one another. For example, on a euro pallet (1200 mm×800 mm) four article carrier stacks each with a base area of 600 mm×400 mm or six article carrier stacks each with a base area of 300 mm×400 mm are stacked.

The picking warehouse comprises a delivery zone for the incoming article units, a storage zone, an order processing zone and a shipping zone for the outgoing article units. In the delivery zone, automatically operated depalletizing devices are provided and are configured to separate article carrier stacks from the incoming article units. Subsequently, the article carrier stacks are stored in the storage zone. In the order processing zone, picking orders are processed by the required article carrier stacks being retrieved from the storage zone and being transported to the reloading devices (palletizing devices). At the reloading devices, individual article carriers or the entire article carrier stack are loaded onto a target loading aid (pallet, roll container) according to the picking order. The transport between the delivery zone and the storage zone of the article carrier stack to be stored is performed using a storage conveyor system and the transport between the storage zone and the order processing zone of the article carrier stack to be picked is performed using a retrieval conveyor system. Such a picking warehouse is described for example in WO 2015/144139 A1. This known picking warehouse is predominantly suitable for transporting containers, less for transporting cartons. This is due to the fact that usually it is to be expected that the cartons absorb humidity and lose stability such that a stack of multiple cartons arranged on top of one another is at risk of falling over, in particular where there are acceleration forces. To counteract this, cartons may more or less be manipulated individually only, which strongly minimizes the power of such a picking warehouse.

WO 2012/127102 A1 discloses a picking warehouse which comprises a delivery zone for the incoming article units, a storage zone and a shipping zone for the outgoing article units. The incoming article units are provided in the delivery zone and container stacks are separated therefrom. The separated container stacks are transported into the storage zone by a storage conveyor system and are provided at different storage buffer tracks in the storage zone. A gantry robot, which can remove individual containers or partial container stacks from the container stacks and place them on specified storage places on the base, is arranged in the storage zone. At each storage place, there is a stack of multiple containers arranged on top of one another with identical articles. Picking is performed by a gantry robot by individual containers or partial container stacks being removed from the container stacks and being assembled to order-related container stacks (outgoing article units) on free storage places in the storage zone. Subsequently, the order-related container stacks are dispatched onto different retrieval buffer tracks and are transported from the storage zone into the shipping zone by the retrieval buffer tracks and a retrieval conveyor system. This picking warehouse is designed merely for storing and picking containers, not cartons.

Picking warehouses in which mobile storage racks are transported by autonomously movable, driverless transport vehicles are also known, for example from US 2017/022010 A1 or WO 2018/039423 A1. The storage racks comprise compartment bases, which are arranged in superimposed storage planes, on which articles are placed. Receiving an article carrier stack of multiple article carriers arranged on top of one another in the respective storage rack is not provided.

WO 2018/090081 A1 discloses a picking warehouse for storing and picking article carriers that contain articles and are stackable, in which article carrier stack groups are transferred onto transport racks in a loading station and then transported from the loading station to a storage zone by autonomously movable, driverless transport vehicles. To process a picking order, loaded transport racks are transported from the storage zone to an unloading station by autonomously movable, driverless transport vehicles and are transferred to a target loading aid by an automatically operated unloading device (jointed-arm robot) there. The target loading aid is transported onto a transport rack together with the order stack. The transport racks merely have a transport frame and a base. However, the transport racks do not have side walls to stabilize a position of the article carrier stack group, so that the transport vehicles can only be moved with low dynamics. To still create an effective picking warehouse, the number of transport vehicles must be increased significantly. The "traffic density" and the investment costs increase significantly. Irrespectively thereof, it must be expected that article carriers will fall from the article carrier stack during transport if the hall floor has the slightest unevennesses.

EP 2 746 194 A1 discloses a method for storing and picking articles on pallets, in which the pallets are transported within the picking system using autonomously movable, driverless transport vehicles (without transport loading aids).

DE 10 2017 000 274 A1 discloses a mobile transport loading aid with support rails inclined in a downward direction and arranged in parallel, on which a large load carrier can be placed. In the large load carrier, there are structural elements for the production of a vehicle. However, the structural elements are not picked.

WO 2012/116 690 A1 discloses a mobile stack loading aid for transporting a picked stack of tires, which comprises a base inclined in a direction and a stack support vertically aligned with the base, against which the stack of tires can be leaned. Mobile transport loading aids for transporting the articles to the stacking robot are not used. Rather, the stacking robot connects to a production line for stacking the tires on the stack loading aid and the transport of the produced tires is performed by a stationary conveying system (for example, a roller conveyor) from the production line to the stacking robot.

SUMMARY OF THE INVENTION

It is one object of the invention to provide an improved method for storing and picking article carriers which contain articles and are stackable and a corresponding picking warehouse. In particular, largely trouble-free operation and fast article handling should be possible regardless of the article carrier used (containers made of plastic materials or cartons).

The object of the invention is achieved by the following steps i) providing autonomously movable, driverless transport vehicles in the picking warehouse, each of the transport vehicles having a chassis with a drive unit and a loading platform arranged on the chassis for receiving a mobile transport loading aid, ii) providing mobile transport loading aids each for receiving an article carrier stack group in the picking warehouse, wherein the mobile transport loading aids comprise empty transport loading aids, iii) providing on at least some of the autonomously movable, driverless transport vehicles or on at least some of the mobile transport loading aids a transport safeguard configured for stabilizing a position of an article carrier stack group when an article carrier stack group is received on the mobile transport loading aid, iv) providing article carrier stack groups comprising multiple article carriers arranged next to one another and on top of one another in a delivery zone of the picking warehouse, v) transporting empty transport loading aids using the autonomously movable, driverless transport vehicles to a loading station and providing one or multiple empty transport loading aid(s) either on one or on multiple automatically operated loading device(s) or on a buffer surface close to the loading device(s), vi) loading one of the empty transport loading aids provided at the automatically operated loading device with an essentially unchanged article carrier stack group from the delivery zone using the automatically operated loading device, vii) transporting the transport loading aid loaded with the article carrier stack group by the autonomously movable, driverless transport vehicle from the loading station to a storage zone and stabilizing a position of the article carrier stack group by the transport safeguard during the transport movement of the loaded transport loading aid, viii) placing the transport loading aid loaded with the article carrier stack group on a storage surface in the storage zone, ix) storing the transport loading aids loaded with the article carrier stack groups in the storage zone, and x) processing a picking order comprising the following steps transporting one or multiple transport loading aid(s) containing the article carriers required for a picking order from the storage zone to an unloading station and providing the transport loading aid(s) either at one or at multiple automatically operated unloading device(s) or on a buffer surface close to the unloading device(s) using one or multiple autonomously movable, driverless transport vehicle(s) and stabilizing a position of the article carrier stack group by the transport safeguard during the transport movement of the loaded transport loading aid, unloading one or multiple ones of the transport loading aid(s) provided at the automatically operated unloading device(s) by removing the article carriers required for processing the picking order, and assembling the article carriers on one or multiple target loading aids for the picking order in an order processing zone.

In this regard, it is advantageous that regardless of which article carrier is used, the article carriers can be arranged directly on top of one another in larger numbers. The article carriers can be made of different materials, for instance containers made of plastic materials or cartons can be used. In the picking warehouse, either containers or cartons are picked. However, a combination of containers and cartons is also conceivable. Likewise, the article carrier can have different dimensions. Usually, a base surface of the article carriers is 600 mm×400 mm or 300 mm×400 mm. The transport trips can be performed more efficiently since a higher number of article carriers can be transported per transport trip.

For transporting the empty transport loading aids and transport loading aids loaded with article carrier stack groups, autonomously movable, steerable transport vehicles (of a driverless transport system) are used, which are automatically controlled by a superordinate main computer. Such transport vehicles are known to the person skilled in the art as "automated guided vehicles (AGV in short)" or as "autonomous mobile robots (AMR in short)". Such a transport system comprises the transport vehicles, means for determining the location and detecting a position of the transport vehicles and means for transmitting data to and from the transport vehicles in the transport system. Each transport vehicle comprises a chassis having a drive unit and a loading platform for receiving/discharging/transporting a mobile (non-stationary) transport loading aid arranged on the chassis. Different technologies are known for navigating the transport vehicles. Hence, besides the track-guided, inductive or optical navigation, laser navigation is also used in which each transport vehicle is equipped with a laser scanner that detects stationary reference points in the environment and navigates the transport vehicle on the basis of the detected environmental features. Navigation is also possible using a GPS system, in particular a differential global positioning system (dGPS).

Such a transport system can be integrated into existing picking warehouses without any problems and can be very well adjusted to varying performance requirements.

Although, advantageously, the transport vehicles are configured to have the same performance data (travel speed, acceleration values, load suspension and the like), groups of transport vehicles having different performance data can be used as well. This can prove advantageous where different temperature zones are provided in the picking warehouse. In this case, the transport vehicles of the first group and of the second group can have different control electronics or wheels with different material properties.

Providing article carrier stack groups comprises providing article carrier stack groups preferably containing articles of just one type. The article carrier stack groups comprise (stacked) article carriers arranged next to one another and on top of one another. In particular, the article carrier stack groups comprise stack layers located above one another, wherein each stack layer comprises multiple article carriers arranged next to one another. The article carriers within one stack layer are oriented either equally or differently. The stack layers can have the same or different compositions or be oriented differently. If the article carrier stack group contains articles "of just one type", the article carriers of this article carrier stack group are the same articles. Although this is rather an exception, providing article carrier stack groups can also comprise providing mixed article carrier stack groups. A mixed article carrier stack group comprises article carriers with different articles. In this regard, the lower article carriers in the article carrier stack group can contain a first article and the upper article carriers can contain a second article.

To ensure transport safety of high article carrier stack groups and also dynamic travel movements of the transport vehicles, transport safeguards are used. Moreover, an unloading operation can be performed more reliably by the use of the transport safeguards.

The transport safeguards can be provided on at least some of the autonomously movable, driverless transport vehicles or on at least some of the mobile transport loading aids. The respective transport safeguard configured for stabilizing a position of an article carrier stack group when the article carrier stack group is received on the mobile transport loading aid and is transported and/or unloaded.

A transport loading aid can also be understood as a source loading aid.

According to a first embodiment, the transport loading aid can have side walls and a base wall part. One (single) article carrier stack group is received between the side walls on the base wall part. When the (single) article carrier stack group is transported by a transport vehicle or when the article carriers are unloaded from the transport loading aid, a displacement of the article carriers or article carrier stack group can be prevented or at least limited.

According to a second embodiment, the transport loading aid can have a base wall part and the transport vehicle can have side walls. One (single) article carrier stack group is received between the side walls on the base wall part. When the (single) article carrier stack group is transported by a transport vehicle or when the article carriers are unloaded from the transport loading aid, a displacement of the article carriers or article carrier stack group can be prevented or at least limited.

According to both embodiments, the side walls form the transport safeguard and accordingly used for stabilizing a position of the article carriers/article carrier stack group. Only by the use of the described transport safeguard, article carriers of bad quality, for example due to moisture absorption, damage and the like, can be transported as article carrier stack group on the one hand between a delivery zone and a storage zone and on the other hand between a storage zone and an order processing zone.

In one of the method steps, it is provided that empty transport loading aids are transported to a loading station by the autonomously movable, driverless transport vehicles and are provided either at the loading station at one or multiple automatically operated loading device(s) or on a buffer surface close to the loading device(s). The buffer surface is formed on a floor.

The transport loading aids are transported from the unloading station back to the loading station after removing of the last article carrier/article carrier stack and the empty transport loading aids are provided at the loading station either at an automatically operated loading device or on the buffer surface. However, in principle, a supplier can also deliver empty transport loading aids, which are taken over in the delivery zone and transported to the loading station.

Loading an empty transport loading aid with one (single) article carrier stack group can be performed in a particularly simple and efficient manner.

The article carrier stack group(s) is transported to the one or multiple loading device(s) on a conveying system and is transferred "unchanged" to the empty transport loading aid(s) by one or multiple loading device(s), but article carrier stacks or individual article carriers of the article carrier stack group are not manipulated.

This proves advantageous in several aspects

Firstly, this proves advantageous for article carriers of carton, since the stacking lugs and the stacking recesses that are usually present in the area of the container walls remain engaged for mutual positional fixing of the article carriers arranged on top of one another, and damage to the stacking lugs and stacking recesses caused by repeated lifting and placing of article carriers is avoided.

Secondly, this proves advantageous where the article carriers are made of a plastic material, since the stacking edges that are usually present in the area of the container walls remain engaged for mutual positional fixing of the article carriers arranged on top of one another, and wear to the stacking edges caused by repeated lifting and placing of article carriers is avoided.

Thirdly, the loading device can be structured particularly simply.

Fourthly, loading can be performed very quickly, which is of significant advantage in particular where rather less different articles and a high amount of articles are picked, as can be the case for example in the food sector. In this regard, the articles are supplied by different suppliers and in large amounts within a limited period of time. However, the articles must be transported into the storage zone and subsequently picked within a very short time. After the (individual) article carrier stack group is transported from the delivery zone to the loading station "unchanged" and is transferred onto the empty transport loading aids at one or multiple loading devices, no delays in processing the supplied articles occur.

The transport loading aid is loaded with a preferably "unpacked" article carrier stack group. An "unpacked" article carrier stack group is an article carrier stack group without additional packaging film (stretch film or shrink film) with which the article carrier stack group can be packed or without additional strapping tape with which the article carrier stack group can be strapped. A packaging film or a strapping tape can, for example, have been removed prior to loading the transport loading aid.

After loading, the transport loading aid, which is now loaded (preferably with an "unpacked" article carrier stack group), is transported from the loading station in the delivery zone to the storage zone using one of the transport vehicles and is placed in the storage zone on a free storage place. The transport vehicle comprises a loading platform, by means of which the transport loading aid can be taken over on the transport vehicle and by means of which the transport loading aid can be discharged from the transport vehicle and supported on the transport vehicle during the travel movement. For this purpose, the loading platform can for example be designed such that it can be lifted and lowered in relation to the chassis.

The transport loading aids can be placed on storage places in the storage zone. The storage places are preferably formed on a floor in the storage zone on a storage surface. In the storage zone, there are transport loading aids which are still loaded with one article carrier, some article carriers or with an entire (preferably "unpacked") article carrier stack. While some of the partially unloaded transport loading aids are transported from the order processing zone back into the storage zone after unloading, the completely loaded transport loading aids are transported from the delivery zone directly into the storage zone.

The storage zone is connected to the loading station in the delivery zone via some of the transport vehicles of the transport system and to the unloading station in the order processing zone via some of the transport vehicles of the transport system. The unloading station in the order processing zone can additionally be connected to the loading station in the delivery zone via some of the transport vehicles.

Lastly, for processing one of multiple picking orders (which are electronically acquired in an order-processing computer), at least one transport loading aid containing the required (equal) articles/article carriers is transported from the storage zone to the unloading station using one of the transport vehicles. Where different articles/article carriers are required, the transport loading aids containing these articles/article carriers are transported from the storage zone to the unloading station using multiple transport vehicles. The unloading station comprises one or multiple automatically operated unloading devices, by means of which unloading of one or multiple ones of the transport loading aid(s) is performed automatically by removing the article carriers required for processing the picking order and assembling the article carriers on one or multiple target loading aids, thus without any manual processing steps.

For example, a picking order comprises twenty-four article carriers containing a first article and eighteen article carriers containing a second article.

A first transport vehicle transports a transport loading aid with the article carrier stack group containing the first article from the storage zone to the unloading station and a second transport vehicle transports a transport loading aid with an article carrier stack group containing the second article from the storage zone to the unloading station.

The transport loading aid are provided one after the other at a single unloading device or next to one another at a single unloading device or in parallel at multiple unloading devices.

If a previous picking order is still processed at the unloading device(s), the transport loading aid(s) can be first placed on a buffer surface close to the unloading device(s) by the transport vehicle(s). As soon as the unloading device has unloaded a transport loading aid of the previous picking order and the transport loading aid has been transported away from the unloading device, a transport loading aid of the present picking order can be transported from the buffer surface to the unloading device using a transport vehicle and can be provided at the unloading device.

Then, the transport loading aid, which is (are) provided at the automatically operated unloading device(s), is unloaded by the unloading device by removing the article carriers required for processing a picking order.

Unloading one or multiple ones of the transport loading aid(s) can comprise removing an individual article carrier. If the article carrier is located in an article carrier stack, the uppermost article carrier in the stack is removed. Unloading one or multiple ones of the transport loading aid(s) can comprise removing a partial article carrier stack of at least two article carriers arranged on top of one another. If the article carrier is located in an article carrier stack, the uppermost article carriers in the stack are removed as a partial stack. Unloading one or multiple ones of the transport loading aid(s) can optionally even comprise removing an entire article carrier stack of all article carriers arranged on top of one another.

According to the latter embodiments, a partial stack or an entire article carrier stack of the article carrier stack group can be unloaded from the transport loading aid by the unloading device "unchanged", but individual article carriers of the article carrier stack group are not manipulated.

This proves advantageous in several aspects

Firstly, this proves advantageous for article carriers of carton, since the stacking lugs and the stacking recesses that are usually present in the area of the container walls remain engaged for mutual positional fixing of the article carriers arranged on top of one another, and damage to the stacking lugs and stacking recesses caused by repeated lifting and placing of article carriers is avoided.

Secondly, this proves advantageous where the article carriers are made of a plastic material, since the stacking edges that are usually present in the area of the container walls remain engaged for mutual positional fixing of the article carriers arranged on top of one another, and wear to the stacking edges caused by repeated lifting and placing of article carriers is avoided.

Thirdly, the unloading device can be structured particularly simply.

Fourthly, unloading can be performed very quickly, which is of significant advantage in particular where rather less different articles and a high amount of articles are picked, as can be the case for example in the food sector.

After or during unloading the transport loading aid(s), the article carriers are assembled on one or multiple target loading aids for the picking order.

Unloading the transport loading aids for a picking order can also be performed in a sequence determined by the control system. The article carriers/article carrier stacks are provided at the unloading station in this sequence and are transferred onto the target loading aid in this sequence. On the other hand, a sequence in providing the transport loading aids at the unloading station can also be established via the transport vehicles.

Either article carriers of a single article or article carriers of different articles can be assembled on a target loading aid (outgoing article unit) according to a picking order.

Despite the fact that the invention is not to be understood as being restricted to use in the fresh food sector, this is the preferred field of application. This is mainly because perishable articles, such as fruit and vegetables, require a fast turnover of articles and usually only a limited number of different types have to be picked at the same time. In general, the advantages of this application can also be well implemented in the area of "general merchandise" or in the textile sector.

It can also be advantageous if providing article carrier stack groups comprises providing article carrier stack groups on delivery load carriers and loading one of the empty transport loading aids with one of the article carrier stack groups comprises loading one of the empty transport loading aids with one of the article carrier stack groups on a delivery load carrier. By this measure, loading the empty transport loading aids can be facilitated again and the stability of the article carrier stack group remains unchanged. Costly and time-consuming depalletizing can be eliminated.

A particularly simple embodiment results if assembling the article carriers for the picking order is performed such that an individual article carrier removed from the article carrier stack group (preferably containing articles of just one type) at the unloading device or an article carrier stack removed from the article carrier stack group (preferably containing articles of just one type) is transferred onto a target loading aid by the unloading device. Such a variant is particularly suitable if the picking warehouse has to be designed in a particularly compact manner. According to this embodiment, the one or multiple unloading device(s) forms/ form a picking device for unloading the transport loading aid(s) and for assembling (loading) one or multiple target loading aid(s) with article carriers according to the picking order/picking orders.

The following method steps also prove favorable i) transporting a transport loading aid from the unloading station back to the storage zone after removing the article carriers, if not all article carriers have been removed from the transport loading aid, or ii) transporting a transport loading aid from a first unloading device to a second unloading device after removing the article carriers, if not all article carriers have been removed from the transport loading aid and if the article carriers are needed at the second unloading device for a picking order, or iii) transporting a transport loading aid from the unloading device to a waiting zone in the unloading station after removing the article carriers, if not all article carriers have been removed from the transport loading aid and if the article carriers are needed at the unloading device or one of the unloading devices for an already advised picking order, or iv) transporting a transport loading aid back to the loading station after removing and providing the transport loading aid either at the automatically operated loading device or on the buffer surface, if all article carriers have been removed from the transport loading aid, and v) stabilizing a position of an opened article carrier stack group, if not all article carriers were removed from the transport loading aid, by the transport safeguard during the transport movement according to case i), ii) and iii).

The main computer controls the transport vehicles depending on the picking orders that are actively being processed. If not all articles are required for a first picking order and the remaining articles are sufficient for a second picking order, a transport vehicle can transport the transport loading aid containing these articles/article carriers from the respective unloading device for instance to another unloading device if these are soon required. Moreover, buffering of the transport loading aid on the one hand on a buffer surface close to the unloading device is possible and on the other hand in a waiting zone comprising the unloading station, which is located at a shorter distance from the unloading device than the storage zone. Empty transport loading aids are instead transported to the loading station directly and via the shortest way. Thus, route-optimized trips of the transport vehicles result.

The following steps also prove advantageous providing a first temperature zone in the storage zone, in which the transport loading aids with the article carrier stack groups comprising article carriers arranged next to one another and on top of one another containing articles of a first article group are disposed, providing a second temperature zone in the storage zone, in which the transport loading aids with the article carrier stack groups comprising article carriers arranged next to one another and on top of one another containing articles of a second article group are disposed, defining a first article group and of a second article group, to which first article group articles of a first storage temperature are assigned and to which second article group articles of a second storage temperature are assigned, and detecting data comprising data of the first article group, in particular a first storage temperature for the articles, and the second article group, in particular a second storage temperature for the articles, on a computer system, identifying the article carrier stack group and/or the transport loading aid using a detecting device provided in the delivery zone by reading a data carrier, the data carrier being arranged in each case on the article carrier stack groups and/or transport loading aids, selectively transporting the transport loading aids in each case loaded with the article carrier stack group using the autonomously movable, driverless transport vehicles either to the first temperature zone or the second temperature zone and stabilizing a position of the article carrier stack group by the transport safeguard during the transport movement, storing the transport loading aids with the article carrier stack group comprising article carriers arranged next to one another and on top of one another containing articles of the first article group in the first temperature zone, and storing the transport loading aids with the article carrier stack group comprising article carriers arranged next to one another and on top of one another containing articles of the second article group in the second temperature zone.

By selectively storing the articles depending on the article group, the high quality requirement is met. For example, in the food sector (fresh food sector), the first temperature zone can have a temperature range of 2° C. to 7° C. and the second temperature zone can have a temperature range of 10° C. to 15° C.

The following steps are also advantageous transporting one or multiple transport loading aid(s) containing the article carriers required for a first picking order from the first temperature zone, and transporting one or multiple transport loading aid(s) containing the article carriers required for a second picking order from the second temperature zone, to the unloading station using a shared, automatically operated unloading device and stabilizing a position of the article carrier stack group by the transport safeguard during the transport movement, providing the transport loading aid(s) for the first picking order either at the automatically operated unloading device or on a buffer surface near the unloading device using the autonomously movable, driverless transport vehicle(s), providing the transport loading aid(s) for the second picking order either at the automatically operated unloading device or on a buffer surface near the unloading device using the autonomously movable, driverless transport vehicle(s), and sequentially assembling article carriers on a first target loading aid with multiple article carriers containing articles of a first article group, and assembling article carriers on a second target loading aid with multiple article carriers containing articles of a second article group at the removing station with a shared, automatically operated unloading device.

Regardless of the temperature zone from which the articles/article carriers are retrieved, they can be manipulated at the same removing station. This simplifies the complexity of the picking system and also reduces the acquisition costs.

The method measures comprising the following steps are also advantageous providing stack loading aids in each case for receiving and optionally stabilizing a position of an order stack assembled of the article carriers according to the picking order, wherein the stack loading aids comprise at least one first stack loading aid and/or at least one second stack loading aid, each of which comprises a base wall part and optionally side walls projecting from the base wall part, lading the first stack loading aid with a target loading aid at a lading station using one or multiple automatically operated lading device(s), by placing the target loading aid on the base wall part if a first stack loading aid is used in the picking warehouse, and/or defining the second stack loading aid as the target loading aid if a second stack loading aid is used in the picking warehouse.

According to an embodiment, the first stack loading aid and/or the second stack loading aid can be used merely for receiving an order stack assembled of the article carriers according to the picking order and merely have a base wall part, but no side walls projecting from the base wall part. According to this embodiment, the side walls are formed on at least some of the transport vehicles, as described above, wherein the side walls are configured for stabilizing a position of an order stack assembled of the article carriers according to the picking order if the order stack is received on the base wall part.

The use of the first stack loading aid or second stack loading aid allows for the reliable transport of the order stack regardless of which article carriers have been stacked. Hence, article carriers, in particular containers and cartons can be stacked mixed. Practice has shown that it is sufficient if the first stack loading aid/second stack loading aid have a first stack wall and a second stack wall. A stack layer is filled starting from the corner from back to front and from left to right or from right to left. On the other hand, a stack layer can be filled starting from the corner from left to right or from right to left and back to front. An article carrier can be positioned and stacked precisely in the corner by the transfer device. In this way, the order stack is given a high degree of stability.

A first stack loading aid can be used in the picking warehouse when the target loading aid with the order stack is shipped to the customer. A second stack loading aid can be used in the picking warehouse if the target loading aid is to be exchanged by a shipping load carrier, preferably a roll container, a pallet and the like. The shipping load carrier is for example loaded with the order stack in the load securing station and then delivered to the customer.

The first stack loading aid can comprise a transport rack, a base and side walls project from the base, wherein the transport rack forms a transport frame, against which a loading platform of the transport vehicle can be positioned, and wherein the base forms a base wall part onto which a target loading aid, in particular a pallet, with the order stack stacked thereon can be placed, and the side walls form a transport safeguard for stabilizing a position of an order stack when the order stack is received on the base wall part with the target loading aid.

The second stack loading aid can comprise a transport rack, a base and side walls project from the base, wherein the transport rack forms a transport frame, against which a loading platform of the transport vehicle can be positioned, and wherein the base comprises a base wall part having placing blocks protruding on an upper side of the base wall part, the placing blocks being separated from one another by receiving channels, wherein the article carriers of the order stack can be placed on the placing blocks, such that the at least one second stack loading aid forms the target loading aid and the side walls form a transport safeguard configured for stabilizing a position of the order stack when the order stack is received on the base wall part.

Preferably, the transport vehicle is positioned below the first/second stack loading aid and such with respect to the first/second stack loading aid that the loading platform of the transport vehicle can be positioned against the transport frame.

The following steps also prove advantageous transporting the stack loading aids using the autonomously movable, driverless transport vehicles to the unloading station and providing one or multiple stack loading aid(s) either on one or on multiple automatically operated unloading device(s) or on a buffer surface close to the unloading device(s), and assembling the article carriers according to the picking order to the order stack on the target loading aid in the first stack loading aid or on the base wall part of the second stack loading aid, wherein the first stack loading aid or second stack loading aid is provided at the automatically operated unloading device(s).

Like the transport loading aids, the stack loading aids can also be transported between the loading station and the unloading station using the autonomously movable, driverless transport vehicles. Either those transport vehicles that also transport the transport loading aids can be used, or additional autonomously movable, driverless transport vehicles are provided, which assume the transport of the stack loading aids.

In the picking warehouse, article carriers (which cannot be picked automatically), so-called "ugly article carriers", can also be picked manually. While a large part of the article carrier, namely more than 90% of the overall article carrier assortment, is automatically picked using the automatically operated unloading device(s), the remaining part of the article carriers is manually picked at the semi-automated unloading device(s). Automatic picking of article carriers is in particular possible if the article carriers have a first longitudinal dimension of approximately 600 mm or a second longitudinal dimension of approximately 300 mm or a third longitudinal dimension of between 600 mm and 300 mm. A width can be between 300 mm and 400 mm. If the article carriers have a longitudinal dimension of less than 300 mm and/or if the article carriers have a lower dimensional stability, they are picked manually.

Processing a picking order can advantageously comprise the steps transporting one or multiple transport loading aid(s) containing the article carriers required for a picking order from the storage zone to the unloading station and providing the transport loading aid(s) either at one or at multiple semi-automated unloading device(s) or on a buffer surface close to the unloading device(s) using one or multiple autonomously movable, driverless transport vehicle(s) and stabilizing a position of the article carrier stack group by the transport safeguard during the transport movement of the loaded transport loading aid(s), manually unloading one or multiple ones of the transport loading aid(s), which is (are) provided at the semi-automated unloading device(s), by removing the article carriers required for processing the picking order, and manually assembling the article carriers on one or multiple target loading aids for the picking order, if the target loading aid(s) is (are) provided at the semi-automated unloading device(s).

Providing the transport loading aid(s) at one or multiple semi-automated loading device(s) may comprise the following steps taking over a transport loading aid from an autonomously movable, driverless transport vehicle to a lifting platform of the semi-automated unloading device(s), and providing the article carriers at a providing level by lifting the transport loading aid placed on the lifting platform in order to enable ergonomic unloading of the article carriers by a picker.

This enables ergonomic working even during manual picking (unloading the article carriers from the transport loading aid and loading the target loading aid with article carriers).

According to an embodiment of the invention, the method comprises the following steps transporting empty target loading aids using the autonomously movable, driverless transport vehicles to the unloading station and providing the empty target loading aids either at one or at multiple semi-automated unloading device(s) or on a buffer surface close to the unloading device(s) using one or multiple autonomously movable, driverless transport vehicle(s), and manually assembling the article carriers on one or multiple empty target loading aids for the picking order, if the empty target loading aid(s) is (are) provided at the semi-automated unloading device(s).

In this case, different article carriers (articles) are assembled to a picking order on a target loading aid.

According to an embodiment of the invention, the method comprises the following steps transporting partially loaded target loading target loading aid using the autonomously movable, driverless transport vehicles from the automatically operated unloading device to the semi-automated unloading device or to a buffer surface close to the semi-automated unloading device(s) after the articles carriers have been assembled on the partially loaded target loading aid at the automatically operated unloading device and if article carriers are still required for the picking order which are provided via the target loading aids at the semi-automated unloading device(s), and manually assembling the article carriers on one or multiple partially loaded target loading aids for the picking order, if the partially loaded target loading aid(s) is (are) provided at the semi-automated unloading device(s).

The picking order comprises article carriers (articles) which can be automatically picked at an automatically operated unloading device, and article carriers which have to be picked manually at a semi-automated unloading device. First, the article carriers (articles) on the target loading aid are picked at the automatically operated unloading device. Then, the target loading aid with the "opened" order stack is transported to the semi-automated unloading device by an autonomously movable, driverless transport vehicle. Then, picking of the order stack is finished at the semi-automated unloading device manually.

The following steps according to the invention are also advantageous transporting stack loading aids using the autonomously movable, driverless transport vehicles to the unloading station and providing one or multiple stack loading aid(s) either on one or on multiple the semi-automated unloading device(s) or on a buffer surface close to the semi-automated unloading device(s), and assembling the article carriers according to the picking order to the order stack on the target loading aid in the first stack loading aid or on the base wall part of the second stack loading aid, the first stack loading aid or second stack loading aid being provided at the semi-automated unloading device(s).

As already described above, reliable transport of the order stack is possible using the first stack loading aid/second stack loading aid, irrespective of which article carriers have been stacked. In case of manual picking, a stack layer is also filled starting from the corner from back to front and from left to right or from right to left. On the other hand, a stack layer can be filled starting from the corner from left to right or from right to left and back to front. An article carrier can be positioned and stacked precisely in the corner by the picker. In this way, the order stack is given a high degree of stability.

It also proves advantageous if the method comprises the following steps providing an order stack load securing station either with one or multiple automatically operated load securing device(s) or with one or multiple automatically operated load securing device(s) and a buffer surface close to the load securing device(s), the load securing devices being formed for secure transport of an order stack with a securing means, transporting the stack loading aids each loaded with at least one order stack using the autonomously movable, driverless transport vehicles to the order stack load securing station and providing one or multiple stack loading aid(s) either on one or on multiple automatically operated load securing device(s) or on a buffer surface close to the load securing device(s), removing the order stack from the stack loading aid using a lifting device, by means of which the target loading aid with the order stack is lifted from the first stack loading aid, if the picking warehouse comprises the first stack loading aid, or by means of which the order stack is lifted from the second stack loading aid if the picking warehouse comprises the second stack loading aid, securing the order stack by placing the securing means circumferentially around the order stack using the automatically operated load securing device, transporting the secured order stack, in particular using the autonomously movable, driverless transport vehicles, from the load securing station to a shipping zone, and transporting the unloaded stack loading aids using the autonomously movable, driverless transport vehicles, comprising transporting the first stack loading aid from the load securing station to the lading station with one or multiple automatically operated lading device(s), if a first stack loading aid is used in the picking warehouse, and/or transporting the second stack loading aid from the load securing station to the unloading station and providing the second stack loading aid(s) either at an automatically operated unloading device or on a buffer surface close to the unloading device, if a second stack loading aid is used in the picking warehouse.

The picking warehouse can comprise a "central" load securing station to which the order stacks with a first stack loading aid/second stack loading aid are transported using the autonomously movable, driverless transport vehicles. There, the order stack is secured with a securing means, for example a winding film or a fastening tape. The "secured" order stacks can preferably be transported away using the autonomously movable, driverless transport vehicles.

The object of the invention is also achieved by a picking warehouse for storing and picking articles containers that are stackable and contain articles, comprising an order-processing computer for acquiring a picking order and for determining articles which are required for the picking order, a delivery zone for providing article carrier stack groups comprising multiple article carriers arranged next to one another and on top of one another, a loading station, a storage zone, an unloading station, a plurality of autonomously movable, driverless transport vehicles, and a plurality of transport loading aids each configured for receiving an article carrier stack group, wherein the transport loading aids comprise empty transport loading aids, wherein the loading station has one or multiple automatically operated loading device(s) or one or multiple automatically operated loading device(s) and a buffer surface close to the loading device(s), wherein the loading device is formed for loading one of the empty transport loading aids with an article carrier stack group, wherein the empty transport loading aid is provided for loading with an essentially unchanged article carrier stack group at the automatically operated loading device, wherein the storage zone is configured for storing the transport loading aids loaded with article carrier stack groups on a storage surface, wherein the unloading station has one or multiple automatically operated unloading device(s) configured for unloading one or multiple transport loading aid(s) by removing the article carried required for processing the picking order from the article carrier stack group, and configured for assembling the article carriers required for processing the picking order, wherein the transport loading aid(s) is (are) provided for unloading at the automatically operated unloading device(s), and wherein the plurality of autonomously movable, driverless transport vehicles each have a chassis with a drive unit and a loading platform arranged on the chassis for receiving a transport loading aid, and are controlled by a control system to transport empty transport loading aids to the loading station and to provide one of the empty transport loading aids either at the automatically operated loading device or on the buffer surface close to the loading device; and to transport the transport loading aid loaded with the article carrier stack group from the loading station to the storage zone; and to transport one or multiple transport loading aid(s) containing the article carriers required for a picking order from the storage zone to an unloading station and to provide the transport loading aid(s) either at one or multiple automatically operated unloading device(s) or on a buffer surface close to the unloading device(s), and wherein at least some of the autonomously movable, driverless transport vehicles or at least some of the mobile transport loading aids provide a transport safeguard, the transport safeguard being configured for stabilizing a position of an article carrier stack group when the article carrier stack group is received on the mobile transport loading aid and is transported and/or unloaded.

It proves advantageous if the transport loading aid comprises a transport rack and a base, wherein the transport rack forms a transport frame against which a loading platform of the transport vehicle can be positioned, and wherein the base forms a base wall part on which the article carrier stack group can be placed.

It can prove favorable if the transport loading aid comprises additional side walls which form the transport safeguard for stabilizing a position of the article carrier stack group when the article carrier stack group is placed on the base wall part, and comprise a first side wall and a second side wall, wherein the first side wall and the second side wall enclose an angle, in particular a right angle.

It can prove favorable if at least some of the autonomously movable, driverless transport vehicles in each case comprises the loading platform and side walls arranged adjacent to the loading platform, wherein the side walls form the transport safeguard for stabilizing a position of the article carrier stack group when one of the transport vehicles and one of the transport loading aids are positioned to one another and the article carrier stack group is placed on the loading platform with the transport loading aid, and comprise a first side wall and a second side wall, wherein the first side wall and the second side wall enclose an angle, in particular a right angle.

Preferably, the transport vehicle is positioned below the transport loading aid and such with respect to the transport loading aid that the loading platform of the transport vehicle can be positioned against the transport frame.

It can prove favorable if the base wall part is both inclined downwardly at a first inclination angle with respect to a horizontal plane spanned between the first side wall and the second side wall in the direction towards the first side wall, and inclined downwardly at a second inclination angle with respect to a horizontal plane spanned between the first side wall and the second side wall in the direction towards the second side wall, wherein the first side wall and the second side wall are aligned perpendicularly to the base wall part.

According to this embodiment, the article carrier stack group, i.e. the order stack, can be transported with the transport loading aid, i.e. the stack loading aid, particularly reliably.

An advantageous embodiment results if the picking warehouse comprises a device for detecting data relating to the article carrier stack group and/or the article carrier and/or the article, and a data line connecting the device with a control system in order to transmit the data relating to the article carrier stack group and/or the article carrier and/or the article to the control system, wherein the control system comprises a control logic and processes the data relating to the article carrier stack group and/or the article carrier and/or the article in accordance with the control logic and generates control commands to control the unloading device(s), in particular a gripping unit of the unloading device, and/or generates transport commands to control the autonomously movable, driverless transport vehicle(s).

The data relating to the article carrier stack group can contain data selected from the group comprising a position scheme of the article carriers in the stack layers, a position image in the uppermost stack layer and a height of the article carrier stack group. The article carriers within a stack layer can be oriented either equally or differently. The stack layers arranged on top of one another can also be composed equally or differently. Based on this data, control commands for different gripping positions for gripping article carriers by the gripping system of the unloading device result.

Based on this data, on the other hand, transport commands for different transport movements for transporting the transport loading aid with the article carrier stack group by the autonomously movable, driverless transport vehicles can be generated. For example, it can be advantageous if the article carriers in one stack layer are oriented differently, such that the transport vehicle first provides the transport loading aid at the unloading device in a first provisioning position in order to remove article carriers of a first orientation and then provides the article carriers in a second provisioning position in order to remove article carriers of a second orientation. The first provisioning position and the second provisioning position are rotated in relation to one another for example by a rotational angle of 90°.

The data relating to the article carrier can be data selected from the group comprising a dimension (length, width, height) of the article carriers, material of the article carrier, design of the article carrier and a quality of the article carrier. For example, the article carriers can have different dimensions which can be determined to generate control commands for different gripping positions for gripping article carriers by the gripping system of the unloading device based on this data. The design of the article carrier can result in restrictions in the gripping positions when the order stack is formed. While a first design of an article carrier may, for example, comprise stacking lugs/stacking recesses on long sides, a second design of an article carrier may, for example, comprise stacking lugs/stacking recesses on short sides. A third design of an article carrier may, for example, not comprise any stacking lugs/stacking recesses.

The same applies to article carriers with or without carrying handles, ventilation holes, an insert cardboard, a lining with plastic film and the like. The data on a quality of the article carrier can relate to an inadmissible deformation, damage and the like.

The data relating to the articles can contain data selected from the group comprising quality features relating to the articles, number of articles in an article carrier and a position of the articles, for example in a blister. The quality features can, for example, contain data on a check of the articles for mold infestation, data on a check of the articles for damage, as also described above for the checking station.

An advantageous embodiment results if the picking warehouse comprises a checking station in the delivery zone with one or multiple testing device(s) for checking quality features of the articles in the article carriers, a conveying system for inward transport of an article carrier stack group and for outward transport of an article carrier stack group, a detecting device for identifying the article carrier stack group connected to the control system via a data line, and an input and/or output device to input data from the check of the quality features connected to the control system via a data line.

If the picking warehouse and method for storing and picking articles are used in the fresh food sector of groceries, where perishable articles, such as fruit and vegetables, quality features such as mold, damage and the like can be optically detected at the testing device. At the input and/or output device, the result of the check of the quality features is detected, for example the warehouse staff can electronically acquire the quality feature by inputting "quality okay" or "quality deficient". Moreover, the input of the number of removed article carriers is also possible if individual article carriers were removed from the article carrier stack group because these individual article carriers, for example, contain spoiled articles.

According to an embodiment of the invention, the checking station can comprise an automatically operated clamping and lifting device along the conveying system for inwardly transporting an article carrier stack group and outwardly transporting an article carrier stack group, wherein the clamping and lifting device is configured for separating the article carrier stack group into an upper article carrier stack and a lower article carrier stack in order to create an access region between the upper article carrier stack and the lower article carrier stack, the access region allowing the removal of at least one article carrier from the lower article carrier stack or of an article from an article carrier of the lower article carrier stack.

Thereby, checking the quality of the articles can be performed not only in the uppermost stack layer but also in a lower stack layer. This is particularly advantageous for picking groceries in the fresh food sector. Ventilation is usually poorer in the lower stack layers, which is why the quality of the articles there tends to be poorer than in the upper stack layers.

In order to take safety aspects into account, automatically operated protective plates can be moved into the access region between the upper article carrier stack and the lower article carrier stack in order to preclude any risk to a warehouse worker during manual removal of articles or article carriers.

It is also advantageous if the clamping device comprises clamping jaws movable by at least one drive device relative to one another between an opened position and a clamping position, the clamping jaws in the clamping position clamping the article carrier stack group along the circumference of at least one article carrier layer (stack layer) and on at least two sides, and the lifting device comprises a lifting frame movable by at least one drive device in the vertical direction relative to the conveying system for inward transport of an article carrier stack group and outward transport of an article carrier stack group, the clamping jaws being mounted on the lifting frame, wherein the lifting frame is configured for moving the clamping jaws from a lower height position into an upper height position in which the upper article carrier stack of the article carrier stack group is lifted off the lower article carrier stack of the article carrier stack group.

BRIEF DESCRIPTION OF THE DRAWINGS

For the purpose of better understanding of the invention, it will be elucidated in more detail by the figures below.

These show in a respectively very simplified schematic representation:

FIGS. 1a, 1b a possible embodiment of a picking warehouse for storing and picking articles in a perspective view;

FIG. 2b an enlarged detail of the picking warehouse for storing and picking articles with a loading station, a lading station and a load securing station in a perspective view;

FIGS. 4a, 4b, 4c a first embodiment of a transport loading aid in different views;

FIG. 5 a second embodiment of a transport loading aid in a perspective view;

FIGS. 7a, 7b, 7c a first embodiment of a stack loading aid in different views;

FIGS. 8a, 8b a second embodiment of a stack loading aid without an order stack and with an "opened" order stack in a perspective view;

FIG. 10 a fourth embodiment of a stack loading aid in a perspective view.

DETAILED DESCRIPTION OF PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

It should be noted at this point that the articles 2 are not shown in the figures for the sake of better overview. However, in fact, the article carriers 3 are filled with articles 2.

Figure 1A:
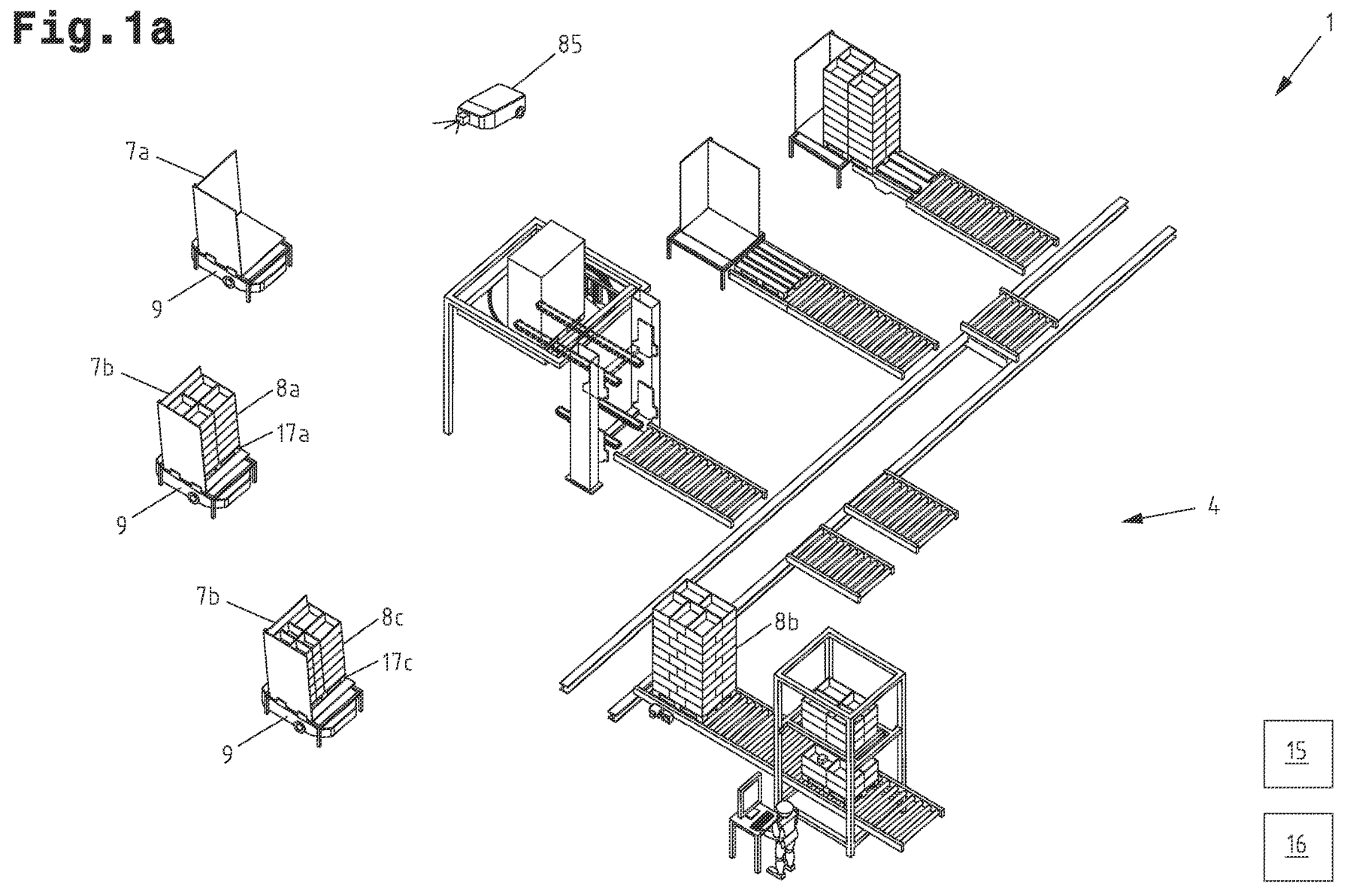
Figure 1B:
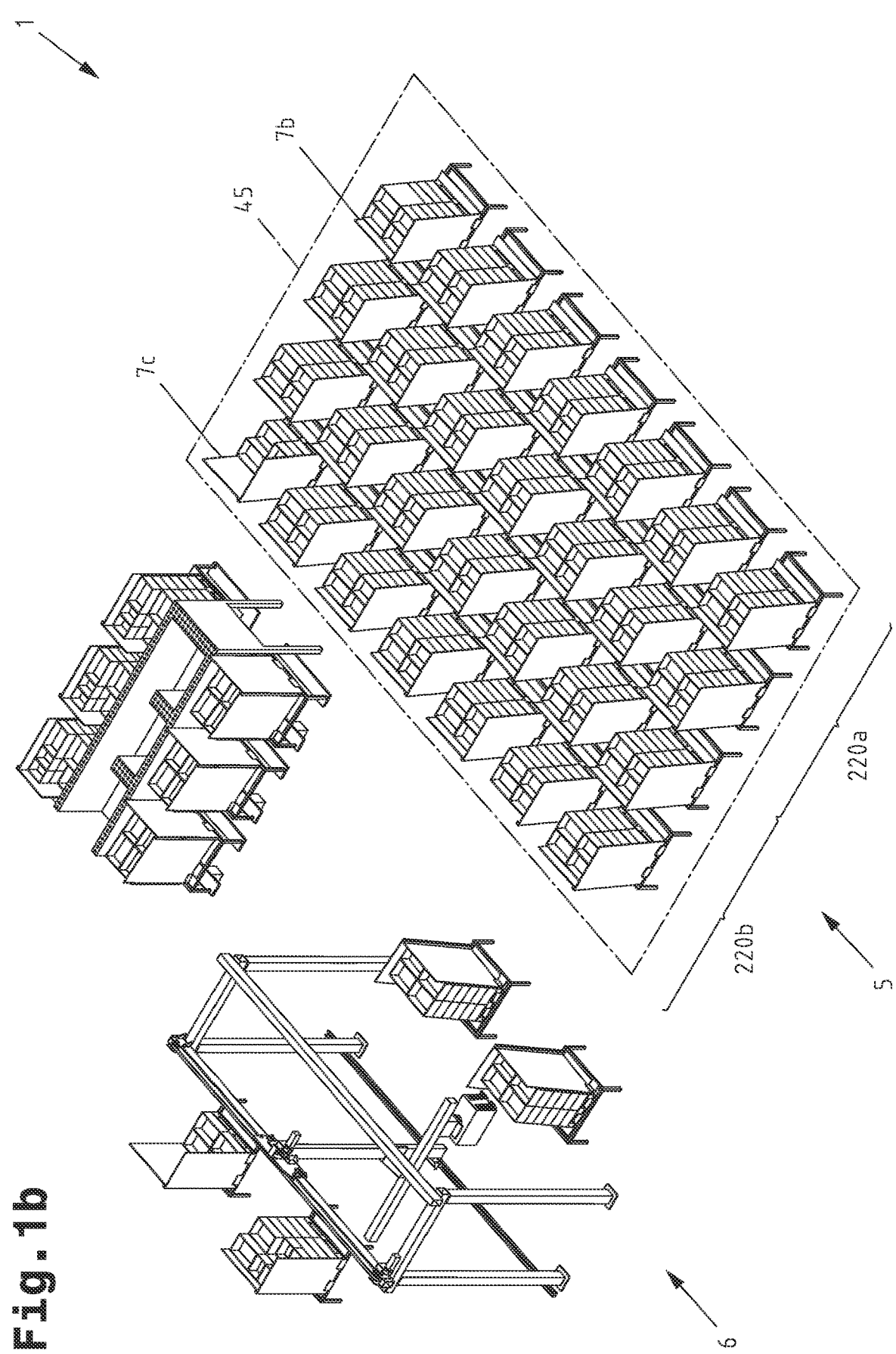

FIGS. 1a and 1b show an embodiment of a picking warehouse 1 for storing and picking article carriers 3 that contain articles 2 (as only shown in FIG. 2a for reasons of clarity) and are stackable. FIGS. 2a to 2e show individual sections from the picking warehouse 1.

The picking warehouse 1 comprises a delivery zone 4, a storage zone 5, an order processing zone 6, a plurality of transport loading aids 7a, 7b, 7c each for receiving an article carrier stack group 8a, 8b, 8c and a plurality of autonomously movable, driverless transport vehicles 9 for transporting transport loading aids 7a, 7b, 7c, a loading station with at least one or multiple automatically operated loading device(s) 10 for loading the transport loading aids 7a and an unloading station with at least one or multiple automatically operated unloading device(s) 11 for unloading the transport loading aid(s) 7b, 7c.

The article carrier stack group 8a, 8b, 8c forms an incoming article unit and can comprise a delivery load carrier 17a, 17b, 17c.

The transport loading aids 7a are, for example, empty (unloaded) transport loading aids. The transport loading aids 7b are, for example, completely loaded transport loading aids. The transport loading aids 7c are, for example, partially loaded transport loading aids.

As schematically depicted in FIG. 1a, the picking warehouse 1 comprises an order-processing computer 15 for acquiring picking orders and for determining articles 2 which are required for the picking order. In this regard, a picking order comprises one order line (for example six article carriers 3 with a first article 2) or multiple order lines (for example three article carriers 3 with a first article 2 and three article carriers 3 with a second article 2). A sales order comprises at least one picking order. The picking orders are present in the form of data sets and are electronically acquired by the order-processing computer 15 and transmitted to a control system 16. Each picking order comprises one or multiple order lines. If the picking order specifies multiple order lines, different articles 2 are needed. Each order line has at least specifications on a number of pieces of an ordered article 2 and on a type of article.

In the delivery zone 4, article carrier stack groups 8a, 8b, 8c (incoming article units) are provided. Such article carrier stack groups 8a, 8b, 8c are most times made up of article carriers 3 containing articles of just one type. The article carrier stack groups 8a, 8b comprise article carriers 3 that are arranged on top of one another (stacked). In particular, the article carrier stack groups 8a, 8b, 8c comprise stack layers located above one another, wherein each of the stack layers comprises multiple article carriers 3 arranged next to one another. The article carriers 3 within one stack layer are oriented either equally or differently. The stack layers can in turn have the same or different compositions.

Figure 2A:
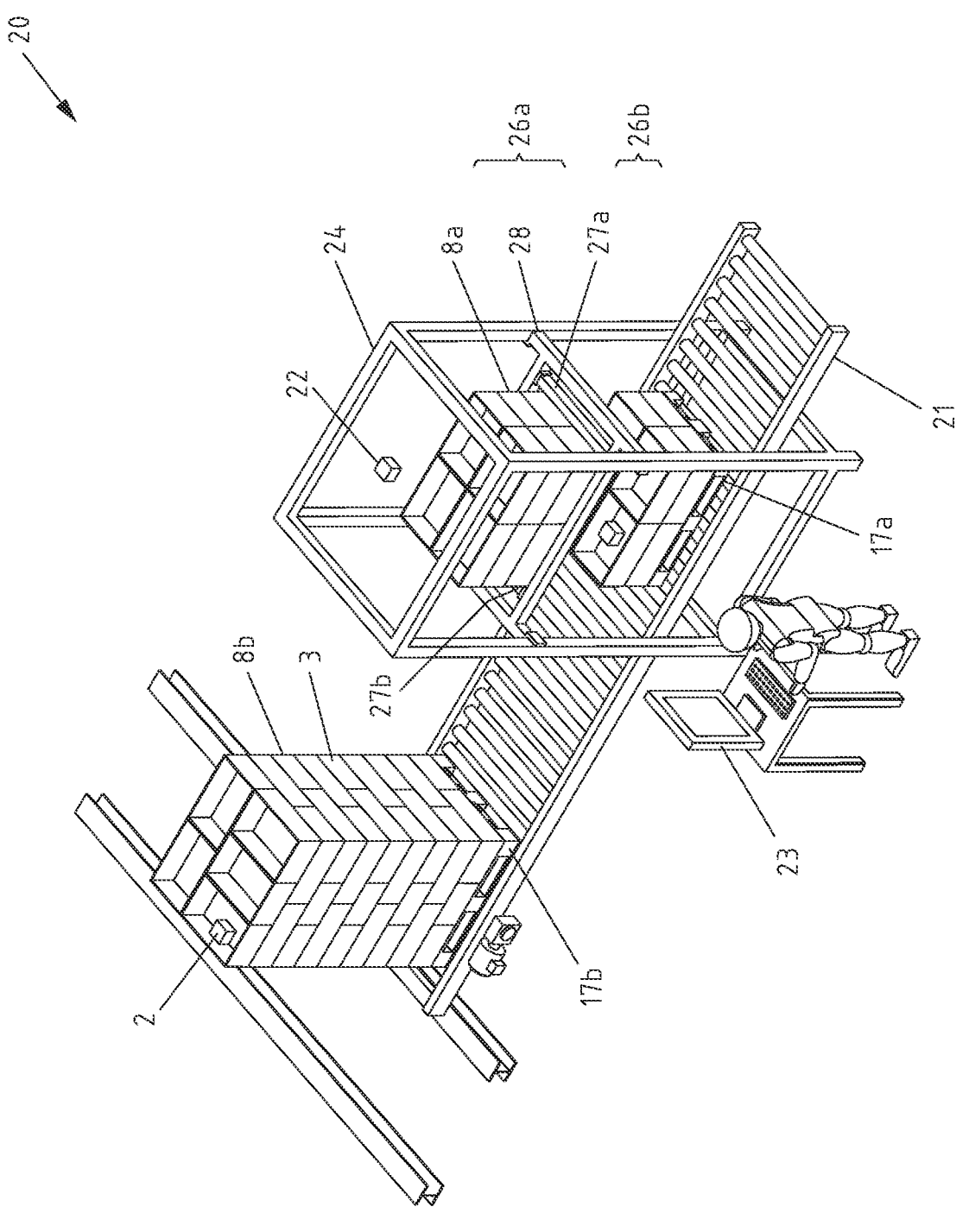
FIG. 2a a checking station with a testing device for checking quality features of the articles in the article carriers in a perspective view.

The article carrier stack group 8a shown in FIGS. 1a, 2a by way of example comprises article carrier stacks arranged next to one another each made up of multiple article carriers 3 arranged on top of one another. According to this embodiment, the article carriers 3 are oriented equally per stack layer. The article carrier stack corresponds to a column-like article carrier stack.

The article carrier stack group 8b shown in FIGS. 1a, 2a by way of example comprises differently oriented article carriers 3 per stack layer and differently oriented stack layers. According to this embodiment, the article carriers 3 in a lower stack layer and the article carriers 3 in an upper stack layer are oriented differently, such that no column-like article carrier stacks are present. Hence, a stable article carrier stack is achieved also for smaller article carriers 3. According to an embodiment shown in FIG. 1a, the article carrier stack group 8c comprises differently oriented article carriers 3 per stack layer, but equally oriented stack layers. According to this embodiment, the article carriers 3 in a lower stack layer and the article carriers 3 in an upper stack layer are oriented equally, such that column-like article carrier stacks are present.

Usually, the article carriers 3 are delivered to the delivery zone 4 on delivery load carriers 17a, 17b, 17c as an article carrier stack group 8a, 8b, 8c. According to the statements above, the article carrier stack group 8a, 8b, 8c can accordingly comprise the delivery load carrier 17a, 17b, 17c. Even if the article carrier stack groups 8a, 8b are provided on delivery load carriers 17a, 17b, 17c, a separation into article carriers 3 or article carrier stacks at a depalletizing station is not provided. The article carrier stack group 8a, 8b, 8c is fed to the loading station essentially unchanged. In this context, essentially unchanged means that no depalletizing operation is performed before loading an empty transport loading aid 7a.

The delivery load carriers 17a, 17b, 17c are preferably pallets which are used in practice in different designs and dimensions. For example, these are Euro pallets, industrial pallets, Düsseldorfer pallets. Of course, other pallets may also be used in the context of the invention. The Euro pallet has an outer dimension of 1,200 mm×800 mm. The industrial pallet has an outer dimension of 1,200 mm×1,000 mm. The Düsseldorfer pallet has an outer dimension of 800 mm×600 mm or 600 mm×400 mm.

FIG. 2a shows the article carrier stack group 8a on a Euro pallet and the article carrier stack group 8b on an industrial pallet.

However, in general, it is also possible that the article carriers 3 are provided in the delivery zone 4 as an article carrier stack group 8a, 8b, 8c without an additional delivery load carrier 17a, 17b, 17c. According to this embodiment, the article carrier stack group 8a, 8b, 8c comprises no additional delivery load carrier 17a, 17b, 17c. Such an article carrier stack group 8a, 8b, 8c is also fed to the loading station essentially unchanged. In this context, essentially unchanged means that no depalletizing operation is performed before loading an empty transport loading aid 7a.

FIGS. 1a and 2a show a possible embodiment in which a checking station is arranged in the delivery zone 4, comprising one or multiple testing device(s) 20 for checking quality features of the articles 2 in the article carriers 3, an (automatically operated) conveying system, referred to by number 21, for inwardly transporting an article carrier stack group 8a, 8b, 8c (with or without a delivery load carrier) and outwardly transporting an article carrier stack group (with or without a delivery load carrier), a detecting device 22 for identifying the article carrier stack group 8a, 8b, 8c connected to the control system 16 (FIG. 1a) via a data line which is not shown in further detail, and an input and/or output device 23 for inputting data from the check of the quality features, which is connected to the control system 16 (FIG. 1a) via a data line which is not shown in further detail.

According to the embodiment shown, the article carrier stack group 8a, 8b, 8c is conveyed on the conveying system 21 for inwardly transporting an article carrier stack group 8a, 8b, 8c and outwardly transporting an article carrier stack group 8a, 8b, 8c on a delivery load carrier 17a, 17b, 17c. The conveying system may comprise a roller conveyor, belt conveyor, chain conveyor and the like.

As shown in FIGS. 1a and 2a, a warehouse worker can be provided at the testing device 20 for checking quality features of the articles 2 in the article carriers 3. According to the embodiment shown, the testing device 20 is semi-automated.

The detecting device 22 for identifying the article carrier stack group 8a, 8b, 8c can be formed by a mobile or stationary scanner. As is shown, for example, in FIG. 2c, data carriers 25a (RFID, barcode) can be applied to the article carriers 3 of the article carrier stack group 8a, 8b, 8c and/or a data carrier 25b (RFID, barcode) can be applied to the article carrier stack group 8a, 8b, 8c.

According to the embodiment shown, the identification of the article carrier stack group 8a, 8b, 8c is performed at the testing device 20, although it can also be performed before the testing device 20. This can be the case if the article carrier stack group 8a, 8b, 8c is fed to an unpacking station before the testing device 20, where, for example, a packaging film (stretch film or shrink film) with which the article carrier stack group 8a, 8b, 8c is packed, or a strapping tape with which the article carrier stack group 8a, 8b, 8c is strapped, is removed. For example, a data carrier (RFID, barcode) can be arranged on the packaging film, wherein the article 2 or the article carrier 3 or the article carrier stack group 8a, 8b, 8c is identified by reading the data carrier.

If the picking warehouse and method for storing and picking articles are used in the fresh food sector of groceries, where perishable articles 2, such as fruit and vegetables, are stored and picked, quality features such as mold, damage and the like can be optically detected at the testing device 20.

At the input and/or output device 23, the result of the check of the quality features is detected, for example the warehouse staff can electronically detect the quality feature by inputting "quality okay" or "quality deficient".

Moreover, the input of the number of removed article carriers 3 is also possible if individual article carriers 3 were removed from the article carrier stack group 8a, 8b, 8c because these individual article carriers 3, for example, contain spoiled articles 2.

According to this embodiment, the input of data from the check of the quality features is performed manually by the warehouse worker.

However, it is also possible that the check of the quality features is performed automatically, for example by an image processing system, wherein images of the articles 2 are captured by a camera system and the images are compared with standard values of the articles 2 stored in a computer system by an image processing program, in order to perform an evaluation on the quality features from the comparison. According to this embodiment, the camera system forms an input device and the image processing program forms an output device.

The checking station comprises an automatically operated clamping and lifting device 24 along the conveying system for inwardly transporting an article carrier stack group 8a, 8b, 8c and outwardly transporting an article carrier stack group 8a, 8b, 8c, wherein the article carrier stack group 8a, 8b, 8c can be separated into an upper article carrier stack 26a and a lower article carrier stack 26b using the clamping and lifting device 24 in order to create an access region between the upper article carrier stack 26a and the lower article carrier stack 26b, the access region allowing the removal of at least one article carrier 3 from the lower article carrier stack 26b or of an article 2 from an article carrier 3 of the lower article carrier stack 26b.

The clamping device comprises clamping jaws 27a, 27b movable relative to one another between an opened position and a clamping position by at least one drive device (which is not shown in further detail). In the clamping position, the clamping jaws 27a, 27b clamp the article carrier stack group 8a, 8b, 8c along the circumference of at least one stack layer and/or article carrier layer and on at least two sides. The lifting device comprises a lifting frame 28 movable by at least one drive device (which is not shown in further detail) in the vertical direction relative to the conveying system 21. The clamping jaws 27a, 27b are mounted on the lifting frame 28 and the clamping jaws 27a, 27b can be moved from a lower height position into an upper height position using the lifting frame 28. In the upper height position, the upper article carrier stack 26a of the article carrier stack group 8a, 8b, 8c is lifted off the lower article carrier stack 26b of the article carrier stack group 8a, 8b, 8c.

It should be noted at this point that the checking station is not obligatorily required in the embodiment above. If the checking station is not provided, a detecting device 22 is used for identifying the article carrier stack group 8a, 8b, 8c which is connected to the control system 16 (FIG. 1a) via a data line not shown in further detail. In this case, the detecting device 22 is provided, for example, in the unpacking station described above.

Figure 2B:
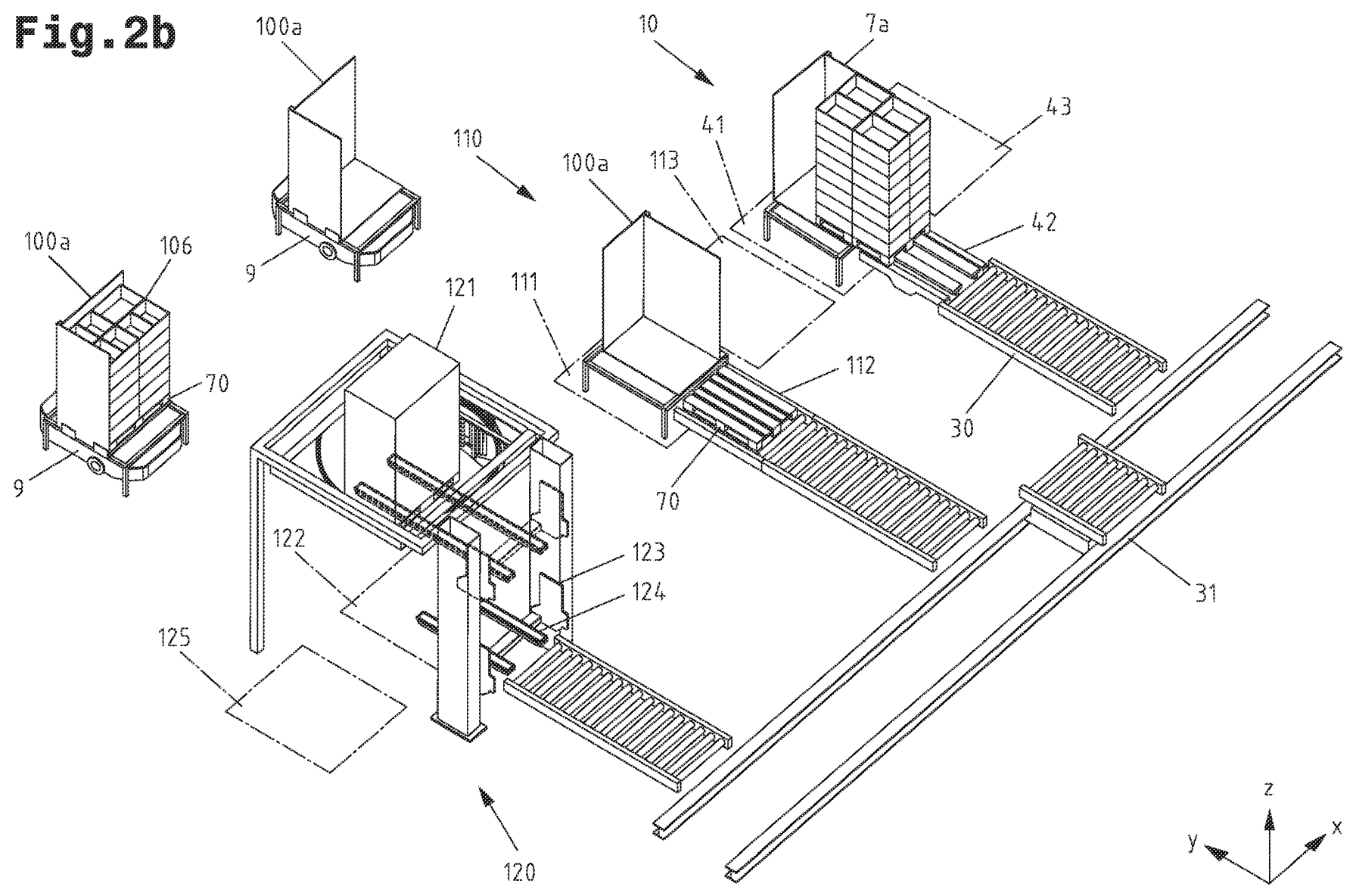
Figure 2C:
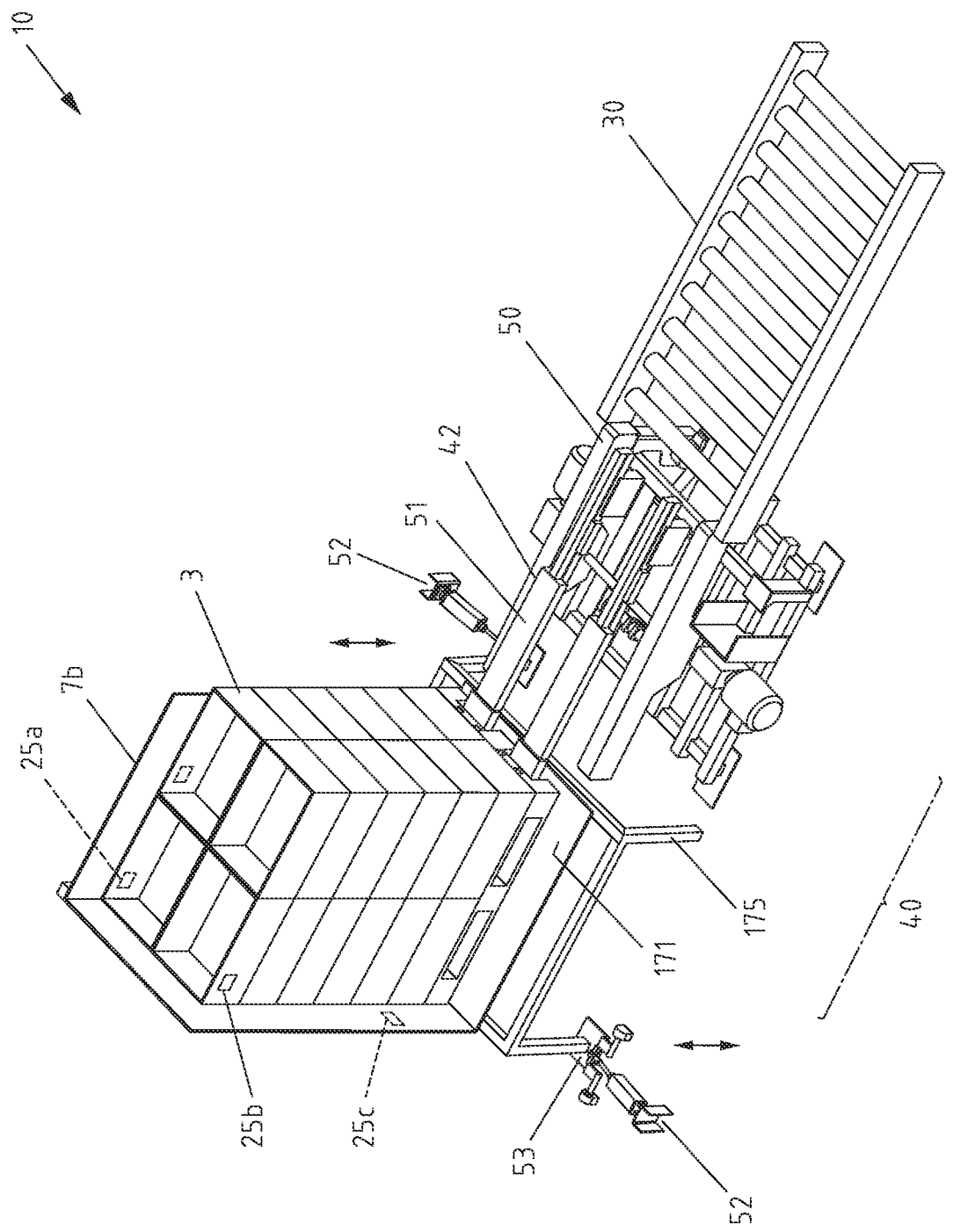
FIG. 2c a possible embodiment of an automatically operated loading device of the loading station in a perspective view.

FIGS. 1a, 2b and 2c show a possible embodiment in which a loading station with one or multiple automatically operated (schematically indicated) loading device(s) 10 is/are arranged in the delivery zone 4.

The loading device(s) 10 is/are preferably connected to an automatically operated conveying system, referred to by number 30, for inward transport of article carrier stack groups 8a, 8b, 8c. The conveying system may comprise a roller conveyor, belt conveyor, chain conveyor and the like.

If the optional checking station is provided, the loading device(s) 10 and the testing device(s) are additionally connected via a conveying system, referred to by number 31, for inwardly transporting article carrier stack groups 8a, 8b, 8c (incoming article units). In the embodiment shown, the conveying system comprises a transport trolley movable along a guideway in x direction. However, the conveying system 31 may also comprise a roller conveyor, belt conveyor, chain conveyor and the like.

As will be described below, the loading station comprises one or multiple automatically operated (schematically indicated) loading device(s) 10 for loading empty transport loading aids 7a each with a (preferably unpacked) article carrier stack group 8a.

The loading device 10 comprises a provisioning location 40 for an article carrier stack group 8a, 8b, 8c, a provisioning location 41 for an empty transport loading aid 7a and a transfer device 42 for transferring the article carrier stack group 8a, 8b, 8c from the provisioning location 40 onto an empty transport loading aid 7a, which is placed at the provisioning location 41.

Specifically, the automatically operated loading device 10 comprises a transfer device 42 movable relative to the provisioning location 40 in order to move an article carrier stack group 8a, 8b, 8c placed on the provisioning location 40 in a transfer position to the transport loading aid 7a "unchanged".

Even though, in the depicted embodiment, the loading station is shown having a single loading device 10 for reasons of clarity, the number of loading devices 10 may vary depending on the required picking performance. For example, the loading station and/or the picking warehouse 1 may have a second loading device 10, third loading device 10 etc. These loading devices 10 are preferably constructed identically.

It also proves advantageous if the loading station has a separate buffer surface 43 near the one or near the multiple loading device(s) 10. However, in principle, the loading station may also comprise only one buffer surface 43. The buffer surface 43 is preferably formed on a floor of the picking warehouse 1.

This way, it is possible that the empty transport loading aid(s) 7a are buffered on the buffer surface 43, near the loading device(s) 10, and are transported as needed to the respective provisioning location 41 of the loading device(s) 10 over a short distance using the transport vehicles 9.

According to the invention, consequently, the loading station i) either comprises one or multiple automatically operated loading device(s) 10 or ii) one or multiple automatically operated loading device(s) 10 and a buffer surface 43 close to the loading device(s) 10. The loading device 10 is embodied for loading one of the empty transport loading aids 7a with an article carrier stack group 8a, 8b, 8c (with or without delivery load carrier 17a, 17b, 17c). The empty transport loading aid 7a is provided at the automatically operated loading device 10 for loading with an essentially unchanged article carrier stack group 8a, 8b, 8c (with or without delivery load carrier 17a, 17b, 17c).

As depicted in FIG. 1a, an empty transport loading aid 7a may be transported to the provisioning location 41 transports using an autonomously movable, driverless transport vehicle 9 and be placed there. While loading the empty transport loading aid 7a, the transport vehicle 9 may be used for other transport purposes.

However, in principle, it is also possible that the autonomously movable, driverless transport vehicle 9 transports an empty transport loading aid 7a to the provisioning location 41 and places the empty transport loading aid 7a at the provisioning location 41, however, remains at the provisioning location 41 while the empty transport loading aid 7a is loaded. If an empty transport loading aids transport loading aid 7a is already placed at the provisioning location 41 or if the empty transport loading aid 7a is currently being loaded, the empty transport loading aid 7a can be buffered on the buffer surface 43 provided near the loading device 10.

After being loaded with at least one article carrier stack group 8a, 8b, 8c, the (now loaded) transport loading aid 7b is transported from the loading station, in particular from the loading device 10 or the loading devices 10, to the storage zone 5 using the autonomously movable, driverless transport vehicle 9 and are placed on a storage surface 45 in the storage zone 5. The storage surface 45 is preferably formed on a floor of the picking warehouse 1. As will be described below, using the autonomously movable, driverless transport vehicles 9, also at the unloading station, not completely unloaded (partially loaded) "opened" transport loading aids 7c are transported from the unloading station back to the storage zone 5 and placed on the storage surface 45 in the storage zone 5.

FIG. 2c shows a possible embodiment of an automatically operated loading device 10. The loading device 10 is preferably connected to the automatically operated conveying system, referred to by number 30, for inward transport of article carrier stack groups 8a, 8b, 8c (incoming article units).

The loading device 10 comprises the provisioning location 40 for an article carrier stack group 8a, 8b, 8c, the provisioning location 41 for an empty transport loading aid 7a (or a loaded transport loading aid 7b after loading) and the transfer device 42 for transferring the article carrier stack group 8a, 8b, 8c from the provisioning location 40 onto an empty transport loading aid 7a, which is placed at the provisioning location 41.

Specifically, the provisioning location 40 for an article carrier stack group 8a, 8b, 8c is formed on a conveying system, referred to by number 50, for example a multiple track conveyor, which connects to the conveying system, referred to by number 30, and places the article carrier stack group 8a, 8b, 8c in the transfer position on the provisioning location 40.

The transfer device 42 comprises telescopic forks 51, see FIG. 2c, movable in the vertical direction relative to the provisioning location 40 between a lowered starting position and a raised receiving position and in the horizontal direction relative to the provisioning location 40 between a retracted initial position and a projecting transfer position.

In FIG. 2b an article carrier stack group 8a, 8b, 8c previously transferred onto the telescopic fork 51 is just being transferred onto the empty transport loading aid 7a. In FIG. 2c, the telescopic forks 51 are in the projecting transfer position and the article carrier stack group 8a, 8b, 8c is located on the transport loading aid 7a.

Irrespectively of how the loading device 10 is designed, it can be advantageous if the provisioning location 41 comprises tilting and back tilting devices 52 by which the empty transport loading aid 7a can be tilted such prior to loading that a base wall part 171 is moved into an essentially horizontal transport plane (take-over plane). Such an embodiment can be applied if the transport loading aid 7a, 7b, 7c is embodied according to FIGS. 4a to 4c, 6 and has no horizontal base wall part 171. The tilting and back tilting devices 52 can each comprise a placing plate 53 on which feet 175 (three or four feet 175) of the transport loading aid 7a, 7b, 7c are placed. Three or four tilting and back tilting devices 52 are provided. Hence, loading the transport loading aid 7a, 7b, 7c can be simplified if these are embodied according to FIGS. 4a to 4c, 6.

Figure 2D:
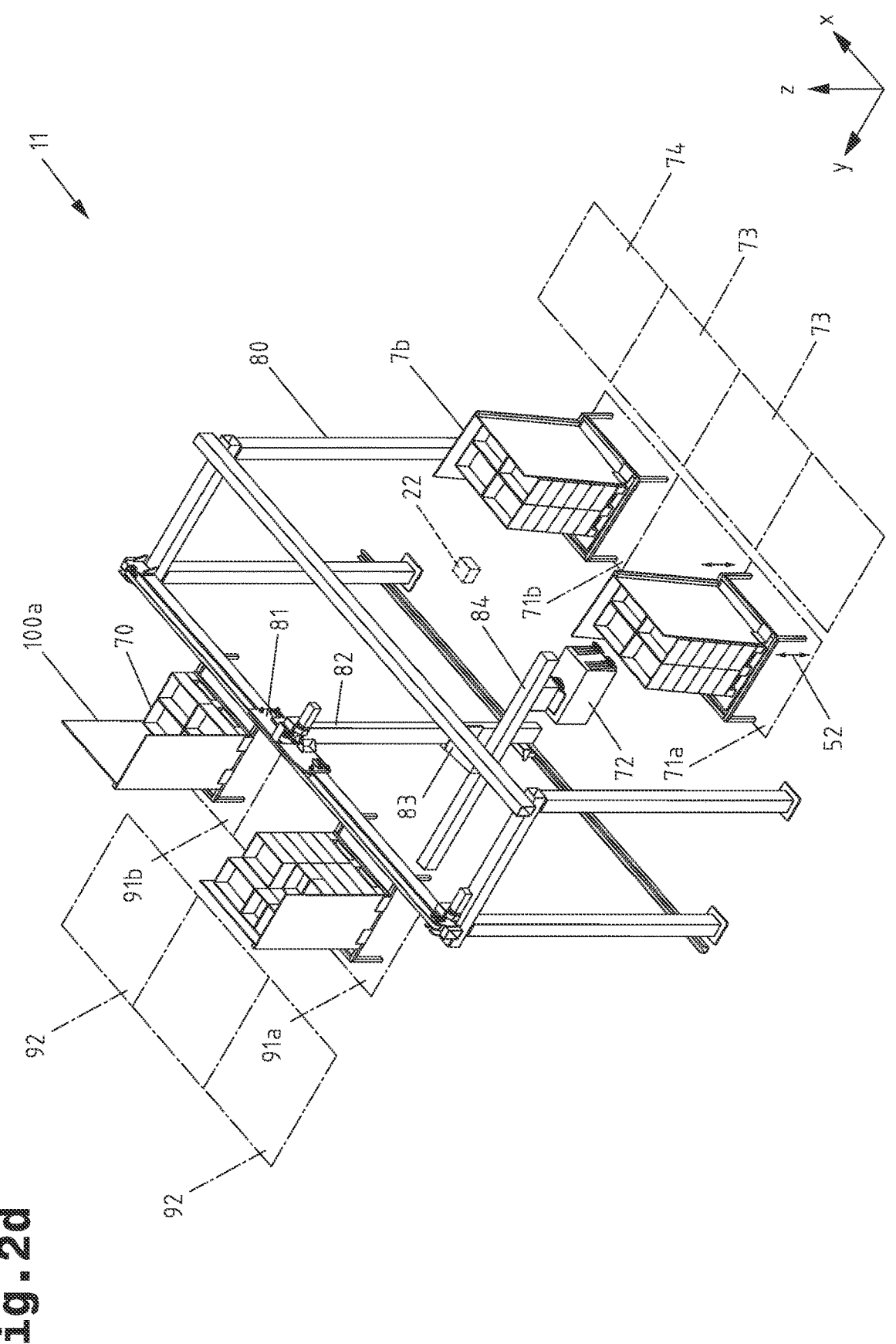
FIG. 2d a possible embodiment of an automatically operated unloading device of an unloading station of the picking warehouse in a perspective view.

As can be seen in FIGS. 1b and 2d, an unloading station with one or multiple automatically operated unloading device(s) 11 is arranged in the order processing zone 6, wherein individual article carriers 3 or article carrier stack can be transferred from the transport loading aid 7b, 7c to a target loading aid 70 using the unloading device 11. According to the embodiment shown, the one or multiple automatically operated unloading device(s) 11 at the same time forms one or multiple automatically operated reloading device(s) and/or picking device(s) for assembling the article carriers 3 on the target loading aid(s) 70 according to the picking order.

As described in the following, the unloading station comprises the at least one automatically operated unloading device 11 (schematically adumbrated). Even though, in the depicted embodiment, the unloading station is shown having a single unloading device 11 for reasons of clarity, the number of unloading devices 11 may vary depending on the required picking performance. For example, the unloading station and/or the picking warehouse 1 can comprise a second unloading device 11, third unloading device 11, and so on. These unloading devices 11 are preferably constructed identically.

The schematically shown embodiment of the automatically operated unloading device 11 comprises a first provisioning location 71a for the loaded first transport loading aid 7b, 7c, an (optional) second provisioning location 71b for the loaded second transport loading aid 7b, 7c and a transfer device 72 movable relative to the provisioning location 71a, 71b for unloading the transport loading aid 7a, 7b provided at the provisioning location 71a, 71b. If the unloading station has more than one automatically operated unloading devices 11, each unloading device 11 comprises a first provisioning location 71a for the loaded first transport loading aid 7b, 7c, and an (optional) second provisioning location 71b for the loaded second transport loading aid 7b, 7c and a transfer device 72 movable relative to the provisioning location 71a, 71b for unloading the transport loading aid 7b, 7c placed at the provisioning location 71a, 71b.

It also proves advantageous if the unloading station has at least one separate buffer surface 73 near the unloading device 11 or near each unloading device 11. In the depicted embodiment, the unloading device 11 is assigned one buffer surface 73 per provisioning location 71a, 71b.

However, in principle, the unloading station may also comprise only one buffer surface 73. The buffer surface 73 is preferably formed on a floor of the picking warehouse 1. This way, it is possible that the loaded transport loading aid(s) 7b, 7c are buffered on the buffer surface 73, near the unloading device(s) 11, and are transported as needed to the respective provisioning location 71a, 71b of the unloading device(s) 11 over a short distance using the transport vehicles 9.

The unloading station can also comprise one or multiple waiting zone(s) 74 (shown in FIG. 2d). A transport loading aid 7c can be placed at the waiting zone 74 or at the waiting zones 74 after removing at least one article carrier 3, if not all article carriers 3 have been removed from the transport loading aid 7c and if these article carriers 3 are needed at the unloading device 11 or one of the unloading devices 11 for an already advised picking order. However, in principle, the loading station may also comprise only one waiting zone 74. This way, it is possible that the partially unloaded transport loading aid(s) 7c are buffered in the waiting zone 74, near the unloading device(s) 11, and are transported as needed to the respective provisioning location 71a, 71b of the unloading device(s) 11 over a short distance using the transport vehicles 9.

The unloading device 11 shown in further detail in FIG. 2d comprises a gantry robot according to a first embodiment. Gantry robots are understood to be industrial robots, which in their base axes are constructed from linear axles. An area gantry is used for loading.

The gantry robot comprises
i) vertical uprights, longitudinal beams and transverse beams, which are connected to one another, forming a support construction 80.
ii) a first gantry slide 81 mounted on the support structure 80 and horizontally movable in a first direction (x-direction) along a guide assembly (which is arranged on one of the longitudinal beams) via a first drive device,
iii) a gantry arm 82 affixed to the first gantry slide 81 and movable therewith in the first direction (x-direction), iv) a second gantry slide 83 mounted on the gantry arm 82 and vertically movable in a second direction (z-direction) along a guide assembly via a second drive device, v) a third gantry slide 84 arranged on the second gantry slide 83 and horizontally movable in a third direction (y-direction) along a guide assembly via a third drive device, and vi) the transfer device 72 arranged on the third gantry slide 84 and mounted on the third gantry slide 84 so as to be rotatable about a vertical axis.

The shown gantry robot proves advantageous if the available ceiling height is low.

In the course of the unloading movement, the article carrier 3, partial article carrier stack or article carrier stack is picked up from the transport loading aid 7*b*, 7*c*, which is placed at the provisioning location 71*a*, 71*b*, by the transfer device 72, and subsequently transferred onto a target loading aid, 70, 170.

In this context, it can be advantageous if the picking warehouse 1 uses stack loading aids, which comprise first stack loading aids 100*a* (see FIGS. 7*a* to 7*c*, 8*a*, 8*b*, 9) which are loaded with the target loading aid 70, for example a pallet.

If instead of the first stack loading aids 100*a* second stack loading aids 100*b* (see FIG. 10) are used in the picking warehouse 1, the second stack loading aid 100*b* forms the target loading aid 170. In this case, a lading station described in the following may be omitted. Contrary to the above-mentioned embodiment, in which the first stack loading aid 100*a* is equipped with the target loading aid 70, an additional target loading aid 70 is not provided in this embodiment.

If the picking warehouse 1 comprises the first stack loading aids 100*a*, the article carrier 3, partial article carrier stack or article carrier stack is picked up by the transfer device 72 from the transport loading aid 7*b*, 7*c*, which is provided at the provisioning location 71*a*, 71*b*, and subsequently transferred onto the target loading aid 70.

If the picking warehouse 1 comprises the second stack loading aids 100*b*, the article carrier 3, partial article carrier stack or article carrier stack is picked up by the transfer device 72 from the transport loading aid 7*b*, 7*c*, which is placed at the provisioning location 71*a*, 71*b*, and subsequently transferred onto the target loading aid 170.

The transfer device 72 may for example be formed by a gripping system. The gripping system may comprise for example a base body, a vacuum suction unit with at least one suction gripper or multiple suction grippers arranged on top of one another and/or next to one another and a support base movably mounted on the base body. Unloading the transport loading aid 7*b*, 7*c* with this gripping system is performed such that an article carrier 3 or a partial article carrier stack is first lifted on one side by the suction unit so that a gap opens between the top article carrier 3 and the one below it and the support base is then pushed in under the article carrier 3 lifted on one side or the partial article carrier stack lifted on one side using the suction unit in a horizontal direction so as to receive the article carrier 3 or partial article carrier stack. Such a gripping system thus makes it possible to unload an individual article carrier 3 but also a partial article carrier stack. In principle, it is also conceivable that the number of suction grippers arranged on top of one another is selected such that an entire article carrier stack can be lifted on one side and the support base can receive the entire article carrier stack.

Moreover, the gripping system may also be configured such that a gripping unit acts according to the positive engagement principle and/or friction principle and grips an individual article carrier 3, partial article carrier stack or article carrier stack in a positively engaging or friction-type manner.

According to a second embodiment, which is not depicted, the unloading device 11 may comprise a jointed-arm robot. The jointed-arm robot has a gripping system which is movable relative to a robot base and by means of which an individual article carrier 3, a partial article carrier stack or an article carrier stack 8*b*, 8*c* is removed from the transport loading aid 7*b*, 7*c* and then transferred onto a target loading aid 70, 170.

The schematically shown embodiment of the automatically operated unloading device 11 comprises a provisioning location 91*a* for a first stack loading aid 100*a* (or second stack loading aid 100*b*) or multiple provisioning locations 91*a*, 91*b* for first stack loading aids 100*a* (or second stack loading aids 100*b*) and the transfer device 72 that is movable relative to the provisioning location 91*a*, 91*b* for loading the transport loading aid 70, 170 placed at the provisioning location 91*a*, 91*b*.

If the unloading station has more than one automatically operated unloading device 11, each unloading device 11 comprises a provisioning location 91*a* for a target loading aid 70, 170 or multiple provisioning locations 91*a*, 91*b* for target loading aids 70, 170 and the transfer device 72 that is movable relative to the provisioning location 91*a*, 91*b* for loading the transport loading aid 70, 170 placed at the provisioning location 91*a*, 91*b*.

As described above, the (additional) target loading aid 70 with the first stack loading aid 100*a* may be provided at the provisioning location 91*a*, 91*b* or the target loading aid 170 (which is formed by the second stack loading aid 100*b*) may be placed at the provisioning location 91*a*, 91*b*.

It also proves advantageous if the unloading station has at least one separate buffer surface 92 near the unloading device 11 or near each unloading device 11. In the depicted embodiment, the unloading device 11 is assigned one buffer surface 92 per provisioning location 91*a*, 91*b*. However, in principle, the unloading station may also comprise only one buffer surface 92. The buffer surface 92 is preferably formed on a floor of the picking warehouse 1. This way, it is possible that the empty target loading aids 70 with the first stack loading aid 100*a* and the target loading aid 170 with the second stack loading aid 100*b* are buffered on the buffer surface 92, near the unloading device(s) 11, and are transported as needed to the respective provisioning location 91*a*, 91*b* of the unloading device(s) 11 over a short distance using the transport vehicles 9.

According to the shown embodiment, the target loading aids 70 with the first stack loading aid 100*a* and the target loading aid 170 with the second stack loading aid 100*b* are transported to the respective provisioning location 91*a*, 91*b* of the unloading device(s) 11 and are transported away from the respective provisioning location 91*a*, 91*b* of the unloading device(s) 11 using the transport vehicles 9.

Figure 2E:
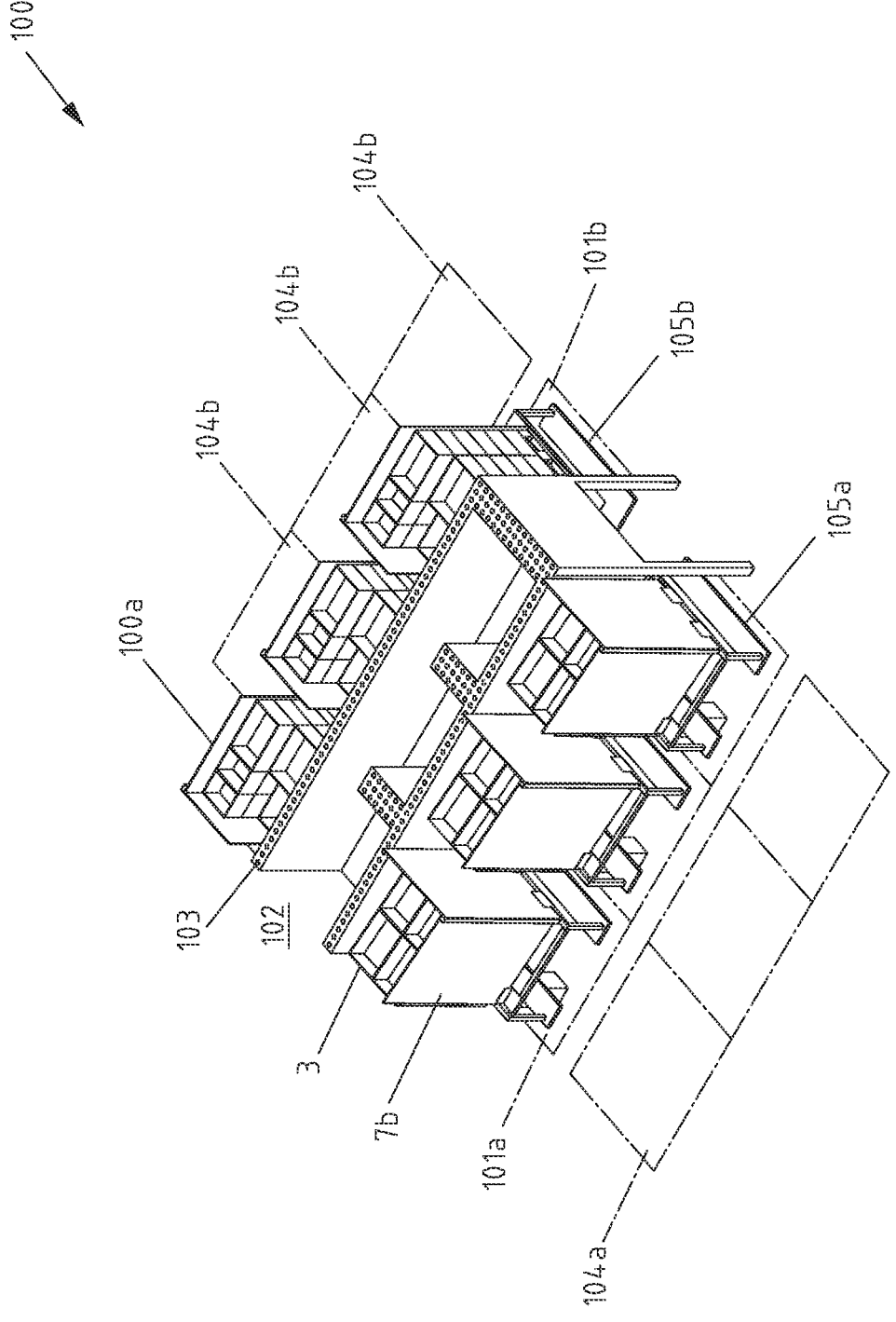
FIG. 2e a possible embodiment of a semi-automated unloading device of an unloading station of the picking warehouse in a perspective view.

As evident in FIGS. 1*b* and 2*e*, the unloading station may additionally comprise one or multiple unloading device(s) 100 (schematically adumbrated) operated in a semi-automated manner, wherein the article carriers 3 or article carrier stacks are transferred from a transport loading aid 7*b*, 7*c* onto one or multiple target loading aids 70, 170 at the unloading station. It is possible that the unloading station comprises only one single unloading device 100, wherein the article carriers 3 or article carrier stacks are transferred from a transport loading aid 7*b*, 7*c* onto one or multiple target loading aids 70, 170 at the single unloading device 100. The number of unloading devices 100 may vary depending on the required picking performance. These unloading devices 100 are preferably constructed identically.

According to the embodiment shown, the one or multiple semi-automated unloading device(s) 100 at the same time forms one or multiple reloading device(s) and/or picking device(s) for assembling the article carriers 3 on the target loading aid(s) 70 according to the picking order.

At the unloading device(s) 100, article carriers 3 are picked, which cannot be automatically picked at the unloading device(s) 11 because the article carriers 3 have a base surface smaller than 300 mm×400 mm or the article carriers 3 have a dimensional stability that is too low to be manipulated automatically.

The semi-automated unloading device(s) 100 each comprise a first provisioning location 101*a* for a transport loading aid 7*b*, 7*c*, a second provisioning location 101*b* for a first stack loading aid 100*a* (or second stack loading aid 100*b*) and a working area 102 for a picker/a warehouse worker (not depicted for reasons of clarity). The working area 102 may also comprise a working surface 103 with wheels and the like in order to make an ergonomic manipulation of the article carriers 3 possible. The first provisioning location 101*a* and the second provisioning location 101*b* are arranged so as to be located opposite one another. Additionally, the unloading device 100 may comprise an input and/or output device (not depicted), by means of which picking instructions for the picker are output and at which picking commands are entered by the picker.

As described above, the (additional) target loading aid 70 with the first stack loading aid 100*a* may be provided at the provisioning location 101*b* or the target loading aid 170 (which is formed by the second stack loading aid 100*b*) may be placed at the provisioning location 101*b*.

While, according to the embodiment described above, an automated picking operation takes place at the unloading device(s) 11, a manual picking operation is performed at the unloading device(s) 100.

In the mentioned context, "semi-automated" means that transporting transport loading aids 7*b*, 7*c* to the unloading device 100, transporting transport loading aids 7*a*, 7*c* away from the unloading device 100, transporting first stack loading aids 100*a* (or second stack loading aid 100*b*) to the unloading device 100, transporting first stack loading aids 100*a* (or second stack loading aid 100*b*) away from the unloading device 100 is performed automatically and picking is performed manually by a picker.

The transport loading aid 7*b*, 7*c* is transported to the first provisioning location 101*a* using the transport vehicle 9 and transferred to the provisioning location 101*a* so as to place the transport loading aid 7*b*, 7*c* at the provisioning location 101*a*, or transferred from the first provisioning location 101*a* onto the transport vehicle 9 so as to transport the transport loading aid 7*a*, 7*c* away from the provisioning location 101*a*.

Likewise, the first stack loading aid 100*a* (or second stack loading aid 100*b*) is transported using the transport vehicle 9 to the second provisioning location 101*b* and transferred onto it so as to place the first stack loading aid 100*a* (or second stack loading aid 100*b*) at the provisioning location 101*b*, it is transferred from the second provisioning location 101*b* onto the transport vehicle 9 so as to transport the first stack loading aid 100*a* (or second stack loading aid 100*b*) away from the provisioning location 101*b*.

It also proves advantageous if the unloading station has at least one separate buffer surface 104*a* for the transport loading aid 7*b*, 7*c* and at least one separate buffer surface

104*b* for the first stack loading aid 100*a* (or second stack loading aid 100*b*) near the unloading device 100 or near each unloading device 100. In the depicted embodiment, the unloading device 100 is assigned one buffer surface 104*a* per provisioning location 101*a* or one buffer surface 104*b* per provisioning location 101*b*. However, in principle, the unloading station may also comprise only one buffer surface 104*a* or buffer surface 104*b*. The buffer surface 104*a*, 104*b* is preferably formed on a floor of the picking warehouse 1. This way, it is possible that the loaded transport loading aid(s) 7*b*, 7*c* and the first stack loading aid 100*a* (the second stack loading aid 100*b*) are buffered on the buffer surface 104*a*, 104*b*, near the unloading device(s) 100, and are transported as needed to the respective provisioning location 101*a*, 101*b* of the unloading device(s) 100 over a short distance using the transport vehicles 9.

According to the depicted embodiment, the first provisioning location 101*a* is formed on a lifting platform 105*a*, on which the transport loading aid 7*b*, 7*c* is placed and the article carrier stack group 8*a*, 8*b*, 8*c* can be lifted to a provisioning level in order to make ergonomic working possible, and the second provisioning location 101*b* is formed on a lifting platform 105*b*, on which the first stack loading aid 100*a* (or second stack loading aid 100*b*) can be placed and the target loading aid 70, 170 (of the target loading aid 70, 170 is not loaded yet) or an order stack 106 (if the target loading aid 70, 170 has already been loaded using one or multiple automatically operated loading device(s) 11) can be lifted to a provisioning level in order to make ergonomic working possible.

It should be noted at this point that irrespectively of how the unloading device 11, 100 is embodied, it can be advantageous if the provisioning location 71*a*, 71*b*, 101*a* can also comprise the tilting and back tilting device 52 described above, by which the transport loading aid 7*a*, 7*b*, 7*c* can be tilted such prior to its unloading that the base wall part 171 is moved into an essentially horizontal transport plane (take-over plane). Such an embodiment can be applied if the transport loading aid 7*b*, 7*c* is embodied according to FIGS. 4*a* to 4*c*, 6 and has no horizontal base wall part 171. The tilting and back tilting devices 52 can each comprise a placing plate 53 on which the feet 175 (three or four feet 174) of the transport loading aid 7*b*, 7*c* are placed. Three or four tilting and back tilting devices 52 are provided. Hence, unloading the transport loading aid 7*b*, 7*c* can also be simplified if these are embodied according to FIGS. 4*a* to 4*c*, 6.

Likewise, it can be advantageous if the provisioning location 91*a*, 91*b*, 101*b* can also comprise the tilting and back tilting device 52 described above, by which the first target loading aid 70 or the second target loading aid 170 (and/or the first stack loading aid 100*a* or the second stack loading aid 100*b*) can be tilted such prior to their loading that the base wall part 206 is moved into an essentially horizontal transport plane (take-over plane).

Such an embodiment can be applied if the first target loading aid 70 or the second target loading aid 170 is embodied according to FIGS. 7*a* to 7*c*, 9 and has no horizontal base wall part 206. The tilting and back tilting devices 52 can each comprise a placing plate 53 on which the feet 209 (three or four feet 209) of the first target loading aid 70 or the second target loading aid 170 are placed. Three or four tilting and back tilting devices 52 are provided. Hence, loading the first target loading aid 70 or the second target loading aid 170 can be simplified if these are embodied according to FIGS. 7*a* to 7*c*, 9.

FIGS. 1*a* and 2*b* show a lading station with one or multiple automatically operated lading device(s) 110 comprising the picking warehouse 1, configured for lading the first stack loading aid 100*a* using a target loading aid 70 as long as a first stack loading aid 100*a* is used in the picking warehouse 1. The target loading aid 70 is placed on the base (FIGS. 7*a* to 7*c*, 8*a*, 9) of the first stack loading aid 100*a*.

The lading device(s) 110 each comprise a provisioning location 111 for an empty first stack loading aid 100*a* and a transfer device 112 for loading the stack loading aid 100*a* provided on the provisioning location 111, wherein the transfer device 172 is movable relative to the provisioning location 111.

It also proves advantageous if the lading station has at least one separate buffer surface 113 near the lading device 110 or near each lading device 110. In the depicted embodiment, the lading device 110 is assigned one buffer surface 113 per provisioning location 111. However, in principle, the lading station may also comprise only one buffer surface 113. The buffer surface 113 is preferably formed on a floor of the picking warehouse 1.

An empty first stack loading aid 100*a* is transported to the lading station using an autonomously movable, driverless transport vehicle 9 and provided at the lading device 110 or on a buffer surface 113. After being laded using a target loading aid 70, the stack loading aid 100*a* is transported from the lading station, in particular from the lading device 110, to the unloading station using an autonomously movable, driverless transport vehicle 9.

FIGS. 1*a* and 2*b* also show an order stack load securing station with one or multiple automatically operated load securing device(s) 120 comprising the picking warehouse 1 configured for securing the load of an order stack 106 with a securing means 121.

The load securing device(s) 120 each comprise a provisioning location 122 for a loaded first stack loading aid 100*a* (or a loaded second stack loading aid 100*b*), a target loading aid lifting device and a securing means wrapping tool or a securing means strapping tool. The target loading aid lifting device comprises a vertically adjustable lift frame 123 and telescopic forks 124 mounted on the lift frame 123, wherein the telescopic forks 124 are movable between a retracted initial position and a protruding receiving position.

It should be noted that in the receiving position, the telescopic forks 124, on the one hand, receive a target loading aid 70 together with the order stack 106 if no stack loading aids are used, or, if the first stack loading aid 100*a* is used (with additional target loading aid 70), and on the other hand, only the order stack 106 if the second stack loading aid 100*b* is used (without additional target loading aid 70), wherein the target loading aid 70 together with the order stack 106 or the order stack 106 may be lifted/lowered with a lifting movement of the lift frame 123.

It also proves advantageous if the order stack load securing station has at least one separate buffer surface 125 near the load securing device 120 or near each load securing device 120. In the depicted embodiment, the load securing device 120 is assigned one buffer surface 125 per provisioning location 122. However, the order stack load securing station may also comprise only one buffer surface 125. The buffer surface 125 is preferably formed on a floor of the picking warehouse 1.

According to the embodiment shown, the load securing device 120 comprises a wrapping tool, which wraps a thermoplastic film in a force-fit manner in the circumferential direction around the order stack 106 while the order stack 106 is lifted from the first stack loading aid 100*a* or the second stack loading aid 100*b* using the target loading aid lifting device. The thermoplastic film constitutes the securing means 121.

In the alternative, a strapping tool may also be used in the load securing device 120 configured to fasten at least one fastening strap in a substantially horizontal direction circumferentially at the order stack 106 while the order stack 106 is in the load securing device 120. The fastening strap constitutes the securing means 121.

A first stack loading aid 100*a* loaded with the (finished) order stack 106 (or second stack loading aid 100*b*) is transported to the order stack load securing station using an autonomously movable, driverless transport vehicle 9 and provided at the load securing device 120 or on a buffer surface 125.

After the order stack 106 has been removed from the first stack loading aid 100*a*, the empty first stack loading aid 100*a* may be transported using an autonomously movable, driverless transport vehicle 9 from the order stack load securing station, in particular from the load securing device 120 to the lading station.

If the stack loading aids comprise the second stack loading aid 100*b*, after the order stack 106 has been removed from the second stack loading aid 100*b*, the empty second stack loading aid 100*b* may be transported using an autonomously movable, driverless transport vehicle 9 from the order stack load securing station, in particular from the load securing device 120 to the unloading station.

Figure 3A:
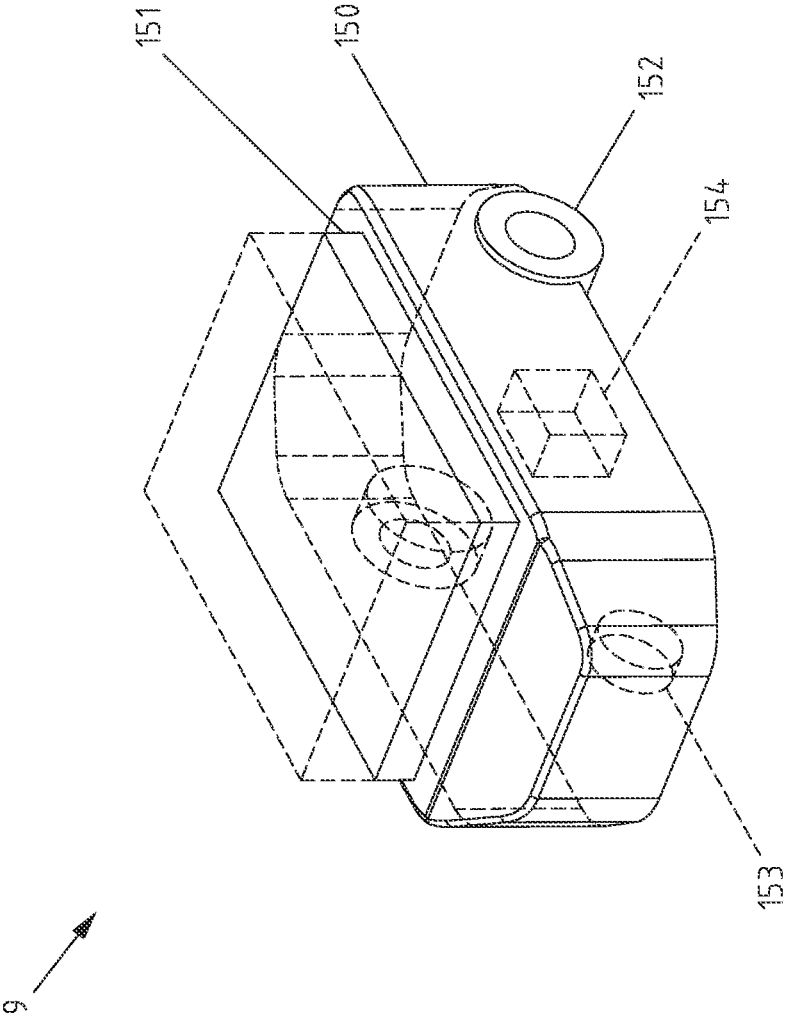
FIG. 3a a first embodiment of a transport vehicle (automated guided vehicle or autonomous mobile robot) in a perspective view.

FIG. 3*a* shows a first embodiment of one of the autonomously movable, steerable transport vehicles 9 of a driverless transport system. The transport vehicles 9 are controlled by a superordinate main computer for transporting transport loading aids 7*a*, 7*b*, 7*c*, for example to transport empty transport loading aids 7*a* to the loading station and to provide one of the empty transport loading aids 7*a* either at the automatically operated loading device 10 or on the buffer surface 43 close to the loading device 10, and to transport the transport loading aid 7*b* loaded with the article carrier stack group 8*a*, 8*b*, 8*c* from the loading station to the storage zone 5, and to transport one or multiple transport loading aid(s) 7*b*, 7*c* containing the article carriers 3 required for a picking order from the storage zone 5 to an unloading station and to provide the transport loading aid(s) 7*b*, 7*c* either at one or multiple automatically operated unloading device(s) 11 or on a buffer surface 73 close to the unloading device(s) 11.

The control system 16 may comprise the main computer.

The transport vehicle 9 (mobile robot) comprises a chassis 150 with a drive unit and a loading platform 151 arranged on the chassis 150 for picking up/discharging/transporting a mobile (non-stationary) transport loading aid 7*a*, 7*b*, 7*c* and/or a mobile (non-stationary) stack loading aid 100*a* and/or a mobile (non-stationary) stack loading aid 100*b*. The drive unit comprises wheels 152, 153 rotatably mounted on the chassis 150, wherein at least one of the wheels 152 is coupled with a drive (not depicted) and at least one of the wheels 153 can be steered. It is also possible for both wheels 152 to be coupled with the drive and be driven by it. However, the transport vehicle 9 may also comprise four wheels, of which two wheels can be steered.

According to the shown embodiment, the loading platform 151 is mounted on the chassis 150 so as to be adjustable between an initial position (represented in continuous lines) and a transport position (represented in dashed lines). In the initial position, a transport loading aid 7*a*, 7*b*, 7c placed on the floor of the picking warehouse 1, in particular on a buffer surface, the storage surface, in the waiting zone or on the provisioning location, or a stack loading aid 100a, 100b placed on the buffer surface or on the provisioning location, can be driven under, in order to receive the transport loading aid 7a, 7b, 7b, or the stack loading aid 100a, 100b, on the loading platform 151. If the loading platform 151 is adjusted from the initial position in the direction of the transport position, a transport loading aid 7a, 7b, 7b or stack loading aid 100a, 100b placed on the base can be lifted and subsequently transported. In the transport position, the transport loading aid 7a, 7b, 7b or stack loading aid 100a, 100b is lifted off the floor of the picking warehouse 1 and it can be transported between the delivery zone 4, storage zone 5 and the order processing zone 6. If the loading platform 151 is adjusted from the transport position in the direction of the initial position, the transport loading aid 7a, 7b, 7b or stack loading aid 100a, 100b can be placed on the floor.

The transport vehicle 9 further comprises a drive control 154, represented schematically in dashed lines, for receiving commands from the superordinate main computer and for controlling/regulating the movements of the autonomous transport vehicle 9. The drive control 154 may also comprise means for (wirelessly) transfer data to and from the transport vehicle 9. Finally, the transport vehicle 9 comprises sensors, which are not shown, for detecting the environment of the autonomous transport vehicle 9 and for spatial orientation. The drive of the drive unit and the sensors are connected to the drive control 154.

Figure 3B:
FIG. 3b a second embodiment of a transport vehicle (automated guided vehicle or autonomous mobile robot) in a perspective view.

FIG. 3b shows a second embodiment of one of the autonomously movable, steerable transport vehicles 90 of a driverless transport system. The transport vehicle 90 differs from the first embodiment according to FIG. 3a in that a transport safeguard 160 is additionally provided. The transport safeguard 160 can be configured for stabilizing a position of an article carrier stack group 8a, 8b, 8c when the article carrier stack group is received on the mobile transport loading aid 7a, 7b, 7c, transported and/or unloaded. The transport safeguard 160 can be configured for stabilizing a position of an order stack 106 when the order stack 106 is received on the mobile stack loading aid 100a, 100b, transported and/or loaded.

Specifically, the transport vehicle 90 comprises the loading platform 151 described above and side walls arranged adjacent thereto. The side walls form the transport safeguard 160 and comprise a first side wall 161a and a second side wall 161b. Preferably, the transport safeguard 160 comprises merely the first side wall 161a and the second side wall 161b. The first side wall 161a and the second side wall 161b enclose an angle, in particular a right angle.

Figure 6:
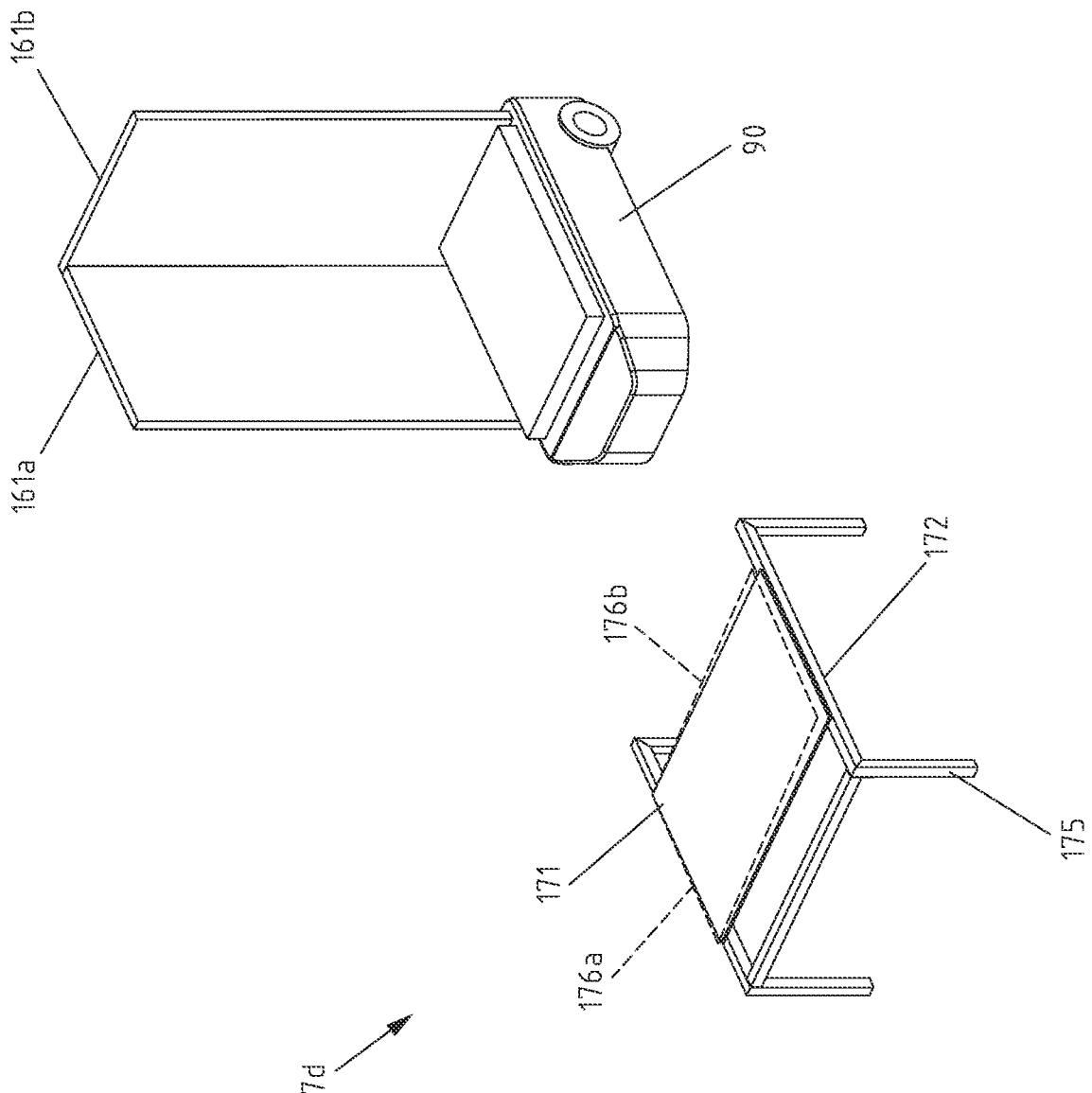
FIG. 6 a third embodiment of a transport loading aid and the transport vehicle according to FIG. 3b in a perspective view.
Figure 9:
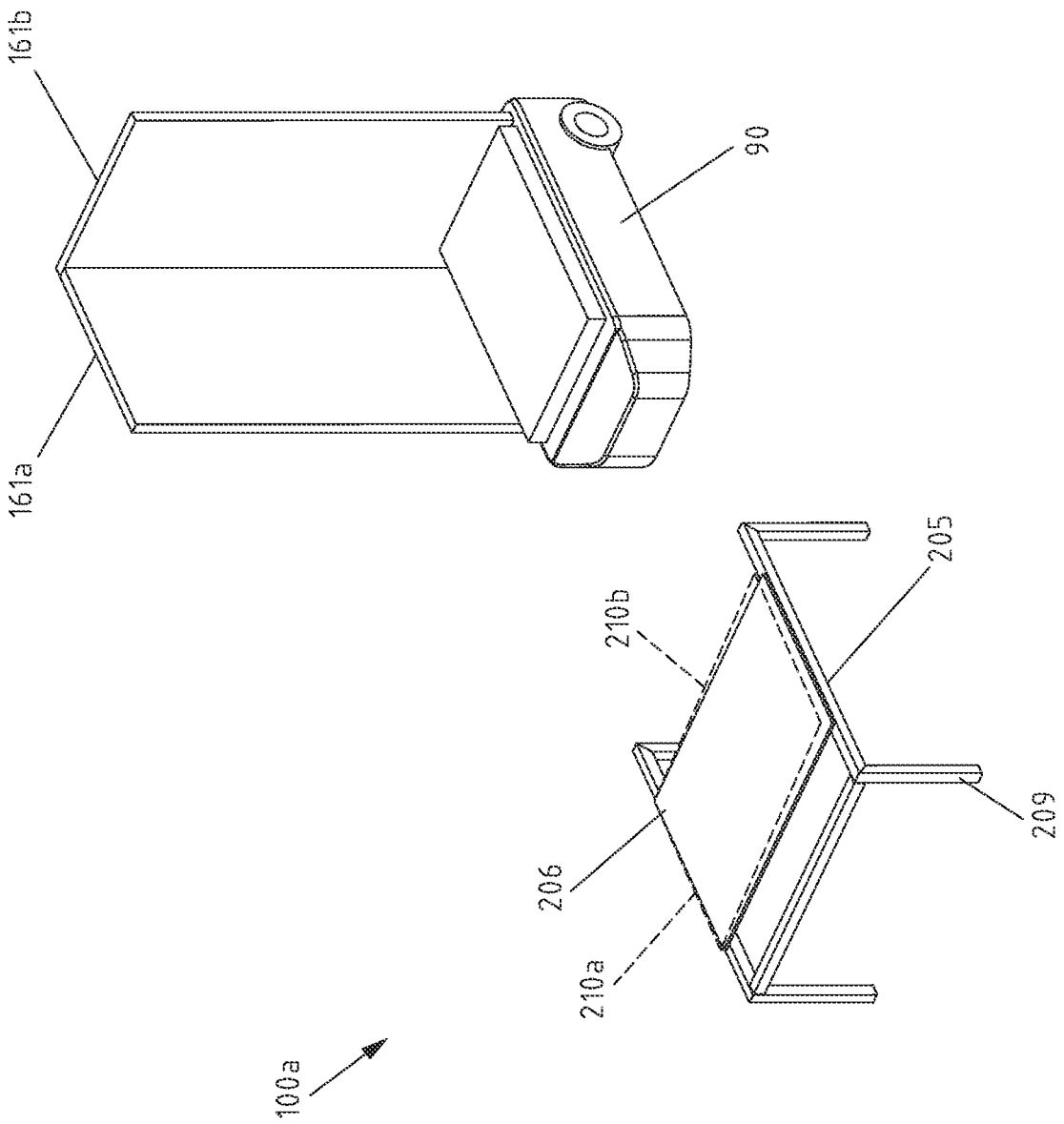
FIG. 9 a third embodiment of a stack loading aid and the transport vehicle according to FIG. 3b in a perspective view.

According to a first embodiment shown in FIGS. 3b and 6 and/or FIGS. 3b and 9, the first side wall 161a and the second side wall 161b can each vertically project from a loading plane receiving the loading platform 151 at a right angle.

According to an embodiment which is not shown, the first side wall 161a and the second side wall 161b can each vertically project from a loading plane receiving the loading platform 151 at an angle greater than 90°. Such an embodiment can be advantageous if the transport loading aid (without side walls) or the stack loading aid (without side walls) have a base wall part which extends inclined downwardly by a first inclination angle ($\alpha_1$) with respect to a horizontal plane (i.e. loading plane) in the direction towards the first side wall 161a as well as inclined downwardly by a second inclination angle ($\alpha_2$) with respect to a horizontal plane (i.e. loading plane) in the direction towards the second side wall 161b. As soon as the transport loading aid (without side walls) or the stack loading aid (without side walls) was received on the loading platform 151, the first side wall 161a and the second side wall 161b are each oriented perpendicularly to the base wall part.

Figures 4A, 4B:
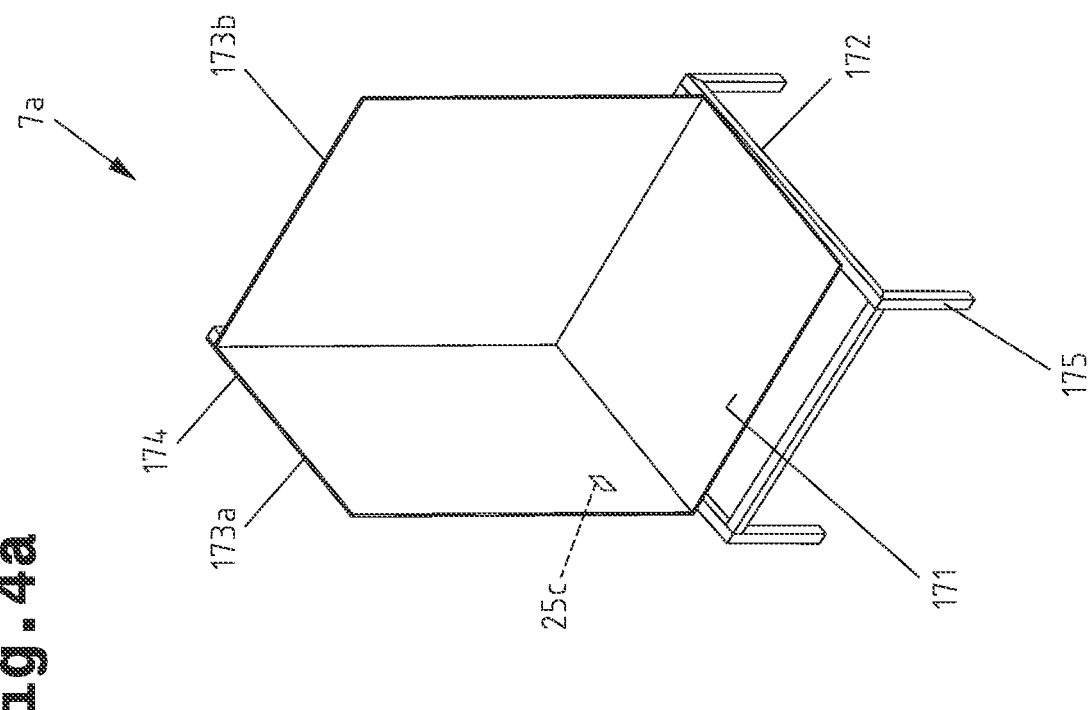
Figures 4C, 5:
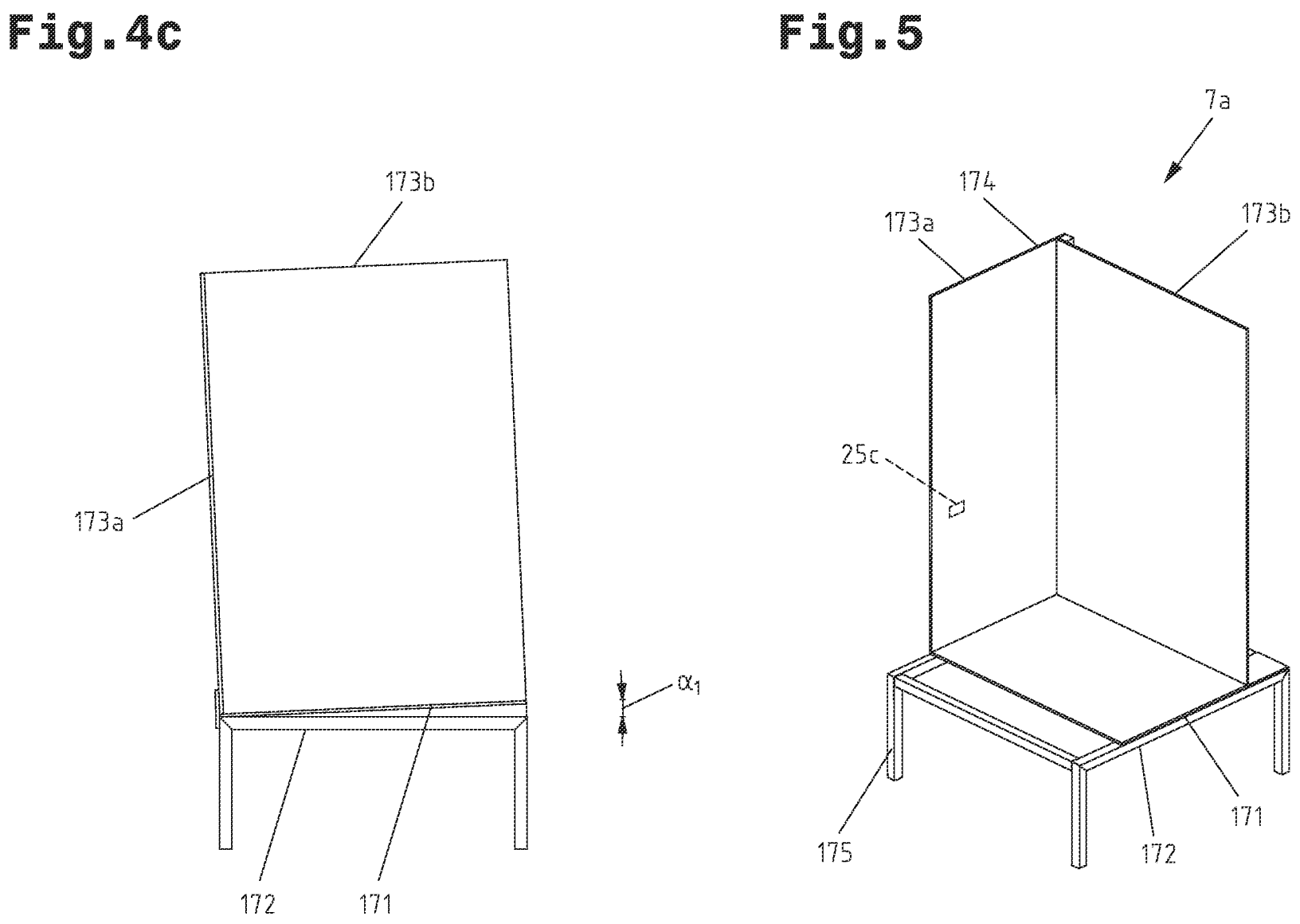

FIGS. 4a to 4c show a first embodiment of a transport loading aid 7a, 7b, 7c, as can be used in the shown picking warehouse 1, specifically the empty transport loading aid 7a.

The transport loading aid 7a, 7b, 7c comprises a transport rack and a base, wherein the transport rack forms a transport frame 172, against which the loading platform 151 of the transport vehicle 9 can be positioned, and wherein the base forms a base wall part 171 on which the article carrier stack group 8a, 8b, 8c (with or without delivery load carrier 17a, 17b, 17c) can be placed.

According to the embodiment shown, the transport loading aid 7a, 7b, 7c additionally comprises side walls which form a transport safeguard 174 for stabilizing a position of the article carrier stack group 8a, 8b, 8c when it is placed on the base wall part 171, and comprise a first side wall 173a and a second side wall 173b. The first side wall 173a and second side wall 173b are connected to the base wall part 171. Preferably, the transport safeguard 174 comprises merely the first side wall 173a and the second side wall 173b. Preferably, the first side wall 173a and second side wall 173b enclose an angle, in particular a right angle.

Additionally, the transport loading aid 7a, 7b, 7c may comprise feet 175 affixed to the transport rack. The transport loading aid 7a, 7b, 7c is placed on the floor or a conveying system (as will be described below) of the picking warehouse 1 via the feet 175. In an embodiment that is not shown, wheels instead of feet 175 may also be provided on the transport rack. It can prove advantageous if the base wall part 171 is both inclined downwardly at a first inclination angle ($\alpha_1$) with respect to a horizontal plane spanned between the first side wall 173a and the second side wall 173b in a direction towards the first side wall 173a, and inclined downwardly at a second inclination angle ($\alpha_2$) with respect to a horizontal plane spanned between the first side wall 173a and the second side wall 173b in a direction towards the second side wall 173b. The first side wall 173a and second side wall 173b are oriented perpendicularly to the base wall part 171. The inclination angles ($\alpha_1$, $\alpha_2$) preferably each amount to between 3° and 6°.

The base wall part 171 is preferably adapted in base area to the dimensions of the article carrier stack group 8a, 8b, 8c and/or the delivery load carriers 17a, 17b, 17c described above. To increase flexibility in the use of the transport loading aid 7a, 7b, 7c, the base surface can be adapted to the dimension of the largest article carrier stack group 8a, 8b, 8c and/or of the largest delivery load carrier 17a, 17b, 17c. However, the transport loading aid 7a, 7b, 7c, can also be adapted to the dimension of one single article carrier stack group 8a, 8b, 8c and/or of one single delivery load carrier 17a, 17b, 17c.

FIG. 5 shows a second embodiment of a transport loading aid 7a, 7b, 7c, as can be used in the shown picking warehouse 1, specifically the empty transport loading aid 7a.

The transport loading aid 7a, 7b, 7c comprises a transport rack and a base, wherein the transport rack forms a transport frame 172, against which the loading platform 151 of the transport vehicle 9 can be positioned, and wherein the base forms a base wall part 171 on which the article carrier stack group 8a, 8b, 8c (with or without delivery load carrier 17a, 17b, 17c) can be placed.

According to the embodiment shown, the transport loading aid 7a, 7b, 7c additionally comprises side walls which form a transport safeguard 174 for stabilizing a position of the article carrier stack group 8a, 8b, 8c when it is placed on the base wall part 171, and comprise a first side wall 173a and a second side wall 173b. The first side wall 173a and second side wall 173b are connected to the base wall part 171. Preferably, the transport safeguard 174 comprises merely the first side wall 173a and the second side wall 173b. Preferably, the first side wall 173a and second side wall 173b enclose an angle, in particular a right angle.

Additionally, the transport loading aid 7a, 7b, 7c may comprise feet 175 affixed to the transport rack. The transport loading aid 7a, 7b, 7c is placed on the floor of the picking warehouse 1 via the feet 175. In an embodiment that is not shown, wheels instead of feet 175 may also be provided on the transport rack.

However, as opposed to the first embodiment, the base wall part 171, which was described in further detail above, is oriented horizontally and extends in a horizontal plane spanned between the first side wall 173a and the second side wall 173b. The first side wall 173a and the second side wall 173b are oriented perpendicularly to the base wall part 171 and connected to the base wall part 171.

FIG. 6 shows a third embodiment of a transport loading aid 7d, as can be used in the shown picking warehouse 1, specifically an empty transport loading aid 7d.

The transport loading aid 7d comprises a transport rack and a base, wherein the transport rack forms a transport frame 172, against which the loading platform 151 of the transport vehicle 9 can be positioned, and wherein the base forms a base wall part 171 on which the article carrier stack group 8a, 8b, 8c (with or without delivery load carrier 17a, 17b, 17c) can be placed. According to the embodiment shown, the transport loading aid 7d comprises no additional side walls; these are provided by the transport vehicle 90, as is described above in FIG. 3b.

Additionally, the transport loading aid 7d may comprise feet 175 affixed to the transport rack. The transport loading aid 7d is placed on the floor or a conveying system (as will be described below) of the picking warehouse 1 via the feet 175. In an embodiment that is not shown, wheels instead of feet 175 may also be provided on the transport rack.

In the embodiment shown, the base wall part 171, which was described in further detail above, is oriented horizontally, although it is also possible that the base wall part 171 extends both inclined downwardly by a first inclination angle ($a_1$) with respect to a horizontal plane in a direction of a first longitudinal edge 176a of the base wall part 171 and inclined downwardly by a second inclination angle ($a_2$) with respect to a horizontal plane in a direction of a second longitudinal edge 176b of the base wall part 171, as indicated in dashed lines in FIG. 6. The inclination angles ($a_1$, $a_2$) preferably each amount to between 3° and 6°.

FIGS. 7a-7c, 8a, 8b and 9 show different embodiments of a first stack loading aid 100a, as can be used in the picking warehouse 1 shown. The target loading aid 70 is shown merely in FIG. 7a for the sake of clarity.

The first stack loading aid 100a comprises a transport rack and a base, wherein the transport rack forms a transport frame 205, against which the loading platform 151 of the transport vehicle 9 can be positioned, and wherein the base forms a base wall part 206 on which the target loading aid 70 with the order stack 106 can be placed.

According to the embodiment shown, the first stack loading aid 100a additionally comprises side walls which form a transport safeguard 207 for stabilizing a position of the order stack 106 when it is placed on the base wall part 206, and comprise a first side wall 208a and a second side wall 208b. The first side wall 208a and second side wall 208b project from the base wall part 171. Preferably, the transport safeguard 207 comprises merely the first side wall 208a and the second side wall 208b. Preferably, the first side wall 208a and second side wall 208b enclose an angle, in particular a right angle.

Additionally, the first stack loading aid 100a may comprise feet 209 affixed to the transport rack. The first stack loading aid 100a is placed on the floor of the picking warehouse 1 via the feet 209. In an embodiment that is not shown, wheels instead of feet 209 may also be provided on the transport rack.

Figure 7B:
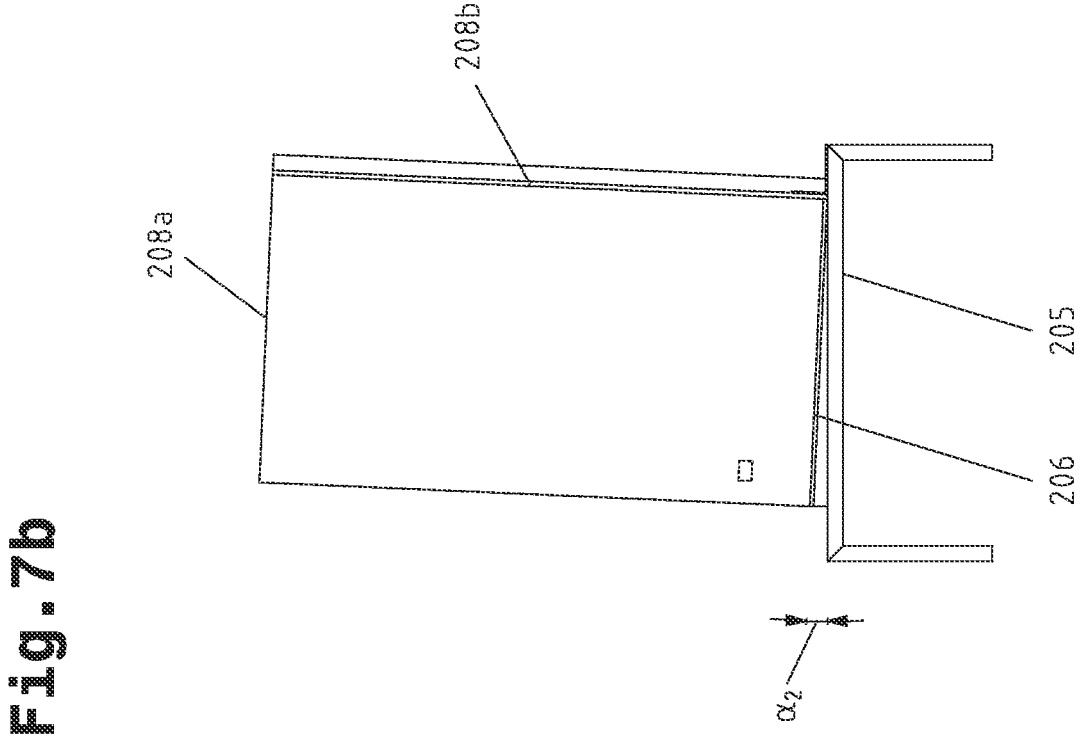
Figure 7A:
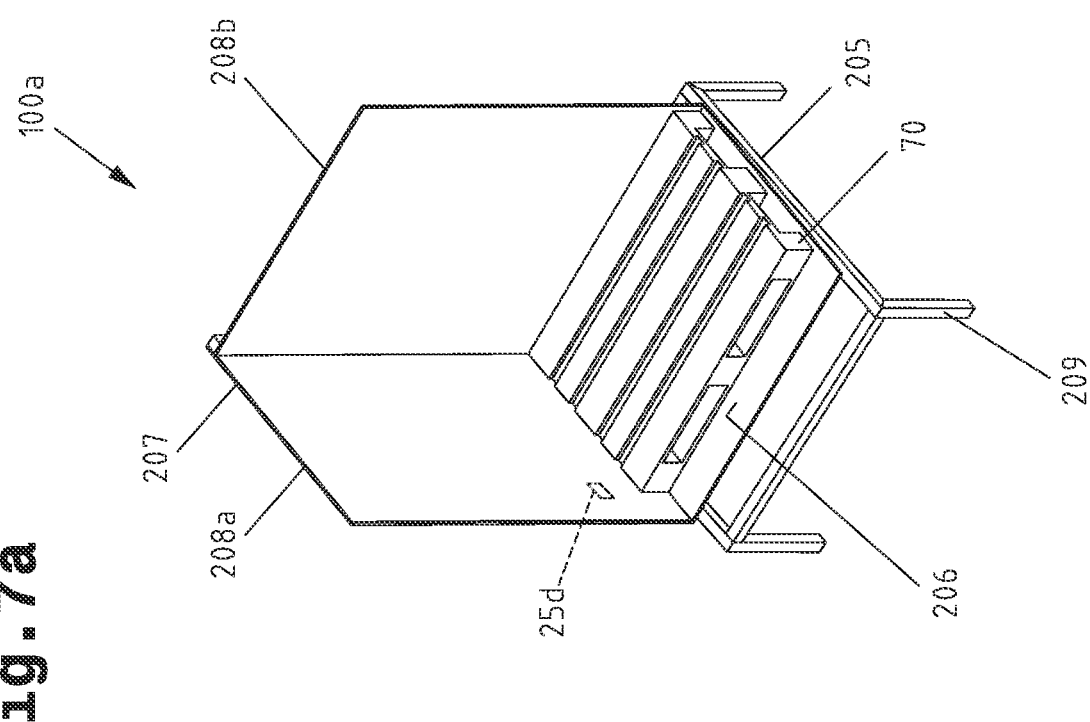

It can prove advantageous, as shown in FIGS. 7a, 7b, if the base wall part 206 is both inclined downwardly at a first inclination angle ($\alpha_1$) with respect to a horizontal plane spanned between the first side wall 208a and the second side wall 208b in a direction towards the first side wall 208a, and inclined downwardly at a second inclination angle ($\alpha_2$) with respect to a horizontal plane spanned between the first side wall 208a and the second side wall 208b in a direction towards the second side wall 208b. The first side wall 208a and second side wall 208b are oriented perpendicularly to the base wall part 206. The inclination angles ($\alpha_1$, $a_2$) preferably each amount to between 3° and 6°.

The base wall part 171 is preferably adapted in base area to the dimensions of the target loading aids 70, in particular a pallet, for example a Euro pallet, industrial pallet or Düsseldorfer pallet. To increase the flexibility in use of the first stack loading aid 100a, the base area can be adapted to the dimension of the largest target loading aid 70. However, the first stack loading aid 100a can also be adapted to the dimension of a single target loading aid 70.

Figures 7C, 8A:
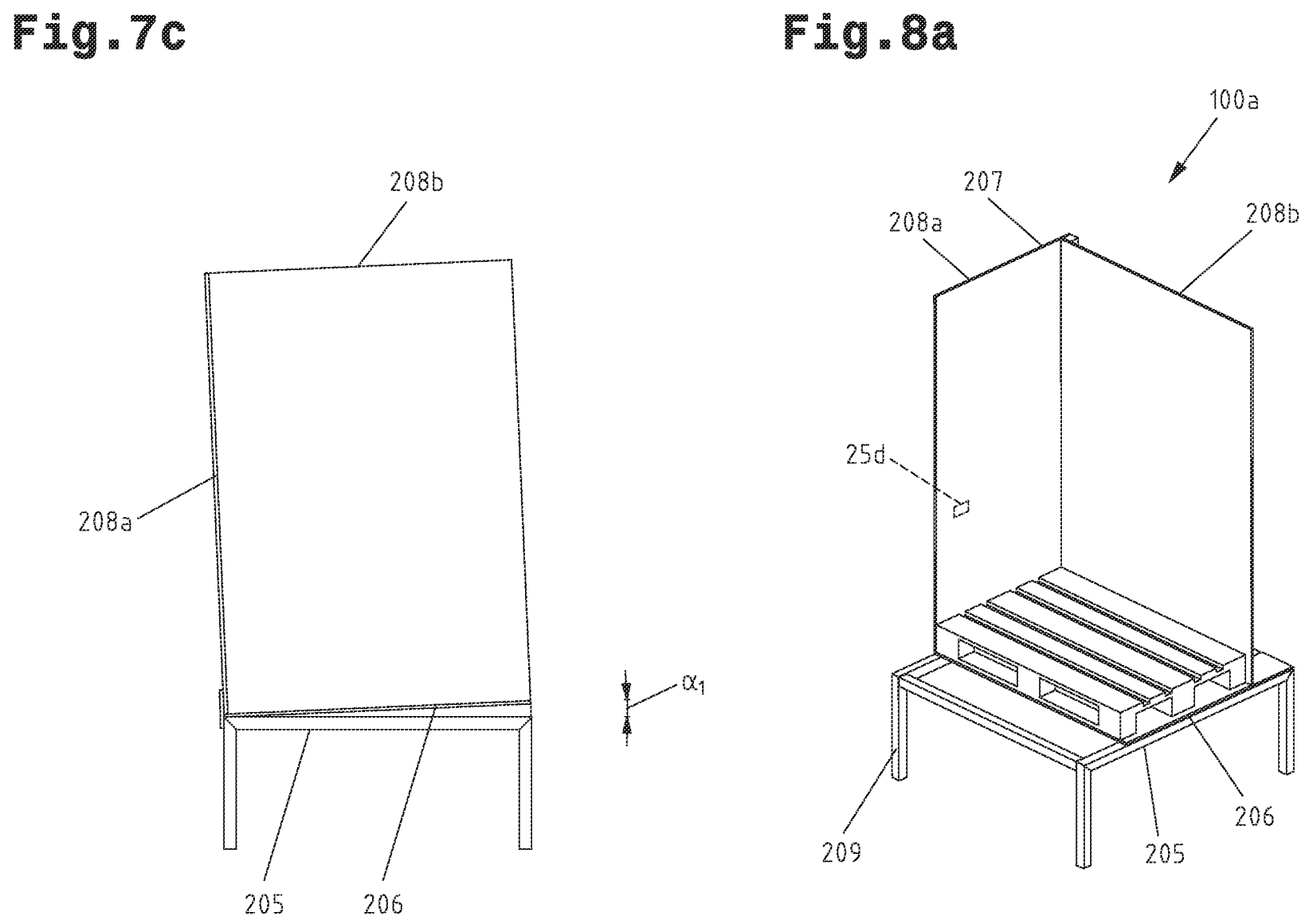
Figures 8B, 10:
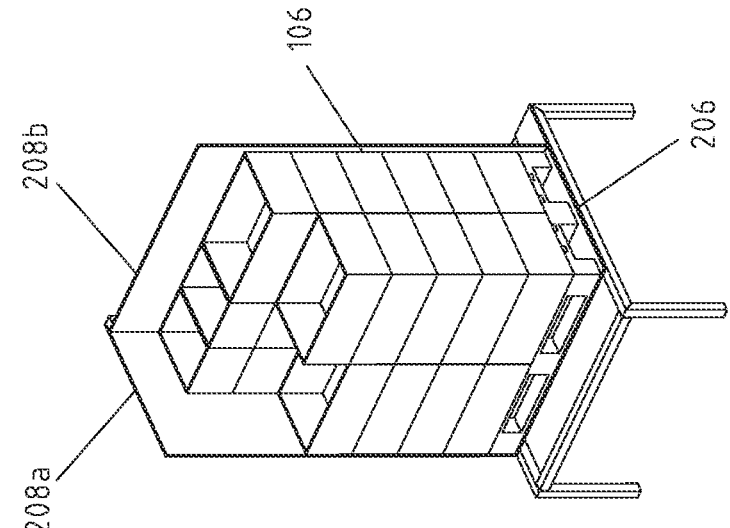

According to the embodiment shown in FIGS. 8a, 8b, in contrast to the embodiment according to FIGS. 7a to 7c, the base wall part 206, which was described in further detail above, is oriented horizontally and extends in a horizontal plane spanned between the first side wall 208a and the second side wall 208b. The first side wall 208a and the second side wall 208b are oriented perpendicularly to the base wall part 206 and connected to the base wall part 206.

According to the embodiment shown, the first stack loading aid 100a additionally comprises side walls which form a transport safeguard 207 for stabilizing a position of the order stack 106 when it is placed on the base wall part 206, and comprise a first side wall 208a and a second side wall 208b. Preferably, the transport safeguard 207 comprises merely the first side wall 208a and the second side wall 208b. Preferably, the first side wall 208a and second side wall 208b enclose an angle, in particular a right angle.

FIG. 9 shows an embodiment of a first stack loading aid 100a, as can be used in the picking warehouse 1 shown.

The first stack loading aid 100a comprises a transport rack and a base, wherein the transport rack forms a transport frame 205, against which the loading platform 151 of the transport vehicle 9 can be positioned, and wherein the base forms a base wall part 206 on which the order stack 106 with the target loading aid 70 can be placed. According to the embodiment shown, the first stack loading aid 100a comprises no additional side walls. In this embodiment the side walls are provided by the transport vehicle 90, as is described above in FIG. 3b.

Additionally, the first stack loading aid 100a may comprise feet 209 affixed to the transport rack. The first stack loading aid 100a is placed on the floor or a conveying system (as will be described below) of the picking warehouse 1 via the feet 209. In an embodiment that is not shown, wheels instead of feet 209 may also be provided on the transport rack.

According to this embodiment, the base wall part 206 is oriented horizontally, although it is also possible that the base wall part 206 extends both inclined downwardly by a first inclination angle ($\alpha_1$) with respect to a horizontal plane in a direction of a first longitudinal edge 210a of the base wall part 206 and inclined downwardly by a second inclination angle ($\alpha_2$) with respect to a horizontal plane in a direction of a second longitudinal edge 210b of the base wall part 206, as indicated in dashed lines in FIG. 9. The inclination angles ($\alpha_1$, $\alpha_2$) preferably each amount to between 3° and 6°.

FIG. 10 shows an embodiment of a second stack loading aid 100b, as can be used in the picking warehouse 1 shown.

The second stack loading aid 100b can be designed according to the embodiments of the first stack loading aid 100a according to FIGS. 7a to 7c, 8, 9, merely with the difference that the base wall part 206 having placing blocks 216 protruding on an upper side of the base wall part 206, the placing blocks 216 being separated from one another by receiving channels 215, wherein the article carriers 3 of the order stack 106 (not shown) can be placed on the placing blocks 216, such that the second stack loading aid 100b forms the target loading aid 170.

Even if merely the first side wall 173a, 208a and the second side wall 173b, 208b are provided, a sufficient stabilization of a position and a secure transport of the article carrier stack group 8a, 8b, 8c are allowed when using the transport loading aid 7a, 7b, 7c and/or a sufficient stabilization of a position and a secure transport of the order stack 106 are allowed when using the first stack loading aid 100a and the second stack loading aid 100b. It is also advantageous that a gripping system can grip the article carriers 3 on the transport loading aid 7a, 7b, 7c from two sides at the unloading device 11, which significantly facilitates the unloading operation. It is also advantageous that the load securing device 120 may be operated with high performance as the first/second stack loading aid 100a, 100b may already be transported away from the load securing device 120 as soon as the target loading aid 70 with the order stack 106 has been slightly lifted from the base wall part 206 of the first stack loading aid 100a, or the order stack 106 has been slightly lifted from the base wall part 206 of the second stack loading aid 100b. Therefore, it is not necessary to lift the order stack 106 completely and over the entire height of the first/second stack loading aid 100a, 100b before the first/second stack loading aid 100a, 100b may be transported away.

As schematically shown merely in FIGS. 2c, 4a, 4b, 5, the transport loading aid 7a, 7b, 7c can be equipped with a data carrier 25c. Likewise, the first stack loading aid 100a/the second loading aid 100b may be equipped with a data carrier 25d for identifying the first stack loading aid 100a/the second stack loading aid 100b using a detecting device by reading a data carrier, as is schematically indicated merely in FIGS. 7a, 7b, 8, 10.

It can also prove advantageous if the picking warehouse 1 comprises a device for detecting data relating to the article carrier stack group 8a, 8b, 8c and/or detecting data relating to the article carrier 3 and/or detecting data relating to the article 2 in the article carrier 3. According to the embodiment shown, the device for detecting data can be arranged in the delivery zone 4, in particular the checking station, for example the one or multiple testing device(s) 20, and/or in particular the loading station, for example the one or multiple loading device(s) 10. In FIG. 2a, the device for detecting data is referred to by number 22.

However, such a device for detecting data relating to the article carrier stack group 8a, 8b, 8c and/or detecting data relating to the article carrier 3 and/or detecting data relating to the article 2 in the article carrier 3 can also be arranged in the order processing zone 6, in particular the unloading station, for example the one or multiple automatically operated unloading device(s) 11 or the one and/or multiple semi-automated unloading device(s) 11. In FIG. 2d, the device for detecting data is referred to by number 22 and indicated in dashed lines.

The device for detecting data can comprise a camera system with one or multiple cameras or one or multiple barcode readers.

The device for detecting data is connected to the control system 16 via a data line, in order to transmit the data relating to the article carrier stack group 8a, 8b, 8c and/or the data relating to the article carrier 3 and/or the data relating to the article 2 in the article carrier 3 to the control system 16.

The control system 16 comprises a control logic configured for processing the data relating to the article carrier stack group 8a, 8b, 8c and/or the data relating to the article carrier 3 and/or the data relating to the article 2 in the article carrier 3 and for generating control commands, wherein the unloading device(s) 11 is (are) controlled using the control commands, and/or for generating transport commands, wherein the autonomously movable, driverless transport vehicle(s) 9; 90 is (are) controlled using the transport commands. Specifically, a transfer device 72 (gripping unit) of the unloading device(s) 11 can be controlled and/or a drive unit of the transport vehicles 9; 90 can be controlled.

Based on this data, transport commands can be generated to control the autonomously movable, driverless transport vehicle(s) 9; 90. For example, a transport vehicle 9; 90 can receive a transport command by which an article carrier stack group 8a, 8b, 8c containing damaged articles 2 is transported to a clearing place (preferably in the checking station) to remove the article carriers 3 with the damaged articles 2 at the clearing place (if this was not already done at the testing device).

Below, the method for storing and picking article carriers 3 that contain articles 2 and are stackable in the picking warehouse 1 will be described.

The method comprises the steps i) providing autonomously movable, driverless transport vehicles 9; 90, ii) providing mobile transport loading aids 7a, 7b, 7c, 7d, each for receiving a (preferably a single) article carrier stack group 8a, 8b, 8c, wherein the mobile transport loading aids comprise empty transport loading aids 7a and loaded transport loading aids 7b, 7c, 7d, iii) providing a transport safeguard 160; 174 on at least some of the autonomously movable, driverless transport vehicles 90 or on at least some of the mobile transport loading aids 7a, 7b, 7c, 7d, the transport safeguard 160; 174 being configured for stabilizing a position of an article carrier stack group 8a, 8b, 8c when the article carrier stack group 8a, 8b, 8c is received on the mobile transport loading aid 7b, 7c, 7d, iv) providing article carrier stack groups 8a, 8b, 8c comprising multiple article carriers 3 arranged next to one another and on top of one another in a delivery zone 4 of the picking warehouse 1, v) transporting empty transport loading aids 7a using the autonomously movable, driverless transport vehicles 9;

90 to a loading station and providing one or multiple empty transport loading aid(s) 7a either on one or on multiple automatically operated loading device(s) 10 or on a buffer surface 43 close to the loading device(s) 10, vi) loading one of the empty transport loading aids 7a with the article carrier stack group 8a, 8b, 8c using the automatically operated loading device 10, wherein the article carrier stack group 8a, 8b, 8c is provided in the delivery zone 4 and is taken from the delivery zone 4 essentially unchanged on the empty transport loading aid 7a, vii) transporting the transport loading aid 7b, 7c, 7d loaded with the article carrier stack group 8a, 8b, 8c using the autonomously movable, driverless transport vehicle 9; 90 from the loading station to a storage zone 5 and stabilizing a position of the article carrier stack group 8a, 8b, 8c by the transport safeguard 160; 174 during the transport movement of the loaded transport loading aid 7b, 7c, 7d, viii) placing the transport loading aid 7b, 7c, 7d loaded with the article carrier stack group 8a, 8b, 8c on a storage surface 45 in the storage zone 5, ix) storing the transport loading aids 7b, 7c, 7d loaded with the article carrier stack groups 8a, 8b, 8c in the storage zone 5 (and optionally stabilizing a position of the article carrier stack group 8a, 8b, 8c by the transport safeguard 160; 174 during storage of the loaded transport loading aid 7b, 7c, 7d), x) processing a picking order comprising the following steps transporting one or multiple transport loading aid(s) 7b, 7c, 7d containing the article carriers 3 required for a picking order from the storage zone 5 to an unloading station and providing the transport loading aid(s) 7b, 7c, 7d either at one or at multiple automatically operated unloading device(s) 11 or on a buffer surface 73 close to the unloading device(s) 11 using one or multiple autonomously movable, driverless transport vehicle(s) 9; 90 and stabilizing a position of the article carrier stack group 8a, 8b, 8c by the transport safeguard 160; 174 during the transport movement of the loaded transport loading aid, 7b, 7c, 7d, unloading one or multiple ones of the transport loading aid(s) 7b, 7c, 7d provided at the automatically operated unloading device(s) 11, by removing the article carriers 3 required for processing the picking order and optionally stabilizing a position of the article carrier stack group 8a, 8b, 8c by the transport safeguard 160; 174 during the automatic unloading movements of the automatically operated unloading device(s) 11, and assembling the article carriers 3 on one or multiple target loading aids 70; 170 for the picking order in an order processing zone 6.

Providing autonomously movable, driverless transport vehicles 9; 90 according to step i) may comprise a step of providing transport vehicles 9; 90 used exclusively for transporting the transport loading aid(s) 7a, 7b, 7c, 7d between the delivery zone 4 (loading station) and the storage zone 5, and may comprise a step of providing transport vehicles 9; 90, used exclusively for transporting the transport loading aid (s) 7a, 7b, 7c, 7d between the storage zone 5 and the order processing zone 6 (removing station—automatically operated unloading device 11 and/or semi-automated unloading device 100).

Providing autonomously movable, driverless transport vehicles 9; 90 according to step i) may comprise a step of providing transport vehicles 9; 90, used in the removing station and merely for transporting the first stack loading aid(s) 100a and/or second stack loading aid(s) 100b between the automatically operated unloading device 11 and the semi-automated unloading device 100.

Likewise, however, step i) may also comprise a step of providing transport vehicles 9; 90 used for transporting the transport loading aid(s) 7a, 7b, 7c, 7d between the delivery zone 4 (loading station) and the storage zone 5 and transporting the transport loading aid(s) 7a, 7b, 7c, 7d between the storage zone 5 and the order processing zone (removing station), as well as for transporting the first stack loading aid(s) 100a and/or the second stack loading aid(s) 100b between the automatically operated unloading device 11 and the semi-automated unloading device 100.

Providing mobile transport loading mobile aids 7a, 7b, 7c, 7d according to step ii) may comprise a step of providing structurally identical transport loading aids 7a, 7b, 7c, 7d or structurally different transport loading aids 7a, 7b, 7c, 7d.

According to a first embodiment, providing a transport safeguard 160 according to step iii) may comprise a step of providing a transport safeguard 160 on at least some or all of the autonomously movable, driverless transport vehicles 90. According to a second embodiment, providing a transport safeguard 174 according to step iii) may comprise a step of providing a transport safeguard 174 on at least some or all of the mobile transport loading aids 7a, 7b, 7c. According to both embodiments, the transport safeguard 160, 174 is configured for stabilizing a position of an article carrier stack group 8a, 8b, 8c when the article carrier stack group 8a, 8b, 8c is received on a base wall part 171 of the mobile transport loading aid 7b, 7c, 7d and the mobile transport loading aid 7b, 7c, 7d is transported or unloaded.

In the present context, "stabilizing a position of an article carrier stack group" according to steps iii), vii) and x) means that lateral slipping of individual article carriers 3 in the article carrier stack group 8a, 8b, 8c or lateral slipping of the article carrier stack group 8a, 8b, 8c in relation to the transport loading aids 7b, 7c, 7d is prevented or at least limited by the transport safeguard 160, 174.

When the article carriers 3 of the article carrier stack group 8a, 8b, 8c are positioned against the transport safeguard 160, 174, for example against side walls of the transport safeguard 160, 174, lateral slipping of individual article carriers 3 in the article carrier stack group 8a, 8b, 8c or lateral slipping of the article carrier stack group 8a, 8b, 8c in relation to the transport loading aid 7b, 7c, 7d is prevented from the outset. The article carrier stack group 8a, 8b, 8c can be reliably transported when using the transport safeguard 160, 174 even if the mobile transport loading aid 7b, 7c, 7d is moved highly dynamically with the transport vehicle 9; 90.

Moreover, a stabilization of a position of the article carrier stack group 8a, 8b, 8c by the transport safeguard 160; 174 can also be provided during storage of the loaded transport loading aid 7b, 7c, 7d. This applies in particular if the transport safeguard 174 is formed on the mobile transport loading aid 7b, 7c.

The mobile transport loading aids 7b, 7c, 7d can also be unloaded reliably (automatically) at the unloading device 11. During the unloading operation of individual article carriers 3 or an article carrier stack, the transport safeguard 160; 174 prevents or at least limits lateral slipping of individual article carriers 3 in the article carrier stack group 8a, 8b, 8c or lateral slipping of the article carrier stack group 8a, 8b, 8c in relation to the transport loading aids 7b, 7c, 7d.

Although this is not at all obligatory, it can prove advantageous if the mobile transport loading aids 7b, 7c, 7d are loaded such that individual article carriers 3 or the article carrier stack group 8a, 8b, 8c are positioned against the transport safeguard 160, 174, for example against the side walls 161a, 161b of the transport vehicle 90 or the side walls 173a, 173b of the mobile transport loading aids 7b, 7c, 7d.

Step iv) may, firstly, comprise a step of providing article carrier stack groups 8a, 8b, 8c with a delivery load carrier 17a, 17b, 17c or providing article carrier stack groups 8a, 8b, 8c without a delivery load carrier 17a, 17b, 17c. The delivery load carrier 17a, 17b, 17c is predominantly a pallet.

For example, the article carriers 3 may contain fruit or vegetables, wherein, for example, a first article carrier stack group 8a, 8b, 8c contains a first type of vegetable and a second article carrier stack group 10 contains a second type of vegetable.

Step v) may comprise transporting empty transport loading aids 7a using the autonomously movable, driverless transport vehicles 9; 90 to a loading station and directly providing (an) empty loading aid(s) 7a on one or multiple automatically operated loading device(s) 10.

However, step v) may also comprise transporting empty transport loading aids 7a using the autonomously movable, driverless transport vehicles 9; 90 to a loading station onto a buffer surface 43 close to the loading device(s) 10 and transporting the empty transport loading aid(s) 7a using the autonomously movable, driverless transport vehicles 9; 90 to the loading device(s) 10 and providing the empty transport loading aid(s) 7a on one or multiple automatically operated loading device(s) 10.

Providing an empty transport loading aid 7a on one or multiple automatically operated loading device(s) 10 according to step v) may comprise the following step placing the empty transport loading aid 7a at a provisioning location 41 having the loading device 10 and providing the transport vehicle 9; 90 at the provisioning location 41 during the loading operation of the empty transport loading aid 7a according to step vi), or placing the empty transport loading aid 7a at a provisioning location 41 having the loading device 10 and subsequently moving the transport vehicle 9; 90 from the provisioning location 41, thus even before the start or during the loading operation of the empty transport loading aid 7a according to step vi).

Loading the empty transport loading aids 7a according to step vi) may comprise loading one of the empty transport loading aids 7a with a (single) article carrier stack group 8a, 8b, 8c. The article carrier stack group 8a, 8b, 8c is fed to the loading station essentially unchanged. In this context, "essentially unchanged" means that no separation of the article carrier stack group 8a, 8b, 8c into article carrier stack or individual article carriers (depalletizing operation) is performed before loading an empty transport loading aid 7a. "Essentially unchanged" also means that prior to loading an empty transport loading aid 7a a removal of a packaging film (stretch film or shrink film) and/or checking quality features in the manner described above is possible, even if individual article carriers 3 (for example with damaged articles) are removed from the article carrier stack group 8a, 8b, 8c in the course of the quality check.

Step ix) may comprise the storage of transport loading aids 7b loaded with an unchanged (complete) article carrier stack group 8a, 8b, 8c after loading at the loading station, and/or comprise transport loading aids 7c loaded with an unchanged (complete) article carrier stack group 8a, 8b, 8c after processing of a picking order.

Step x) may comprise transporting loaded transport loading aids 7b, 7c using the autonomously movable, driverless transport vehicles 9; 90 from the storage zone 5 (but possibly also from the loading station in the delivery zone 4) to an unloading station and directly providing (a) loaded loading aid(s) 7b, 7c on one or multiple automatically operated unloading device(s) 11.

However, step x) may also comprise transporting loaded transport loading aids 7b, 7c using the autonomously movable, driverless transport vehicles 9; 90 from the storage zone 5 (but possibly also from the loading station in the delivery zone 4) to an unloading station onto a buffer surface 73 close to the unloading device(s) 11 and transporting the loaded transport loading aid(s) 7b, 7c using the autonomously movable, driverless transport vehicles 9; 90 from the buffer surface 73 to the unloading device(s) 11 and providing the loaded transport loading aid(s) 7b, 7c on one or multiple unloading device(s) 11.

The transport vehicles 9; 90 may also be controlled by the main computer such that the transport vehicles 9; 90 arrive at the unloading station in a sequence provided by the packing sequence of the article carriers 3 at the target loading aid 70, 170. Thus, a sequencing of the transport loading aids 7b, 7b is achieved.

Providing a loaded transport loading aid (s) 7b, 7c on one or multiple automatically operated unloading device(s) 11 according to step x) may comprise the following step placing the loaded transport loading aid (s) 7b, 7c at a provisioning location 71a, 71b having the unloading device 11 and providing the transport vehicle 9; 90 at the provisioning location 71a, 71b during the unloading operation of the loaded transport loading aid (s) 7b, 7c according to step x), or placing the loaded transport loading aid (s) 7b, 7c at a provisioning location 71a, 71b having the unloading device 11 and subsequently moving the transport vehicle 9; 90 from the provisioning location 71a, 71b, thus even before the start or during the unloading operation of the loaded transport loading aid (s) 7b, 7c according to step x).

The transport of loaded transport loading aids 7b, 7c in step x) comprises stabilizing a position of the article carrier stack group 8a, 8b, 8c by the transport safeguard 160; 174 during the transport movement, as described above.

The unloading operation of one or multiple loaded transport loading aids 7b, 7c in step x) may comprise stabilizing a position of the article carrier stack group 8a, 8b, 8c by the transport safeguard 160; 170 during the unloading movement. This may be the case if the gripping system performed unloading movements, which were initially accordingly programmed, in the direction towards the transport safeguard 164, 170, to move at first one or at the same time multiple article carriers 3 against the transport safeguard 164, 170 in order to enable a safe reception of one or at the same time multiple article carrier(s) 3. Such an automatic unloading operation may, for example, be applied in case of article carriers 3 that are difficult to grip. However, this is not to be understood as obligatory, but rather the unloading operation can also be designed in such a way that the gripping system performs unloading movements, which were initially accordingly programmed, in the opposite direction to the direction of the transport safeguard 164, 170 in order to enable rapid pick-up of one or at the same time multiple article carrier(s) 3. Such an unloading operation may, for example, be applied in case of article carriers 3 that are simple to grip.

The method for storing and picking articles 2 can comprise the following step providing article carrier stack groups 8a, 8b, 8c on delivery load carriers 17a, 17b, 17c and loading one of the empty transport loading aids 7a with one of the article carrier stack groups 8a, 8b, 8c on a delivery load carrier 17a, 17b, 17c.

If the article carrier stack groups 8a, 8b, 8c are provided on delivery load carriers 17a, 17b, 17c in the delivery zone 4, the delivery load carriers 17a, 17b, 17c are transferred to empty transport loading aids 7a essentially "unchanged" in the manner described above, i.e. the article carrier stack group 8a, 8b, 8c is transferred with a delivery load carrier 17a, 17b, 17c onto an empty transport loading aid 7a by the loading device 10.

The method for storing and picking articles 2 can comprise the following step assembling the article carriers 3 for the picking order using the unloading device 11, in that an individual article carrier 3 removed from the article carrier stack group 8a, 8b, 8c or an article carrier stack removed from the article carrier stack group 8a, 8b, 8c is transferred onto a target loading aid 70; 170.

According to this embodiment, the one or multiple automatically operated unloading device(s) 11 at the same time forms one or multiple reloading device(s) and/or picking device(s) for assembling the article carriers 3 for a picking order. The article carrier stack comprises multiple article carriers 3 arranged on top of one another.

The method for storing and picking articles 2 can additionally comprise one of the steps x)

i) transporting a transport loading aid 7b, 7c from the unloading station back to the storage zone 5 after removing the article carriers 3 if not all article carriers 3 have been removed from the transport loading aid 7b, 7c, or ii) transporting a transport loading aid 7b, 7c from a first unloading device 11 to a second unloading device 11 after removing the article carriers 3 if not all article carriers 3 have been removed from the transport loading aid 7b, 7c and if the article carriers 3 are needed at the second unloading device 11 for a picking order, or iii) transporting a transport loading aid 7b, 7c from the unloading device 11 to a waiting zone 74 in the unloading station after removing the article carriers 3 if not all article carriers 3 have been removed from the transport loading aid 7b, 7c and if the article carriers 3 are needed at the unloading device 11 or one of the unloading devices 11 for an already advised picking order, or iv) transporting a transport loading aid 7b, 7c back to the loading station after removing and providing the transport loading aid 7b, 7c either at the automatically operated loading device 10 or on the buffer surface 43, if all article carriers 3 have been 7b, 7c removed from the transport loading aid 7b, 7c, and iv) stabilizing a position of a changed "opened" article carrier stack group 8a, 8b, 8c if not all article carriers 3 were removed from the transport loading aid 7b, 7c, by the transport safeguard 160; 174 during the transport movement according to case i), ii) and iii).

In the present context, "stabilizing a position of an "opened" article carrier stack group according to step x) means that lateral slipping of individual article carriers 3 in the "opened" article carrier stack group 8a, 8b, 8c or lateral slipping of the "opened" article carrier stack group 8a, 8b, 8c in relation to the transport loading aids 7b, 7c is prevented or at least limited by the transport safeguard 160, 174. The "opened" article carrier stack group 8a, 8b, 8c can be reliably transported by the transport safeguard 160, 174 even if the mobile transport loading aid 7b, 7c is moved highly dynamically with the transport vehicle 9; 90.

In the present context, an "opened" article carrier stack group 8a, 8b, 8c means that at least one article carrier 3 was removed from the article carrier stack group 8a, 8b, 8c which was "provided unchanged". Accordingly, the article carrier stack group 8a, 8b, 8c was changed (in terms of the number of article carriers).

As indicated merely in FIG. 1b and explained with the example of the described picking system, the method for storing and picking articles 2 may additionally comprise the steps providing a first temperature zone 220a in the storage zone 5, in which the transport loading aids 7b, 7c with the article carrier stack groups 8a, 8b, 8c comprising article carriers 3 arranged next to one another and on top of one another containing articles 2 of a first article group are disposed, providing a second temperature zone 220b in the storage zone 5, in which the transport loading aids 7b, 7c with the article carrier stack groups 8a, 8b, 8c comprising article carriers 3 arranged next to one another and on top of one another containing articles 2 of a second article group are disposed, defining a first article group and of a second article group, to which first article group articles 2 of a first storage temperature are assigned and to which second article group articles 2 of a second storage temperature are assigned, and detecting data comprising data of the first article group, in particular a first storage temperature for the articles 2, and the second article group, in particular a second storage temperature for the articles 2, on a computer (which is connected to the control system 16), identifying the article carrier stack group 8a, 8b, 8c and/or transport loading aid 7b, 7c using a detecting device 22 provided in the delivery zone 4 by reading a data carrier 25a, 25b, 25c (RFID, barcode), the data carrier 25a, 25b, 25c being arranged in each case on the article carrier stack groups 8a, 8b, 8c and/or transport loading aids 7b, 7c, selectively transporting the transport loading aids 7b, 7c in each case loaded with the article carrier stack group 8a, 8b, 8c in step vi) at the loading device 10 using the autonomously movable, driverless transport vehicles 9; 90 either into the first temperature zone 220a or the second temperature zone 220b and stabilizing a position of the article carrier stack group 8a, 8b, 8c by the transport safeguard 160; 174 during the transport movement of the loaded transport loading aid 7b, 7c, storing the transport loading aids 7b, 7c with the article carrier stack group 8a, 8b, 8c comprising article carriers 3 arranged next to one another and on top of one another containing articles 2 of the first article group in the first temperature zone 220a (and optionally stabilizing a position of the article carrier stack group 8a, 8b, 8c by the transport safeguard 160; 174 during storage of the loaded first transport loading aid 7b, 7c), and storing the transport loading aids 7b, 7c with the article carrier stack group 8a, 8b, 8c comprising article carriers 3 arranged next to one another and on top of one another containing articles 2 of the second article group in the second temperature zone 220b (and optionally stabilizing a position of the article carrier stack group 8a, 8b, 8c by the transport safeguard 160; 174 during storage of the loaded second transport loading aid 7b, 7c).

The method for storing and picking articles 2 can additionally comprise the following steps transporting one or multiple transport loading aid(s) 7b, 7c containing the article carriers 3 required for a first picking order from the first temperature zone 220a, and transporting one or multiple transport loading aid(s) 7b, 7c containing the article carriers 3 required for a second picking order from the second temperature zone 220b, to the unloading station using a shared, automatically operated unloading device 11 and stabilizing a position of the article carrier stack group by the transport safeguard 160; 174 during the transport movement of the loaded transport loading aid(s) 7b, 7c, providing the transport loading aid(s) 7b, 7c for the first picking order either at the automatically operated unloading device 11 or on a buffer surface 73 near the unloading device 11 using the autonomously movable, driverless transport vehicle(s) 9; 90, providing the transport loading aid(s) 7b, 7c for the second picking order either at the automatically operated unloading device 11 or on a buffer surface 73 near the unloading device 11 using the autonomously movable, driverless transport vehicle(s) 9; 90, and sequentially assembling article carriers 3 on a first target loading aid 70; 170 with multiple article carriers 3 containing articles 2 of a first article group, and assembling article carriers 3 on a second target loading aid 70; 170 with multiple article carriers 3 containing articles 2 of a second article group at the removing station with a shared, automatically operated unloading device 11.

The method described above for storing and picking articles 2 in the picking warehouse 1 may additionally comprise the following step providing stack loading aids 100a, 100b, each for receiving and stabilizing a position of an order stack 106 assembled of the article carriers 3 according to a picking order.

Providing the stack loading aids in the picking warehouse 1 may comprise providing one or multiple first stack loading aid(s) 100a and/or one or multiple second stack loading aid(s) 100b. The first stack loading aid 100a and the second stack loading aid 100b each comprise a base wall part 206 and side walls 208a, 208b projecting from the base wall part 206.

On the one hand, the side walls 208a, 208b form the transport safeguard 207 for stabilizing a position of an order stack 106 when the order stack 106 together with the target loading aid 70 is received on the base wall part 206 of the first stack loading aid 100a.

On the other hand, the side walls 208a, 208b form the transport safeguard 207 for stabilizing a position of an order stack 106 when the order stack 106 is received on the base wall part 206 of the second stack loading aid 100b.

However, in principle, it would also be conceivable that the first stack loading aid(s) 100a and/or second stack loading aid(s) 100b are formed without the side walls 208a, 208b described above. In this case, the transport safeguard 207 for stabilizing a position of an order stack 106, when the order stack 106 is received by the first stack loading aid 100a or the second stack loading aid 100b, in particular on the base wall part 206, is formed by the transport vehicle(s) 90 described above in FIG. 3b.

In the present context, "stabilizing a position of an order stack" means that lateral slipping of individual article carriers 3 in the order stack 106 or lateral slipping of the order stack 106 in relation to the stack loading aid 100a, 100b is prevented or at least limited by the transport safeguard 207.

The order stack 106 can be reliably transported by the transport safeguard 207 even if the mobile stack loading aid 100a, 100b is moved highly dynamically with the transport vehicle 9; 90.

The mobile stack loading aids 100a, 100b can also be loaded with article carriers 3 reliably (automatically) at the unloading device 11. During the loading operation (picking operation), lateral slipping of individual article carriers 3 in the order stack 106 or lateral slipping of the order stack 106 in relation to the stack loading aid 100a, 100b is prevented or at least limited by the transport safeguard 207.

Although this is not at all obligatory, it can prove advantageous if the mobile stack loading aids 100a, 100b are loaded such that individual article carriers 3 or the order stack 106 are positioned against the transport safeguard 207, for example against the side walls 161a, 161b of the transport vehicle 90 or the side walls 208a, 208b of the mobile stack loading aids 100a, 100b.

If the first stack loading aids 100a are used in the picking warehouse 1, the method may additionally comprise the following step lading the first stack loading aid 100a with a target loading aid 70 at the lading station using one or multiple automatically operated lading device(s) 110 by placing the target loading aid 70 on the base wall part 205.

If the second stack loading aids 100b are used in the picking warehouse 1, the method may additionally comprise the following step defining the second stack loading aid 100b as the target loading aid 170 by the second stack loading aids 100b forming the target loading aids 170.

If the first stack loading aids 100a and the second stack loading aids 100b are used in the picking warehouse 1, the method may additionally comprise the following steps lading the first stack loading aid 100a with a target loading aid 70 at the lading station using one or multiple automatically operated lading device(s) 110 by placing the target loading aid 70 on the base wall part 206, and defining the second loading aid 100b as the target loading aid 170.

The method for storing and picking articles 2 can additionally comprise the following steps transporting first/second stack loading aids 100a, 100b using the autonomously movable, driverless transport vehicles 9; 90 to the unloading station and providing one or multiple stack loading aid(s) 100a, 100b either on one or on multiple automatically operated unloading device(s) 11 or on a buffer surface 92 close to the unloading device(s) 11, and assembling the article carriers 3 according to the picking order to the order stack 106 on the target loading aid 70 in the first stack loading aid 100a or on the base wall part 206 of the second stack loading aid 100b, the first stack loading aid 100a or second stack loading aid 100b being provided at the automatically operated unloading device(s) 11.

The method for storing and picking articles 2 described above may additionally comprise the following steps for processing a picking order at one or multiple semi-automated unloading device(s) 100 transporting one or multiple transport loading aid(s) 7*b*, 7*c*, 7*d* containing the article carriers 3 required for the picking order from the loading station and/or from the storage zone 5 to an unloading station and providing the transport loading aid(s) 7*b*, 7*c*, 7*d* either at one or at multiple semi-automated unloading device(s) 100 or on a buffer surface 104*a* close to the unloading device (s) 100 using one or multiple autonomously movable, driverless transport vehicle(s) 9; 90 and stabilizing a position of the article carrier stack group 8*a*, 8*b*, 8*c* by the transport safeguard 160; 174 during the transport movement of the loaded transport loading aid, 7*b*, 7*c*, manually unloading one or multiple ones of the transport loading aid(s) 7*b*, 7*c* which is (are) provided at the semi-automated unloading device(s) 100, by removing the article carriers 3 required for processing the picking order and optionally stabilizing a position of the article carrier stack group 8*a*, 8*b*, 8*c* by the transport safeguard 160; 174 during the manually unloading movements of a warehouse worker at the automatically operated unloading device(s) 11, and manually assembling the article carriers 3 on one or multiple target loading aids 70; 170 for the picking order, if the target loading aid(s) 70; 170 is (are) provided at the semi-automated unloading device(s) 100.

In the present context, "stabilizing a position of an article carrier stack group" means that lateral slipping of individual article carriers 3 in the article carrier stack group 8*a*, 8*b*, 8*c* or lateral slipping of the article carrier stack group 8*a*, 8*b*, 8*c* in relation to the transport loading aids 7*b*, 7*c* is prevented or at least limited by the transport safeguard 160, 174. The article carrier stack group 8*a*, 8*b*, 8*c* can be reliably transported by the transport safeguard 160, 174 even if the mobile transport loading aid 7*b*, 7*c* is moved highly dynamically with the transport vehicle 9; 90, as described above.

The mobile transport loading aids 7*b*, 7*c* can also be unloaded reliably (manually) at the unloading device 100. If a stabilization of a position of the article carrier stack group 8*a*, 8*b*, 8*c* during the unloading movement of individual article carriers 3 or an article carrier stack is provided, the transport safeguard 160; 174 can prevent or at least limit lateral slipping of individual article carriers 3 in the article carrier stack group 8*a*, 8*b*, 8*c* or lateral slipping of the article carrier stack group 8*a*, 8*b*, 8*c* in relation to the transport loading aids 7*b*, 7*c*.

This can prove advantageous if the warehouse worker moves one or multiple article carriers 3 at the same time initially against the transport safeguard 164, 170, thereby enabling safe pickup of one or multiple article carrier(s) 3 at the same time. Such a manual unloading operation may, for example, be applied in case of article carriers 3 that are difficult to grip. However, this is not to be understood as obligatory, but rather the unloading operation can also be embodied in such a way that the warehouse worker initially performs an unloading movement in the opposite direction to the direction of the transport safeguard 164, 170 in order to enable rapid pick-up of one or at the same time multiple article carrier(s) 3. Such an unloading operation may, for example, be applied in case of article carriers 3 that are simple to grip.

Likewise, the aforementioned advantages for "stabilizing a position of an order stack" at the automatically operated loading device(s) 11 also apply to the use of the mobile stack loading aids 100*a*, 100*b* at the semi-automated loading device 100.

Providing loaded transport loading aid(s) 7*b*, 7*c* at one or multiple semi-automated unloading device(s) 100 may comprise the following steps taking over a transport loading aid 7*b*, 7*c* from an autonomously movable, driverless transport vehicle 9; 90 to a lifting platform 105*a* of the semi-automated unloading device(s) 100, and providing the article carriers 3 at a providing level by lifting the transport loading aid 7*b*, 7*c* placed on the lifting platform 105*a* in order to enable ergonomic unloading of the article carriers 3 by a picker.

The method for storing and picking articles 2 may additionally comprise the following steps for processing a picking order at one or multiple semi-automated unloading device(s) 100 transporting empty target loading aids 70; 170, using the autonomously movable, driverless transport vehicles 9; 90, to the unloading station and providing the empty target loading aids 70; 170 either at one or multiple semi-automated unloading device(s) 100 or on a buffer surface 104*b* close to the unloading device(s) 100 using one or multiple autonomously movable, driverless transport vehicles 9; 90, and manually assembling the article carriers 3 on one or multiple empty target loading aids 70; 170 for the picking order, if the empty target loading aid(s) 70; 170 is (are) provided at the semi-automated unloading device(s) 100.

The method for storing and picking articles 2 may additionally comprise the following steps for processing a picking order at one or multiple semi-automated unloading device(s) 100 transporting partially loaded target loading aids 70; 170 using the autonomously movable, driverless transport vehicles 9; 90 from the automatically operated unloading device 11 to the semi-automated unloading device 100 or to a buffer surface 104*b* close to the semi-automated unloading device(s) 100 after the article carriers 3 have been assembled on the partially loaded target loading aid 70; 170 at the automatically operated unloading device 11 and if article carriers 3 are still required for the picking order which are provided via the transport loading aids 7*b*, 7*c* at the semi-automated unloading device(s) 100, and manually assembling the article carriers 3 on one or multiple partially loaded target loading aids 70; 170 for the picking order, if the partially loaded target loading aid(s) 70; 170 is (are) provided at the semi-automated unloading device(s) 100.

The method for storing and picking articles 2 may additionally comprise the following steps for processing a picking order at one or multiple semi-automated unloading device(s) 100 transporting stack loading aids 100*a*, 100*b* using the autonomously movable, driverless transport vehicles 9; 90 to the unloading station and providing one or multiple stack loading aid(s) 100*a*, 100*b* either on one or on multiple semi-automated unloading device(s) 100 or on a buffer surface 104*b* close to the unloading device(s) 100, and assembling the article carriers 3 according to the picking order to the order stack 106 on the target loading aid 70 in the first stack loading aid 100*a* or on the base wall part 206 of the second stack loading aid 100*b*, the first stack loading aid 100*a* or second stack loading aid 100*b* being provided at the semi-automated unloading device (s) 100.

The method for storing and picking articles 2 can additionally comprise the following steps providing an order stack load securing station either with one or multiple automatically operated load securing device(s) 120 or with one or multiple automatically operated load securing device(s) 120 and a buffer surface 125 close to the load securing device(s) 120, the load securing devices 120 being formed for secure transport of an order stack 106 with a securing means 121, transporting the stack loading aids 100*a*, 100*b* each loaded with one order stack 106 using the autonomously movable, driverless transport vehicles 9; 90 to the order stack load securing station and providing one or multiple stack loading aid(s) 100*a*, 100*b* either on one or on multiple automatically operated load securing device(s) 120 or on a buffer surface 125 close to the load securing device(s) 120, removing the order stack 106 from the stack loading aid 100*a*, 100*b* using a lifting device 123, 124, by means of which the target loading aid 70 with the order stack 106 is lifted from the first stack loading aid 100*a*, if the picking warehouse 1 comprises the first stack loading aid 100*a*, or by means of which the order stack 106 is lifted from the second stack loading aid 100*b* if the picking warehouse 1 comprises the second stack loading aid 100*b*, securing the order stack 106 by placing the securing means 121 circumferentially around the order stack 106 using the automatically operated load securing device 120, and transporting the secured order stack 106, in particular using the autonomously movable, driverless transport vehicles 9; 90, from the load securing station to a shipping zone.

According to the first embodiment, the target loading aid 70 with the order stack 106 is lifted relative to the first stack loading aid 100*a*, and the order stack 106 lifted from the first stack loading aid 100*a* is simultaneously wrapped with the securing means 121 for stabilization. Subsequently, the secured order stack 106 is lowered again using the lifting device and transferred to a stationary conveying system (not shown) or to an autonomously movable, driverless transport vehicle 9; 90. The order stack 106 now secured may be transported from the load securing station to a shipping zone (consolidation area or article issue area). In this case, the target loading aid 70 forms the shipping load carrier.

According to the second embodiment, the order stack 106 is lifted relative to the second stack loading aid 100*b*, and the order stack 106 lifted from the second stack loading aid 100*b* is simultaneously wrapped with the securing means 121 for stabilization. Subsequently, the secured order stack 106 is lowered again using the lifting device and transferred to a shipping load carrier, preferably a roll container, a pallet and the like. The shipping load carrier is transported using a stationary conveying system (not shown) or an autonomously movable, driverless transport vehicle 9; 90 from the load securing station to a shipping zone (consolidation area or article issue area).

Transporting the unloaded stack loading aids 100*a*, 100*b* using the autonomously movable, driverless transport vehicles 9; 90 may comprise the following step(s)

transporting the first stack loading aid 100*a* from the load securing station to the lading station with one or multiple automatically operated lading device(s) 110, if a first stack loading aid is 100*a* used in the picking warehouse 1, and/or transporting the second stack loading aid 100*b* from the load securing station to the unloading station and providing the second stack loading aid(s) 100*b* either at an automatically operated unloading device 11 or on a buffer surface 92 close to the unloading device 11, if a second stack loading aid 100*b* is used in the picking warehouse 1, and/or transporting the second stack loading aid 100*b* from the load securing station to the unloading station and providing the second stack loading aid(s) 100*b* either at a semi-automated unloading device 100 or on a buffer surface 104*b* close to the unloading device 100, if a second stack loading aid 100*b* is used in the picking warehouse 1.

The method for storing and picking articles 2 in the picking warehouse 1 can additionally comprise the following steps providing a cleaning system with an automatically operated cleaning robot 85 (as schematically depicted in FIG. 1*a*), and cleaning the transport loading aids 7*a*, 7*b*, 7*c*, 7*d* and/or the floor at the loading station and/or unloading station (therefore the provisioning locations, the buffer surface and according to the first embodiment the waiting zone) and storage surface 45 in the storage zone 5 with the cleaning robot 85.

It should also be noted that the provisioning locations 41, 71*a*, 71*b*, 101*a* may also be formed on an automatically operated stationary conveying system for transporting the transport loading aids 7*a*, 7*b*, 7*c* to the provisioning location 41, 71*a*, 71*b*, 101*a* and transporting the transport loading aids 7*a*, 7*b*, 7*c* away from the provisioning location 41, 71*a*, 71*b*, 101*a*, wherein transport sections of this stationary conveying system form the provisioning locations 41, 71*a*, 71*b*, 101*a* for providing the transport loading aids 7*a*, 7*b*, 7*c*. Additionally, this stationary conveying system can form a take-over location and a hand-over location in a transport section.

Below, this will be described using an example in which a transport loading aid 7*a*, 7*b*, 7*c* is to be provided at an automatically operated unloading device 11.

One of the autonomously movable, driverless transport vehicles 9 transports a transport loading aid 7*b*, 7*c* to the stationary conveying system, where the transfer of the transport loading aid 7*b*, 7*c* from the transport vehicle 9 to the take-over location is performed. Then, the transport loading aid 7*b*, 7*c* is transported from the take-over location to the provisioning location 71*a*, 71*b*. After removing the article carriers 3 from the transport loading aid 7*b*, 7*c*, when it is provided at the unloading device 11, in particular on a provisioning location 71*a*, 71*b*, the transport loading aid 7*b*, 7*c* is transported from the provisioning location 71*a*, 71*b* to the hand-over location, where the transfer of the transport loading aid 7*b*, 7*c* from the handover location onto the transport vehicle 9 is performed.

Likewise, a transport loading aid 7*a*, 7*b*, 7*c* can be provided at a semi-automated unloading device 100.

Likewise, provisioning locations 91*a*, 91*b*, 101*b*, 111, 122 may also be formed on an automatically operated stationary conveying system for transporting the stack loading aids 100*a*, 100*b* to the provisioning location 91*a*, 91*b*, 101*b*, 111, 122 and transporting the stack loading aids 100*a*, 100*b* away from the provisioning location 91*a*, 91*b*, 101*b*, 111, 122, wherein transport sections of this stationary conveying system form the provisioning locations 91*a*, 91*b*, 101*b*, 111, 122 for providing the stack loading aids 100*a*, 100*b*. Additionally, this stationary conveying system can form a take-over location and a hand-over location in a transport section.

Below, this will be described using an example in which a stack loading aid 100a, 100b is to be provided at an automatically operated unloading device 11.

One of the autonomously movable, driverless transport vehicles 9 transports a stack loading aid 100a, 100b to the stationary conveying system, where the transfer of the stack loading aid 100a, 100b from the transport vehicle 9 to the take-over location is performed. Then, the stack loading aid 100a, 100b is transported from the take-over location to the provisioning location 91a, 91b. After loading of the stack loading aid 100a, 100b with article carriers 3, when these are provided at the unloading device 100, in particular on a provisioning location 91a, 91b, the stack loading aid 100a, 100b is transported from the provisioning location 91a, 91b to the hand-over location, where the transfer of the stack loading aid 100a, 100b from the handover location onto the transport vehicle 9 is performed.

Likewise, a stack loading aid 100a, 100b can be provided at a semi-automated unloading device 100.

In summary, it can be noted that provisioning locations 41, 71a, 71b, 101a for the transport loading aids 7a, 7b, 7c, 7d and/or the provisioning locations 91a, 91b, 101b, 111, 122 for the stack loading aid 100a, 100b can be formed on the floor or on the automatically operated stationary conveying system and are not driven or are driven.

The described picking warehouse and method for storing and picking is particularly suitable for the fresh food sector where perishable articles, such as fruit and vegetables, require a fast turnover of articles and usually only a limited number of different types have to be picked at the same time. The articles 2/article carrier 3 may be handled particularly efficiently with a high picking performance in short periods of time.

Finally, it should also be noted that the scope of protection is determined by the claims. Nevertheless, the description and drawings are to be used for construing the claims. Individual features or feature combinations from the different exemplary embodiments shown and described may represent independent inventive solutions.

In particular, it should also be noted that the devices shown may in reality comprise more or fewer components than those shown. In some cases, the shown devices and/or their components may not be depicted to scale and/or be enlarged and/or reduced in size.

LIST OF REFERENCE NUMBERS

1 Picking warehouse
2 Article(s)
3 Article carrier
4 Delivery zone
5 Storage zone
6 Order processing zone
7a . . . 7d Transport loading aid
8a . . . 8c Article carrier stack group
9 Transport vehicle
10 Loading device
11 Unloading device (automatic)
15 Order-processing computer
16 Control system
17a . . . 17c Delivery load carrier
20 Testing device
21 Conveying system of checking station
22 Detecting device
23 Input and/or output device 24 Clamping and lifting device
25a . . . 25d Data carrier
26a Upper article carrier stack
26b Lower article carrier stack
27a . . . 27b Clamping jaw
28 Lifting frame
30 Conveying system of loading station
31 Conveying system between checking station and loading station
40 Provisioning location for article carrier stack group of loading device
41 Provisioning location for transport loading aid of loading device
42 Transfer device of loading device
43 Buffer surface for transport loading aid of loading device
45 Storage surface
50 Conveying system of loading device
51 Telescopic fork
52 Tilting and back tilting device
53 Placing plate
70 Target loading aid
71a . . . 71b Provisioning location for transport loading aid of automatic unloading device
72 Transfer device of unloading device
73 Buffer surface for transport loading aid
74 Waiting zone
80 Support construction
81 Gantry slide
82 Gantry arm
83 Gantry slide
84 Gantry slide
85 Cleaning robot
90 Transport vehicle
91a . . . 91b Provisioning location for stack loading aid of automatic unloading device
92 Buffer surface for stack loading aid of automatic unloading device
100 Unloading device (manual)
100a First stack loading aid
100b Second stack loading aid
101a Provisioning location for transport loading aid of manual unloading device
101b Provisioning location for stack loading aid of manual unloading device
102 Working area
103 Working surface
104a Buffer surface for transport loading aid of manual unloading device
104b Buffer surface for stack loading aid of manual unloading device
105a Lifting platform of transport loading aid
105b Lifting platform of stack loading aid
106 Order stack
110 Lading device
111 Provisioning location for stack loading aid of lading device
112 Transfer device of lading device
113 Buffer surface for stack loading aid of lading device
120 Load securing device
121 Securing means
122 Provisioning location for stack loading aid of load securing device
123 Lifting frame
124 Telescopic fork
125 Buffer surface for stack loading aid of load securing device

53

150 Chassis
151 Loading platform
152 Wheel
153 Steerable wheel
154 Drive control
160 Transport safeguard of transport vehicle
161a . . . 161b Side wall
170 Target loading aid
171 Base wall part
172 Transport frame
173a . . . 173b Side wall
174 Transport safeguard of transport loading aid
175 Foot
176a First longitudinal edge
176b Second longitudinal edge
205 Transport frame
206 Base wall part
207 Transport safeguard of stack loading aid
208a . . . 208b Side wall
209 Foot
210a First longitudinal edge
210b Second longitudinal edge
215 Receiving channel
216 Placing block
220a First temperature zone
220a Second temperature zone

The invention claimed is:

1. A method for storing and picking article carriers that contain articles and are stackable in a picking warehouse, comprising the steps providing a plurality of autonomously movable, driverless transport vehicles in the picking warehouse, each of the autonomously movable, driverless transport vehicles having a chassis with a drive unit and a loading platform arranged on the chassis for receiving a mobile transport loading aid, providing article carrier stack groups comprising multiple article carriers arranged next to one another and on top of one another in a delivery zone of the picking warehouse, providing mobile transport loading aids, each of the mobile transport loading aids being configured for receiving an article carrier stack group of the article carrier stack groups in the picking warehouse, wherein the mobile transport loading aids comprise a plurality of empty transport loading aids, wherein each of the mobile transport loading aids comprises a transport rack having a transport frame against which the loading platform of a transport vehicle can be positioned, and a base having a base wall part on which the article carrier stack group can be placed, providing on at least some of the autonomously movable, driverless transport vehicles, or on at least some of the mobile transport loading aids, a transport safeguard configured for stabilizing a position of an article carrier stack group of the article carrier stack groups, wherein each of the at least some of the autonomously movable, driverless transport vehicles comprises the loading platform, and first and second side walls, the first side wall and the second side wall being arranged adjacently to the loading platform and forming the transport safeguard, or

wherein each of the at least some of the mobile transport loading aids comprises first and second side walls, the first side wall and the second side wall forming the transport safeguard, and wherein the base wall part is both inclined downwardly at a first inclination angle with respect to a horizontal plane spanned between the first side wall and the second side wall in a first direction towards the first side wall, and inclined downwardly at a second inclination angle with respect to a horizontal plane spanned between the first side wall and the second side wall in a second direction towards the second side wall, wherein the first side wall and the second side wall enclose an angle and are aligned perpendicularly to the base wall part, transporting empty transport loading aids of the plurality of empty transport loading aids using autonomously movable, driverless transport vehicles of the plurality of autonomously movable, driverless transport vehicles to a loading station and providing at least one of the empty transport loading aids at an automatically operated first loading device or on a buffer surface close to the automatically operated first loading device, loading the at least one empty transport loading aid provided at the automatically operated first loading device with at least one of the article carrier stack groups from the delivery zone using the automatically operated first loading device in order to provide at least one loaded transport aid, transporting the at least one loaded transport loading aid containing the at least one article carrier stack group from the loading station to a storage zone using an autonomously movable, driverless transport vehicle of the autonomously movable, driverless transport vehicles and stabilizing the position of the at least one article carrier stack group by the transport safeguard during the transport movement of the at least one loaded transport loading aid, placing the at least one loaded transport loading aid containing the at least one article carrier stack group on a storage surface in the storage zone, storing the at least one loaded transport loading aid containing the at least one article carrier stack group in the storage zone, processing a picking order comprising the following steps transporting the at least one loaded transport loading aid containing the article carriers required for the picking order from the storage zone to an unloading station and providing the at least one loaded transport loading aid at an automatically operated unloading device or on a buffer surface close to the automatically operated unloading using an autonomously movable, driverless transport vehicle of the autonomously movable, driverless transport vehicles and stabilizing the position of the article carrier stack group by the transport safeguard during the transport movement of the loaded transport loading aid, unloading the at least one loaded transport loading aid provided at the automatically operated unloading device by removing the article carriers required for processing the picking order, and assembling the article carriers on at least one target loading aid for the picking order in an order processing zone of the picking warehouse.

2. The method for storing and picking articles according to claim 1, wherein providing article carrier stack groups comprises providing article carrier stack groups on delivery load carriers, and loading one of the empty transport loading aids with one of the article carrier stack groups comprises loading one of the empty transport loading aids with an article carrier stack group on a delivery load carrier.

3. The method for storing and picking articles according to claim 1, wherein assembling the article carriers for the picking order is performed such that an individual article carrier removed from the article carrier stack group at the unloading device or an article carrier stack removed from the article carrier stack group is transferred onto a target loading aid by the unloading device.

4. The method for storing and picking articles according to claim 1, comprising at least one of the steps i) transporting a transport loading aid from the unloading station back to the storage zone after removing of the article carriers, if not all of the article carriers have been removed from the transport loading aid, ii) transporting a transport loading aid from a first automatically operated unloading device to a second automatically operated unloading device after removing of the article carriers, if not all of the article carriers have been removed from the transport loading aid and if the article carriers are needed at the second automatically operated unloading device for the picking order, iii) transporting a transport loading aid from the automatically operated unloading device to a waiting zone in the unloading station after removing of the article carriers, if not all of the article carriers have been removed from the transport loading aid and if the article carriers are needed at the automatically operated unloading device or one of the automatically operated unloading devices for an already advised picking order, iv) transporting a transport loading aid back to the loading station after removing of the at least one of the article carrier stack groups and providing the transport loading aid at the automatically operated first loading device or on the buffer surface, if all article carriers have been removed from the transport loading aid, and v) stabilizing the position of an opened article carrier stack group, if not all article carriers were removed from the transport loading aid, by the transport safeguard during the transport movement according to case i), ii) and iii).

5. The method for storing and picking articles according to claim 1, wherein the article carriers are selected from the group consisting of containers and cartons.

6. The method for storing and picking articles according to claim 1, wherein the article carriers have different dimensions.

7. The method for storing and picking articles according to claim 1, comprising the steps providing a first temperature zone in the storage zone, in which the loaded transport loading aids respectively containing the at least one article carrier stack group of article carriers arranged next to one another and on top of one another and storing articles of a first article group are disposed, providing a second temperature zone in the storage zone, in which the loaded transport loading aids respectively containing the at least one article carrier stack group of article carriers arranged next to one another and on top of one another and storing articles of a second article group are disposed, defining the first article group and the second article group, to which first article group, articles of a first storage temperature are assigned and to which second article group, articles of a second storage temperature are assigned, and detecting data comprising the first storage temperature for the articles of the first article group, and the second storage temperature for the articles of the second article group, on a computer system, identifying at least one of the article carrier stack groups and the loaded transport loading aids using a detecting device provided in the delivery zone by reading a data carrier, the data carrier being affixed in each case on the at least one of the article carrier stack groups and the loaded transport loading aids, selectively transporting the loaded transport loading aids respectively containing at least one article carrier stack group using autonomously movable, driverless transport vehicles of the autonomously movable, driverless transport vehicles, into one of the first temperature zone and the second temperature zone and stabilizing the position of the article carrier stack group by the transport safeguard during the transport movement, storing the loaded transport loading aids respectively containing the at least one article carrier stack group of article carriers arranged next to one another and on top of one another containing articles of the first article group in the first temperature zone, storing the loaded transport loading aids respectively containing the at least one article carrier stack group of article carriers arranged next to one another and on top of one another containing articles of the second article group in the second temperature zone.

8. The method for storing and picking articles according to claim 7, comprising the steps transporting at least one of the loaded transport loading aids containing the article carriers required for a first picking order from the first temperature zone and transporting at least one of the loaded transport loading aids containing the article carriers required for a second picking order from the second temperature zone to the unloading station using a shared, automatically operated unloading device and stabilizing the position of the article carrier stack group by the transport safeguard during the transport movement, providing the loaded transport loading aid for the first picking order at the automatically operated unloading device or on a buffer surface near the automatically operated unloading device using an autonomously movable, driverless transport vehicle of the autonomously movable, driverless transport vehicles, providing the loaded transport loading aid for the second picking order at the automatically operated unloading device or on a buffer surface near the automatically operated unloading device using an autonomously movable, driverless transport vehicle of the autonomously movable, driverless transport vehicles, sequentially assembling article carriers on a first target loading aid with multiple article carriers containing articles of a first article group, and assembling article carriers on a second target loading aid with multiple article carriers containing articles of a second article group using the shared, automatically operated unloading device of the unloading station.

9. The method for storing and picking articles according to claim 1, further comprising the steps providing stack loading aids in each case for receiving and stabilizing a position of an order stack assembled of the article carriers according to the picking order, wherein the stack loading aids comprise at least one first stack loading aid and at least one second stack loading aid, each of which comprise a base wall part and side walls connected to the base wall part, and at least one of the steps lading the first stack loading aid with a target loading aid at a lading station using at least one automatically operated lading device, by placing the target loading aid on the base wall part if a first stack loading aid is used in the picking warehouse, and defining the second stack loading aid as the target loading aid if a second stack loading aid is used in the picking warehouse.

10. The method for storing and picking articles according to claim 9, further comprising the steps transporting the stack loading aids using the autonomously movable, driverless transport vehicles to the unloading station and providing at least one stack loading aid at at least one automatically operated unloading device or on a buffer surface close to the automatically operated unloading device, and assembling the article carriers according to the picking order to the order stack on the target loading aid in the first stack loading aid or on the base wall part of the second stack loading aid, wherein the first stack loading aid or the second stack loading aid is provided at the automatically operated unloading device.

11. The method for storing and picking articles according to claim 9, further comprising the steps providing an order stack load securing station with at least one automatically operated load securing device or with at least one automatically operated load securing device and a buffer surface close to the automatically operated load securing device, the automatically operated load securing device being formed for secure transport of an order stack with a securing means comprising a winding film or a fastening tape, transporting the stack loading aids each loaded with one order stack using autonomously movable, driverless transport vehicles of the autonomously movable, driverless transport vehicles to the order stack load securing station and providing at least one stack loading aid on the automatically operated load securing device or on the buffer surface close to the load securing device, removing the order stack from the stack loading aid using a lifting device which lifts the target loading aid one partially loaded target loading aid at the automatically operated unloading device and if article carriers are still required for the picking order which are provided via the at least one loaded transport loading aid at the semi-automated unloading device, and manually assembling the article carriers on the at least one partially loaded target loading aid for the picking order at the semi-automated unloading device.

12. The method for storing and picking articles according to claim 1, wherein processing a picking order additionally comprises the steps transporting at least one of the loaded transport loading aids containing the article carriers required for the picking order from the storage zone to the unloading station and providing the loaded transport loading aid at a semi-automated unloading device or on a buffer surface close to the semi-automated unloading device using at least one autonomously movable, driverless transport vehicle of the autonomously movable, driverless transport vehicles and stabilizing the position of the article carrier stack group by the transport safeguard during the transport movement of the at least one loaded transport loading aid, manually unloading the at least one of the loaded transport loading aid provided at the semi-automated unloading device by removing the article carriers required for processing the picking order, and manually assembling the article carriers on at least one target loading aid for the picking order at the semi-automated unloading device.

13. The method for storing and picking articles according to claim 12, wherein providing the loaded transport loading aid at the semi-automated unloading device comprises the steps taking over the loaded transport loading aid from an autonomously movable, driverless transport vehicle of the autonomously movable, driverless transport vehicles to a lifting platform of the semi-automated unloading device, providing the article carriers at a provisioning level by lifting the loaded transport loading aid placed on the lifting platform in order to enable ergonomic unloading of the article carriers by a picker.

14. The method for storing and picking articles according to claim 12, further comprising the steps transporting empty target loading aids using autonomously movable, driverless transport vehicles of the autonomously movable, driverless transport vehicles to the unloading station and providing at least one of the empty target loading aids at the semi-automated unloading device or on a buffer surface close to the semi-automated unloading device using an autonomously movable, driverless transport vehicle of the autonomously movable, driverless transport vehicles, and manually assembling the article carriers on at least one empty target loading aid for the picking order at the semi-automated unloading device.

15. The method for storing and picking articles according to claim 12, further comprising the steps transporting at least one partially loaded target loading aid using autonomously movable, driverless transport vehicles of the autonomously movable, driverless transport vehicles from the automatically operated unloading device to the semi-automated unloading device or to a buffer surface close to the semi-automated unloading device after the article carriers have been assembled on the at least order stack on the target loading aid in the first stack loading aid or on the base wall part of the second stack loading aid at the semi-automated unloading device.

16. The method for storing and picking articles according to claim 12, comprising the steps providing stack loading aids in each case for receiving and stabilizing a position of an order stack assembled of the article carriers according to the picking order, wherein the stack loading aids comprise at least one first stack loading aid and at least one second stack loading aid, each of which comprise a base wall part and side walls connected to the base wall part, transporting the stack loading aids using autonomously movable, driverless transport vehicles of the autonomously movable, driverless transport vehicles to the unloading station and providing at least one stack loading aid at the semi-automated unloading device or on a buffer surface close to the semi-automated unloading device, assembling the article carriers according to the picking order to the with the order stack from the first stack loading aid, if the picking warehouse comprises the first stack loading aid or which lifts the order stack from the second stack loading aid if the picking warehouse comprises the second stack loading aid, securing the order stack by placing the securing means circumferentially around the order stack, transporting the secured order stack using an autonomously movable, driverless transport vehicle of the autonomously movable, driverless transport vehicles, from the load securing station to a shipping zone of the picking warehouse, and transporting the unloaded stack loading aids using an autonomously movable, driverless transport vehicle of the autonomously movable, driverless transport vehicles, the step of transporting the unloaded stack loading aids comprising at least one of the steps transporting the first stack loading aid from the load securing station to the lading station with the at least one automatically operated lading device, if a first stack loading aid is used in the picking warehouse, and transporting the second stack loading aid from the load securing station to the unloading station and providing the second stack loading aid at an automatically operated unloading device or on a buffer surface close to the automatically operated unloading device, if a second stack loading aid is used in the picking warehouse.

17. A picking warehouse for storing and picking article carriers which contain articles and are stackable, the picking warehouse comprising an order-processing computer for acquiring a picking order and for determining articles which are required for the picking order, a delivery zone for providing article carrier stack groups comprising multiple article carriers arranged next to one another and on top of one another, a loading station, a storage zone, an unloading station, a plurality of autonomously movable, driverless transport vehicles, and a plurality of mobile transport loading aids, each of the mobile transport loading aids of the plurality of mobile transport aids being configured for receiving an article carrier stack group, wherein each of the plurality of mobile transport loading aids comprises a transport rack having a transport frame against which the loading platform of a transport vehicle can be positioned, and a base having a base wall part on which the article carrier stack group can be placed, wherein the mobile transport loading aids comprise empty transport loading aids, wherein the loading station has at least one automatically operated loading device or at least one automatically operated loading device and a buffer surface close to the automatically operated loading device, wherein the automatically operated loading device is configured for loading one of the empty transport loading aids with at least one article carrier stack group in order to provide at least one loaded transport loading aid, wherein the empty transport loading aid is provided for loading at the automatically operated first loading device, wherein the storage zone is configured for storing the at least one loaded transport loading aid containing the at least one article carrier stack group on a storage surface, wherein the unloading station has at least one automatically operated unloading device for unloading at least one of the loaded transport loading aids by removing the article carriers required for processing the picking order from the article carrier stack group, wherein the loaded transport loading aids are provided for unloading at the automatically operated unloading device, wherein each of the plurality of autonomously movable, driverless transport vehicles has a chassis with a drive unit and a loading platform arranged on the chassis for receiving a mobile transport loading aid, and is controlled by a control system to transport empty transport loading aids to the loading station and to provide one of the empty transport loading aids at the automatically operated first loading device or on the buffer surface close to the automatically operated first loading device; to transport the at least one loaded transport loading aid containing the article carrier stack group from the loading station to the storage zone; and to transport the at least one loaded transport loading aid containing the article carriers required for the picking order from the storage zone to an unloading station and to provide the at least one loaded transport loading aid at the automatically operated unloading device or on a buffer surface close to the automatically operated unloading device, wherein at least some of the autonomously movable, driverless transport vehicles or at least some of the mobile transport loading aids provide a transport safeguard, the transport safeguard being configured for stabilizing a position of an article carrier stack group when the article carrier stack group is received on the mobile transport loading aid, wherein each of the at least some of the autonomously movable, driverless transport vehicles comprises the loading platform, and first and second side walls, the first side wall and the second side wall being arranged adjacently to the loading platform and forming the transport safeguard, or wherein each of the at least some of the mobile transport loading aids comprises first and second side walls, the first side wall and the second side wall forming the transport safeguard, and wherein the base wall part is both inclined downwardly at a first inclination angle with respect to a horizontal plane spanned between the first side wall and the second side wall in a first direction towards the first side wall, and inclined downwardly at a second inclination angle with respect to a horizontal plane spanned between the first side wall and the second side wall in a second direction towards the second side wall, wherein the first side wall and the second side wall enclose an angle and are aligned perpendicularly to the base wall part.

18. The picking warehouse according to claim 17, comprising stack loading aids, each of the stack loading aids being configured for receiving and stabilizing a position of an order stack assembled of the article carriers according to the picking order, wherein the stack loading aids comprise at least one first stack loading aid and at least one second stack loading aid.

19. The picking warehouse according to claim 18, wherein the at least one first stack loading aid comprises a transport rack, a base and side walls connected to the base, wherein the transport rack forms a transport frame against which a loading platform of the transport vehicle can be positioned, and wherein the base comprises a base wall part on which a target loading aid with the order stack stacked thereon can be placed, and the side walls form a transport safeguard configured for stabilizing a position of the order stack when the order stack is received on the base wall part with the target loading aid.

20. The picking warehouse according to claim 18, wherein the at least one second stack loading aid comprises a transport rack, a base and side walls connected to the base, wherein the transport rack forms a transport frame against which a loading platform of the transport vehicle can be positioned, and wherein the base comprises a base wall part having placing blocks protruding on an upper side of the base wall part, the placing blocks being separated from one another by receiving channels, wherein the article carriers of the order stack can be placed on the placing blocks, such that the at least one second stack loading aid forms the target loading aid and the side walls form the transport safeguard configured for stabilizing a position of the order stack when the order stack is received on the base wall part.

21. The picking warehouse according to claim 18, comprising an order stack load securing station with at least one automatically operated load securing device or with at least one automatically operated load securing device and a buffer surface close to the automatically operated load securing device, the automatically operated load securing device being formed for secure transport of an order stack with a securing means comprising a winding film or a fastening tape, and wherein the order stack load securing station comprises a lifting device which lifts the target loading aid with the order stack from the stack loading aid if the picking warehouse comprises the at least one first stack loading aid, or which lifts the order stack from the stack loading aid if the picking warehouse comprises the at least one second stack loading aid.

22. The picking warehouse according to claim 17, comprising a device for detecting data relating to at least one of the article carrier stack group, the article carrier, and the article in the article carrier, and a data line connected to the control system, in order to transmit the data to the control system, wherein the control system comprises a control logic and processes the data in accordance with the control logic and generates control commands to control the automatically operated unloading device or to generate transport commands to control at least one of the autonomously movable, driverless transport vehicles.

23. The picking warehouse according to claim 17, comprising a checking station in the delivery zone with at least one testing device for checking quality features of the articles in the article carriers, a conveying system for inward transport of an article carrier stack group and for outward transport of an article carrier stack group, a detecting device for identifying the article carrier stack group connected to the control system via a data line, and an input and/or output device to input data from the check of the quality features connected to the control system via a data line.

24. The picking warehouse according to claim 23, wherein the checking station comprises an automatically operated clamping and lifting device along the conveying system for inwardly transporting an article carrier stack group and outwardly transporting an article carrier stack group wherein the clamping and lifting device is configured for separating the article carrier stack group into an upper article carrier stack and a lower article carrier stack in order to create an access region between the upper article carrier stack and the lower article carrier stack, the access region allowing the removal of at least one article carrier from the lower article carrier stack or of an article from an article carrier of the lower article carrier stack.

25. The picking warehouse according to claim 24, wherein the clamping device comprises clamping jaws movable by at least one drive device relative to one another between an opened position and a clamping position, the clamping jaws in the clamping position clamping the article carrier stack group along the circumference of at least one article carrier layer and on at least two sides, and the lifting device comprises a lifting frame movable by at least one drive device in the vertical direction relative to the conveying system for inward transport of an article carrier stack group and outward transport of an article carrier stack group, the clamping jaws being mounted on the lifting frame, wherein the lifting frame is configured for moving the clamping jaws from a lower height position into an upper height position in which the upper article carrier stack of the article carrier stack group is lifted off the lower article carrier stack of the article carrier stack group.

* * * * *